US011356456B2

(12) United States Patent
Turgeman et al.

(10) Patent No.: US 11,356,456 B2
(45) Date of Patent: Jun. 7, 2022

(54) MULTI-PARTICIPANT AND CROSS-ENVIRONMENT PIPELINES

(71) Applicant: MICROSOFT TECHNOLOGY LICENSING, LLC, Redmond, WA (US)

(72) Inventors: Tomer Turgeman, Tel Aviv (IL); Yisroel Gershon Taber, Raanana (IL); Lev Rozenbaum, Kfar-Saba (IL); Ittay Levy Ophir, Giv'atayim (IL); Nerya Cohen, Elkana (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/736,399

(22) Filed: Jan. 7, 2020

(65) Prior Publication Data

US 2020/0336488 A1    Oct. 22, 2020

Related U.S. Application Data

(63) Continuation-in-part of application No. 16/665,916, filed on Oct. 28, 2019, which is a continuation-in-part of application No. 16/388,696, filed on Apr. 18, 2019.

(51) Int. Cl.
*H04L 29/06* (2006.01)
*H04L 9/40* (2022.01)
*G06F 21/60* (2013.01)

(52) U.S. Cl.
CPC .......... *H04L 63/102* (2013.01); *G06F 21/602* (2013.01)

(58) Field of Classification Search
CPC .............................. H04L 63/102; G06F 21/602
(Continued)

(56) References Cited

U.S. PATENT DOCUMENTS 8,478,722 B2    7/2013  Lee et al.
9,195,850 B2    11/2015 Hess
(Continued)

FOREIGN PATENT DOCUMENTS

EP          3477527 A1      5/2019
WO      2006076520 A2      7/2006

OTHER PUBLICATIONS

Xiao,"Security and Privacy in Cloud Computing",2013,IEEE,vol. 15, pp. 843-859 (Year: 2013).*
(Continued)

*Primary Examiner* — Taghi T Arani
*Assistant Examiner* — Gregory A Lane
(74) *Attorney, Agent, or Firm* — Shook, Hardy & Bacon L.L.P.

(57) ABSTRACT

Embodiments are directed to techniques for constructing, configuring, triggering, and executing various types of multi-party pipelines that access and/or use a shielded asset required to exist or execute within a data trustee environment. Generally, authorized participants can build upon template data privacy pipelines and other shielded assets to create other pipelines. Building blocks such as entitlements, cross-environment pipelines, and/or shielded assets governed by various collaborative intelligence contracts can be used to construct more complicated pipelines that may include any number of data privacy pipelines, cross-environment pipelines, input datasets, computational steps, output datasets, permissible queries, participants, and/or governing collaborative intelligence contracts. As such, various types of multi-participant pipelines can be constructed, configured, triggered, and executed to generate collaborative intelligence, without exposing shielded assets, underlying raw data or algorithms provided by owners, or collaborative data shielded by the data trustee environment.

20 Claims, 43 Drawing Sheets

(58) Field of Classification Search
USPC .......................................................... 726/1
See application file for complete search history.

(56) References Cited

U.S. PATENT DOCUMENTS

| | | | |
|---|---|---|---|
| 9,703,834 | B2 | 7/2017 | Sityon et al. |
| 9,817,991 | B2 | 11/2017 | Boncha et al. |
| 10,642,832 | B1 | 5/2020 | Neumann et al. |
| 10,834,087 | B1 | 11/2020 | Pillai et al. |
| 2004/0083217 | A1 | 4/2004 | Brackett et al. |
| 2004/0111639 | A1 | 6/2004 | Schwartz et al. |
| 2006/0080554 | A1 | 4/2006 | Mcdonald et al. |
| 2007/0073695 | A1 | 3/2007 | Conlan et al. |
| 2007/0130616 | A1 | 6/2007 | Ng et al. |
| 2009/0282045 | A1 | 11/2009 | Hsieh et al. |
| 2012/0143922 | A1 | 6/2012 | Rane et al. |
| 2013/0007835 | A1 | 1/2013 | Iyer et al. |
| 2013/0239228 | A1* | 9/2013 | Cinarkaya et al. . G06F 21/6227 726/27 |
| 2013/0276134 | A1 | 10/2013 | Meredith et al. |
| 2014/0173720 | A1 | 6/2014 | Jain et al. |
| 2015/0163206 | A1 | 6/2015 | Mccarthy et al. |
| 2015/0379082 | A1 | 12/2015 | Hu et al. |
| 2016/0132553 | A1 | 5/2016 | Seo et al. |
| 2016/0132686 | A1 | 5/2016 | Peng |
| 2017/0235645 | A1* | 8/2017 | Theimer ............. G06F 11/2094 707/634 |
| 2017/0364553 | A1 | 12/2017 | Jacob et al. |
| 2018/0032576 | A1 | 2/2018 | Romero |
| 2018/0053012 | A1 | 2/2018 | Myers et al. |
| 2018/0060603 | A1 | 3/2018 | Ahmed et al. |
| 2018/0210936 | A1 | 7/2018 | Reynolds et al. |
| 2018/0225630 | A1 | 8/2018 | Creager et al. |
| 2018/0322168 | A1 | 11/2018 | Levine et al. |
| 2018/0349384 | A1 | 12/2018 | Nerurkar et al. |
| 2019/0147085 | A1 | 5/2019 | Pal et al. |
| 2019/0207974 | A1 | 7/2019 | Jas et al. |
| 2019/0213346 | A1 | 7/2019 | Friedman |
| 2019/0236598 | A1* | 8/2019 | Padmanabhan .... G06Q 20/4016 |
| 2020/0250334 | A1 | 8/2020 | Bandi et al. |
| 2020/0334259 | A1 | 10/2020 | Taber et al. |
| 2020/0334370 | A1 | 10/2020 | Turgeman et al. |
| 2020/0334375 | A1 | 10/2020 | Turgeman et al. |
| 2020/0334377 | A1 | 10/2020 | Turgeman et al. |

OTHER PUBLICATIONS

"International Search Report and Written Opinion Issued in PCT Application No. PCT/US2020/023043", dated May 15, 2020, 14 Pages.

"Non Final Office Action Issued in U.S. Appl. No. 16/388,696", dated Oct. 30, 2020, 23 Pages.

"International Search Report and Written Opinion Issued in PCT Application No. PCT/US20/024331", dated Jun. 15, 2020, 15 Pages.

"Non Final Office Action Issued in U.S. Appl. No. 16/388,700", dated Dec. 11, 2020, 20 Pages.

"Non Final Office Action Issued in U.S. Appl. No. 16/388,703", dated Dec. 11, 2020, 25 Pages.

"International Search Report and Written Opinion Issued in PCT Application No. PCT/US2020/023234", dated Jun. 8, 2020, 12 Pages.

"International Search Report and Written Opinion Issued in PCT Application No. PCT/US2020/026488", dated Jun. 16, 2020, 15 Pages.

"International Search Report and Written Opinion Issued in PCT Application No. PCT/US2020/023037", dated May 29, 2020, 17 Pages.

Final Office Action Issued in U.S. Appl. No. 16/388,700, dated Jun. 18, 2021, 22 Pages.

"Final Office Action Issued in U.S. Appl. No. 16/388,703", dated May 25, 2021, 24 Pages.

"Advisory Office Action Issued in U.S. Appl. No. 16/388,696", dated Jul. 15, 2021, 4 Pages.

"Final Office Action Issued In U.S. Appl. No. 16/388,696", dated May 3, 2021, 22 Pages.

"Non Final Office Action Issued in U.S. Appl. No. 16/665,916", dated May 14, 2021, 22 Pages.

"Non Final Office Action Issued in U.S. Appl. No. 16/388,696", dated Aug. 20, 2021, 21 Pages.

"Notice of Allowance Issued in U.S. Appl. No. 16/388,700", dated Oct. 7, 2021, 10 Pages.

"Notice of Allowance Issued in U.S. Appl. No. 16/388,703", dated Nov. 2, 2021, 10 Pages.

"Non Final Office Action Issued In U.S. Appl. No. 17/009,414", dated Oct. 13, 2021, 14 Pages.

Fan, Wenfei, "Data Quality: From Theory to Practice", In Journal of ACM SIGMOD Record, vol. 44, Issue 3, Sep. 2015, pp. 7-18.

Sharma, et al., "Live Data Analytics with Collaborative Edge and Cloud Processing in Wireless IoT Networks", In Journal of IEEE Access, vol. 5, Apr. 24, 2017, pp. 4621-4635.

"International Search Report and Written Opinion Issued in PCT Application No. PCT/US21/037147", dated Sep. 24, 2021, 10 Pages.

"International Search Report and Written Opinion Issued in PCT Application No. PCT/US21/037152", dated Sep. 24, 2021, 10 Pages.

"Notice of Allowance Issued in U.S. Appl. No. 16/665,916", dated Nov. 29, 2021, 11 Pages.

"Notice of Allowance Issued in U.S. Appl. No. 17/009,414", dated Feb. 15, 2022, 10 Pages.

Papernot, et al., "SoK: Security and Privacy in Machine Learning", In IEEE European Symposium on Security and Privacy, Apr. 24, 2018, pp. 399-414.

"Final Office Action Issued in U.S. Appl. No. 16/388,696", dated Feb. 28, 2022, 21 Pages.

"Notice of Allowance Issued in U.S. Appl. No. 16/388,700", dated Mar. 16, 2022, 10 Pages.

"Notice of Allowance Isssued in U.S. Appl. No. 16/388,703", dated Mar. 16, 2022, 10 Pages.

"Notice of Allowance Issued in U.S. Appl. No. 16/665,916", dated Mar. 23, 2022, 10 Pages.

U.S. Appl. No. 16/388,700 | US-2020-0334259-A1, filed Apr. 18, 2019 | Publication Date Oct. 22, 2022.

U.S. Appl. No. 16/388,703 | US-2020-0334375-A1, filed Apr. 18, 2019 | Publication Date Oct. 22, 2022.

U.S. Appl. No. 16/388,696 | US-2020-0334370-A1, filed Apr. 18, 2019 | Publication Date Oct. 22, 2020.

U.S. Appl. No. 16/665,916 | US-2020-0334377-A1, filed Oct. 28, 2019 | Publication Date Oct. 22, 2022.

U.S. Appl. No. 16/736,399 | US-2020-0336488-A1, filed Jan. 7, 2022 | Publication Date Oct. 22, 2020.

U.S. Appl. No. 17/009,407 | US-2022-0067199-A1, filed Sep. 1, 2020 | Publication Date Mar. 3, 2022.

U.S. Appl. No. 17/009,414 | US-2022-0067200-A1, filed Sep. 1, 2020 | Publication Date Mar. 3, 2022.

U.S. Appl. No. 17/684,204, filed Mar. 1, 2022.
U.S. Appl. No. 17/684,189, filed Mar. 1, 2022.
U.S. Appl. No. 17/684,210, filed Mar. 1, 2022.
U.S. Appl. No. 17/656,051, filed Mar. 23, 2022.
U.S. Appl. No. 17/656,057, filed Mar. 23, 2022.
U.S. Appl. No. 17/656,062, filed Mar. 23, 2022.
U.S. Appl. No. 17/656,066, filed Mar. 23, 2022.
U.S. Appl. No. 17/656,073, filed Mar. 23, 2022.
U.S. Appl. No. 17/656,079, filed Mar. 23, 2022.
U.S. Appl. No. 17/656,082, filed Mar. 23, 2022.

* cited by examiner

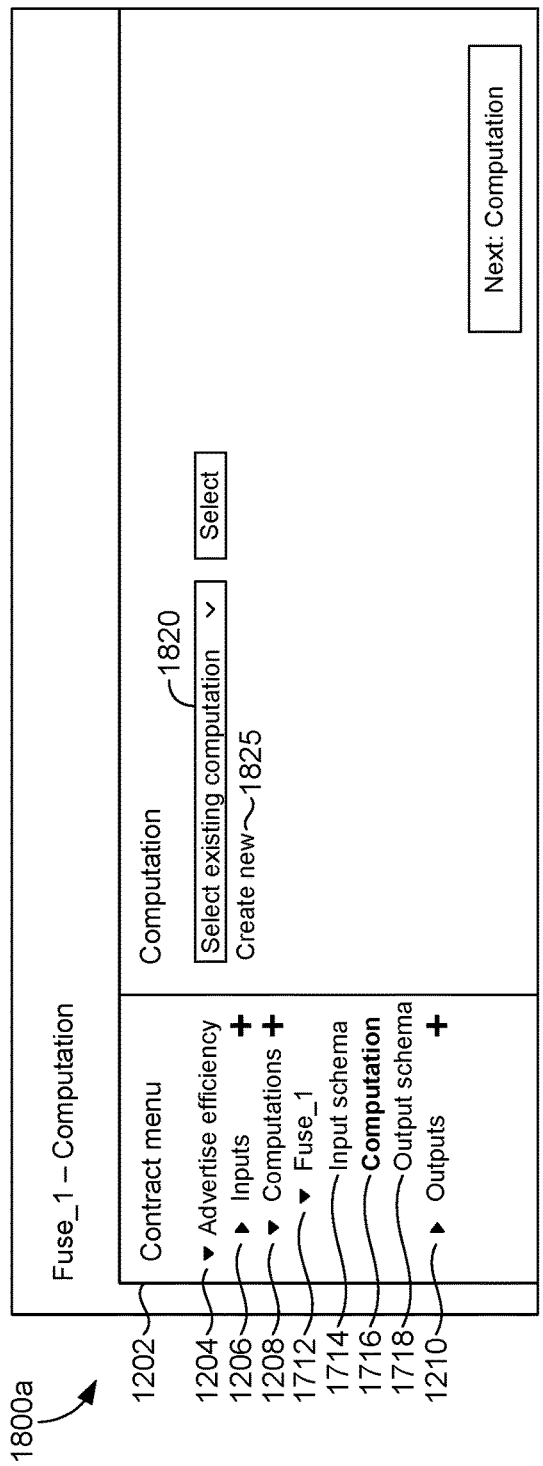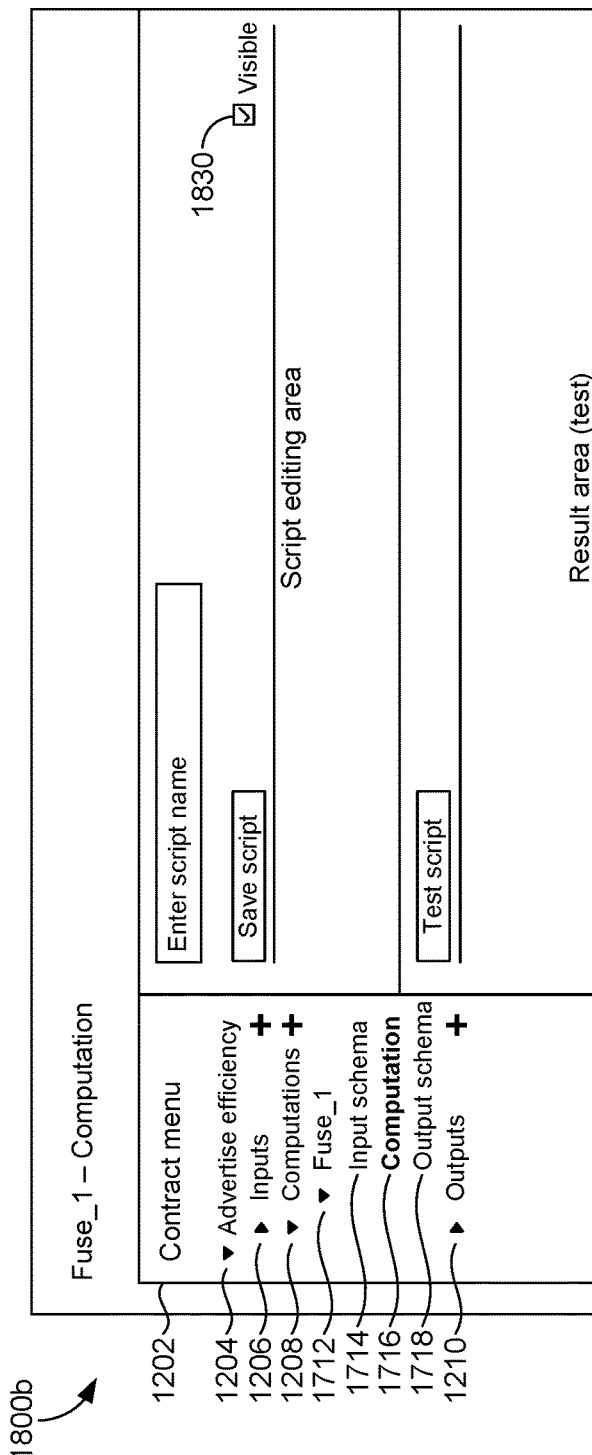
FIG. 18A
FIG. 18B

Fuse_1 – Computation

1202 — Contract menu
1204 — ▼ Advertise efficiency
1206 — ▲ ▶ Inputs
1208 — ▶ Computations
1712 — ▼ Fuse_1
1714 — Input schema
1716 — Computation
1718 — Output schema
1210 — ▲ ▶ Outputs Enter script name Save script          Some actions          ☑ Visible Script editing area 1840:
```
//Step #2 – Aggregation
//We want to know how many products were brought by how many people per store
//The resulting schema should be
//Store(id, retailerId, buyerCount, productCount)
//In this step we will return an object with a collection of stores per retailer export class DataReducer {
  getInitialValue() {
    return {
      Retailer1: {},
      Retailer2: {}
    };
  };
  reduce(accumulator, currentValue) {
```

Test script

Result area (test)

- Datasets
- Assets
- Contracts
- Pipelines
- Jobs
- Queries
- Audit

[+ Create new]

Pipelines

| Name | Action |
|---|---|
| Calculate average number of impressions shown per purchased item | Trigger ~2510 |
| ... | ... |

- Datasets
- Assets
- Contracts
- Pipelines
- Jobs
- Queries
- Audit

From: 16 Sep 2018  To: 17 Sep 2018  ☑ Running  ☑ Succeeded  ☑ Failed  ☑ Aborted

Jobs
~2520

| Job ID | Pipeline name | Status | Start time | Duration | Action |
|---|---|---|---|---|---|
| JOB 171914 | Calculate average number of... | Running | 17 Sep 2018 17:30 UTC | 25 min 17 sec | Abort |
| JOB 171912 | Calculate average number of... | Aborted | 17 Sep 2018 15:30 UTC | 1 hour 45 min 25 sec | |
| JOB 171910 | Calculate average number of... | Succeeded | 16 Sep 2018 12:40 UTC | 30 min 39 sec | View results |
| JOB 171909 | Calculate average number of... | Failed | 16 Sep 2018 10:45 UTC | 10 min 5 sec | View errors |
| ... | ... | | | | ... |

Execute query

Name:
Description: Calculates the max compensation for a level...

Get max compensation for a level...

Param-1: Free-text-value

Param-2: One-of-the-pr defined-values

Trigger — 2540

Results

| Column-A | Column-B | Column-C | Column-D | Column-E |
|---|---|---|---|---|
| A1 | B1 | C1 | D1 | E1 |
| A2 | B2 | C2 | D2 | E2 |
| A3 | B3 | C3 | D3 | E3 |
| ... | ... | ... | ... | ... |

2545

Datasets
Assets
Contracts
Pipelines
Jobs
Queries
Audit

Audit

From: 16 Sep 2018 　 To: 17 Sep 2018 　 Object types: Jobs, Pipelines, Contracts, ... ▼

| Event time | Object | Operation | Actor | Description |
|---|---|---|---|---|
| 17 Sep 2018 17:30 UTC | Job (17914) | Started | John Smith (johns@citenanta.on... | Job started |
| 17 Sep 2018 15:30 UTC | Job (17912) | Started | John Smith (johns@citenanta.on... | Job started |
| 16 Sep 2018 12:40 UTC | Job (17910) | Aborted | John Smith (johns@citenanta.on... | Job aborted |
| 16 Sep 2018 10:45 UTC | Proposal (182572) | Created | John Smith (johns@citenanta.on... | Proposal created |
| ⋮ | ⋮ | ⋮ | ⋮ | ⋮ |

Datasets
Assets
Contracts
Pipelines
Jobs
Queries
Audit

FIG. 25E

```
SELECT storeid,
       AVG(sumbyuser) as AvgByUser
FROM   (SELECT storeid,
               Sum(total) AS sumByUser
        FROM data
        WHERE timestamp > Dateadd(day, -7, Getdate())
        GROUP BY customerid,
                 storeid) byUser
            GROUP BY storeid
```

```
                                                             2920
                                                            ↙
SELECT  storeid,
        Round(avgofuserinstore, 2) AS Average
FROM    (SELECT storeid,
                Avg(sumbyuser)              AS avgOfUserInStore,
                 Count(DISTINCT customerid) AS dCountUser,
                 Min(mintime)               AS aggMinTime,
                Max(maxtime)                AS aggMaxTime
         FROM   (SELECT storeid,
                        customerid,
                        Sum(total)     AS sumByUser,
                         Min(timestamp) AS minTime,
                        Max(timestamp) AS maxTime
                 FROM data
                 WHERE timestamp > Dateadd(day, -7, Getdate())
                 GROUP BY customerid,
                          storeid) byUser
         GROUP BY storeid) grouped
WHERE   Datediff(hour, aggmaxtime, aggmintime) > 48
                            AND dcountuser > 20
```

FIG. 29B

MULTI-PARTICIPANT AND CROSS-ENVIRONMENT PIPELINES

CROSS-REFERENCE TO RELATED APPLICATIONS

This application is a continuation-in-part of U.S. patent application Ser. No. 16/665,916, filed on Oct. 28, 2019, entitled "User Interface for Building a Data Privacy Pipeline and Contractual Agreement to Share Data," which is itself a continuation in-part of U.S. patent application Ser. No. 16/388,696, filed on Apr. 18, 2019, entitled "Data Privacy Pipeline Providing Collaborative Intelligence And Constraint Computing." The contents of each of the foregoing applications are herein incorporated by reference in their entirety.

BACKGROUND

Businesses and technologies increasingly rely on data. Many types of data can be observed, collected, derived, and analyzed for insights that inspire progress in science and technology. In many cases, valuable intelligence can be derived from datasets, and useful products and services can be developed based on that intelligence. This type of intelligence can help advance industries such as banking, education, government, health care, manufacturing, retail, and practically any other industry. However, in many cases, the datasets owned or available to a particular data owner are incomplete or limited in some fundamental way. Information sharing is one way to bridge gaps in datasets, and sharing data has become an increasingly common practice. There are many benefits from sharing data. However, there are also many concerns and obstacles.

SUMMARY

Embodiments of the present disclosure are directed to techniques for constructing, configuring, triggering, and executing various types of multi-participant pipelines that access and/or use a shielded asset that is required to exist or execute within a data trustee environment. Generally, access to a shielded asset may be governed by a collaborative intelligence contract among multiple collaborators specifying a configuration of a data privacy pipeline or some other shielded asset (e.g., computational steps, collaborative dataset, etc.). Data privacy pipelines and other shielded assets can be thought of as templates or patterns that can be triggered and spun up in the data trustee environment by an authorized participant. The present disclosure describes how participants can build upon such pipelines and other shielded assets to create other pipelines.

When a collaborative intelligence contract authorizes a participant to access and/or use a shielded asset such as a template data privacy pipeline (or some portion thereof), the participant can use the shielded asset to build other, more complex pipelines. This introduces a number of possible configurations and use cases described herein, such as entitlements, cross-environment pipelines, and multi-contract, multi-participant pipelines. For example, an authorized participant may grant an entitlement for another participant to use a particular shielded asset within a data trustee environment, subject to any designated entitlement constraints and/or policies. With the granted entitlement, the beneficiary can then use the shielded asset in its own pipelines, and the pipelines, when executed, can access and use the shielded asset and enforce any designated entitlement constraints and/or policies. In another example configuration, a cross-environment pipeline may include some pre or post-processing that occurs outside of the data trustee environment, in combination with a data privacy pipeline or some other shielded asset required to exist or execute within the data trustee environment.

Entitlements, cross-environment pipelines, and/or various shielded assets can be used to build various types of multi-participant pipelines. For example, a single cross-environment pipeline can use multiple shielded assets governed by different collaborative intelligence contracts. In another example, different participants to a single collaborative intelligence contract can use shielded assets governed by the contract in their own pipelines. As will be appreciated, the various building blocks described herein can be used to construct more complicated pipelines, including any number of data privacy pipelines, cross-environment pipelines, input datasets, computational steps, output datasets, permissible queries, participants, and/or governing collaborative intelligence contracts.

As such, entitlements, cross-environment pipelines, and/ or shielded assets governed by various collaborative intelligence contracts can be used to build various types of multi-participant pipelines. These multi-participant pipelines can be triggered and executed within the data trustee environment to generate collaborative intelligence, without exposing shielded assets, underlying raw data or algorithms provided by owners, or collaborative data shielded by the data trustee environment.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 16A-14C are illustrations of example user interfaces for creating a new computational step in a data privacy pipeline associated with a collaborative intelligence contract, in accordance with embodiments described herein;"

FIGS. 18A-C are illustrations of example user interfaces for specifying a computation for a computational step in a data privacy pipeline associated with a collaborative intelligence contract, in accordance with embodiments described herein;

FIGS. 25A-E are illustrations of example user interfaces for browsing and interacting with accessible resources, in accordance with embodiments described herein;

FIG. 29B is an example of a corresponding query, in accordance with embodiments described herein;

DETAILED DESCRIPTION

Overview

Figure 1:
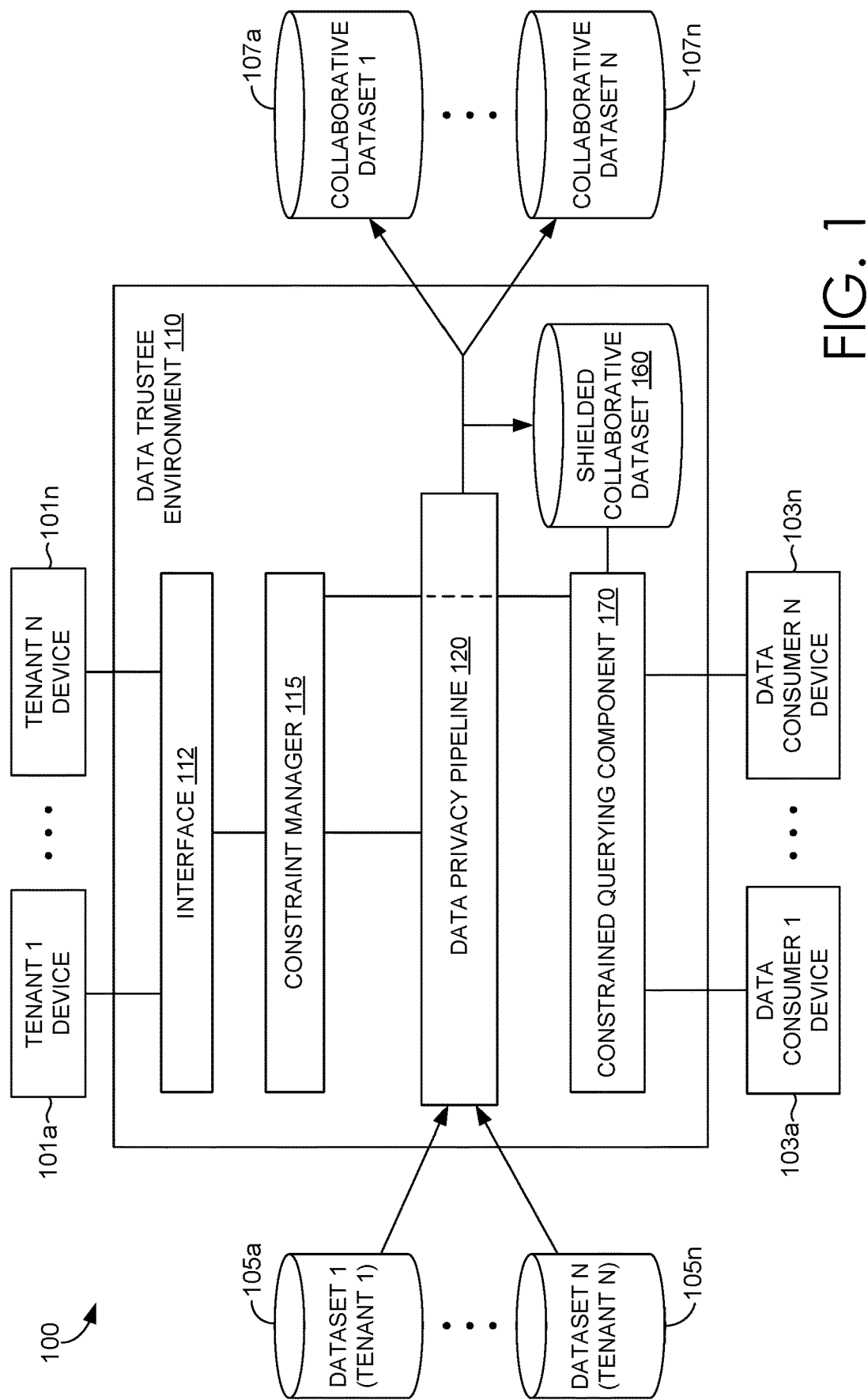
FIG. 1 is a block diagram of an example collaborative intelligence environment, in accordance with embodiments described herein.

There are many benefits from sharing data. For example, sharing data often leads to more complete datasets, encourages collaborative efforts, and produces better intelligence (e.g., understanding or knowledge of an event or circumstance, or information, relationships, and facts about different types of entities). Researchers benefit from more data being available. Further, sharing can stimulate interest in research and can incentivize the production of higher data quality. Generally, sharing can result in synergies and efficiencies in research and development.

However, there are also many concerns and obstacles to sharing data. As a practical matter, different industries vary in ability and willingness to share data. Issues with data privacy and confidentiality are fundamental to many industries such as health care and banking. In many cases, laws, regulations, and consumer demands place restrictions on the ability to share data. Furthermore, the act of observing, collecting, deriving, and analyzing datasets is often an expensive and labor-intensive exercise, and many have concerns that sharing data would give away a competitive advantage. Even when there is sufficient motivation to share data, issues with control and access to shared data are often an obstacle to sharing. In effect, the obstacles often prevent data sharing and the opportunities for progress that come with it. As such, there is a need for data sharing techniques that facilitate development of collaborative intelligence while ensuring data privacy and facilitating control and access to shared data.

Accordingly, embodiments of the present disclosure are directed to techniques for constructing, configuring, triggering, and executing various types of multi-participant pipelines (e.g., multi-tenant pipelines) that access and/or use a shielded asset that is required to exist or execute within a data trustee environment. As used herein, a data pipeline that is required to execute within the data trustee environment is called a data privacy pipeline. Generally, a configuration of a data privacy pipeline can be specified by one or more participants and governed by a collaborative intelligence contract. A data privacy pipeline can be thought of as a template or a pattern that can be triggered and spun up by an authorized participant. Prior applications described how participants can collaborate to build a collaborative intelligence contract that specifies a configuration of a data privacy pipeline. This is an example of a single-contract, multi-participant pipeline. The present disclosure describes how participants (e.g., tenants of the data trustee environment) can build upon such pipelines and other shielded assets to create other pipelines (e.g., multi-participant pipelines, such as multi-tenant pipelines). Generally, when a collaborative intelligence contract authorizes a participant (e.g., a tenant) to access and/or use a shielded asset such as a template data privacy pipeline (or some portion thereof), the participant can use the shielded asset to build other, more complex pipelines. This introduces a number of possible configurations and use cases described herein, such as cross-environment pipelines that cross a data trustee environment and multi-contract, multi-participant pipelines.

When building a pipeline, a participant can utilize a number of techniques to access a shielded asset required to exist or execute in a data trustee environment. Generally, a collaborative intelligence contract may designate and parameterize access to any number of shielded assets, such as datasets, computational steps, pipelines, jobs, queries, audit events, and the like. Further, a collaborative intelligence contract may parameterize access control for designated participants on an element-by-element basis. Access control properties may be tailored to a particular user account, user group, or some other basis. As such, a contract can selectively permit access to and/or use of specific portions or even the entirety of a contact, pipeline, or some other shielded asset. Thus, a collaborative intelligence contract may include access controls that allow a designated participant to access a shielded asset, and a data trustee environment may implement those access controls.

In some embodiments, a collaborative intelligence contract may allow a party or other authorized participant to grant an entitlement for another participant to use a designated shielded asset within a data trustee environment, subject to any designated entitlement constraints and/or policies. For example, a data contributor may want to provide access to its data (or some other shielded asset), but may not want to be involved in the approval and enforcement of complex pipelines that use its data. In this case, the data contributor can grant an entitlement to a particular beneficiary to access and/or use its data, subject to designated entitlement constraints and/or policies. In embodiments where an entitlement grants permission for a shielded asset governed by a collaborative intelligence contract among multiple parties, the identity of the beneficiary may, but need not, be made available to other parties to the contract. With the granted entitlement, the beneficiary can then use this data in its own pipelines, subject to any entitlement constraints and/or policies designated by the data contributor. For example, the beneficiary can collaborate with others to build a data privacy pipeline, and the data privacy pipeline, when executed, can pull in the data from the contributor, along with any designated entitlement constraints and/or policies. In this case, the data contributor need not be a party to a governing downstream collaborative intelligence contract, nor participate in the construction of this downstream data privacy pipeline. Rather, the entitlement constraints and/or policies can be enforced by the data trustee environment in connection with the beneficiary's access and/or use of the data. In the context of entitlements, a designated entitlement constraint governs the use of the grantor's asset (e.g., a dataset) in generating an entitlement output (e.g., an aggregated dataset), while a designated entitlement policy governs the use of the entitlement output (e.g., in a downstream pipeline). Thus, entitlements are one possible building block for data pipelines, such as data privacy pipelines.

In some embodiments, a specification of a cross-environment pipeline may include some pre or post-processing that occurs outside of the data trustee environment, in combination with a data privacy pipeline or some other shielded asset required to exist or execute within the data trustee environment. Generally, there may be many existing collaborative intelligence contracts and/or entitlements specifying different template data privacy pipelines and/or other shielded assets. Any participant that is granted permission to access and/or use a particular template or other shielded asset can build a pipeline that uses the shielded asset, subject to any applicable constraints or polices. Even though a shielded asset may be required to exist or execute in a data trustee environment, a data pipeline can be built on top of the shielded asset without the rest of the data pipeline existing or executing in the data trustee environment. Thus, participants can create cross-environment pipelines that cross the data trustee environment. For example, a tenant can create a cross-environment pipeline that uses a shielded asset as a component in the pipeline. Thus, the tenant can create or spin up a cross-environment pipeline that may exist or execute partially in the data trustee environment. This kind of pipeline can be said to cross the data trustee environment, and can be considered a type of multi-participant pipeline (or multi-tenant pipeline) because it relies on a shielded asset governed by a collaborative intelligence contract with multiple participants (or tenants of the data trustee environment).

Entitlements, cross-environment pipelines, and/or shielded assets governed by different collaborative intelligence contracts can be used to build various types of multi-contract, multi-participant pipelines (or multi-contract, multi-tenant pipelines). For example, a single cross-environment pipeline can use multiple shielded assets governed by different collaborative intelligence contracts. In another example, different participants to a single collaborative intelligence contract can use shielded assets governed by the contract in their own pipelines. In some cases, the different participants to a collaborative intelligence contract need not know the other participants exist. These are just a few examples of different types of multi-participant pipelines that can be built and triggered. As will be appreciated, the various building blocks described herein can be used to construct more complicated pipelines, including any number of data privacy pipelines, cross-environment pipelines, input datasets, computational steps, output datasets, permissible queries, participants, and/or governing collaborative intelligence contracts.

Accordingly, the techniques described herein facilitate the use of shielded assets to build, trigger, and execute various types of multi-participant pipelines. Generally, a data trustee environment can authorize an authorized participant (including an entitlement beneficiary) to use a data privacy pipeline or some other shielded asset (e.g., computational steps, collaborative dataset, etc.) that is required to exist or execute in a data trustee environment. Thus, an authorized participant can access and/or use the data privacy pipeline (or other shielded asset) within the data trustee environment to build some other pipeline configured to make use of it. For example, a tenant can create a cross-environment pipeline that uses a shielded asset governed by a collaborative intelligence contract with multiple participants as a component in a pipeline that includes some pre or post-processing that occurs outside of the data trustee environment. Other types of multi-participant pipelines include multi-contract, multi-participant pipelines configured to access and/or use shielded assets from multiple contracts, different participants to a single collaborative intelligence contract using a shielded asset governed by the contract in their own pipelines, and others.

As such, entitlements, cross-environment pipelines, and/or shielded assets governed by various collaborative intelligence contracts can be used to build various types of multi-participant pipelines. These multi-participant pipelines can be triggered and executed within the data trustee environment to generate collaborative intelligence, without exposing shielded assets, underlying raw data or algorithms provided by owners, or collaborative data shielded by the data trustee environment.

Example Multi-Participant Pipelines

Referring now to FIG. 1, a block diagram of example collaborative intelligence environment 100 suitable for use in implementing embodiments of the invention is shown. Generally, collaborative intelligence environment 100 is suitable for generation of collaborative intelligence, and, among other things, facilitates constraint computing and constraint querying. Collaborative intelligence environment 100 or a portion thereof (e.g., data trustee environment 110) may, but need not, be implemented in a distributed computing environment such as distributed computing environment 3000, discussed below with respect to FIG. 30. Any or all of the components of collaborative intelligence environment 100 can be implemented as any kind of computing device, or some portion thereof. For example, in an embodiment, tenant devices 101a through 101n and data consumer devices 103a through 103n can each be a computing device such as computing device 3100, as described below with reference to FIG. 31. Further, data trustee environment 110 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 100 may communicate with each other via one or more networks, which may include, without limitation, one or more local area networks (LANs) and/or wide area networks (WANs). Such networking environments are commonplace in offices, enterprise-wide computer networks, intranets, and the Internet.

Collaborative intelligence environment 100 includes data trustee environment 110 that is capable of deriving collaborative data and/or collaborative intelligence from raw data provided by data owners or providers (e.g., tenants) subject to configurable constraints, without sharing the raw data. Generally, any number of tenants can input their data (e.g., datasets 105a through 105n) into data trustee environment 110 and designate one or more constraints (e.g., from one of tenant devices 101a through 101n). Data trustee environment 110 can derive collaborative data (e.g., collaborative datasets 107a through 107n, shielded collaborative dataset 160) based on the one or more constraints. Any number of data consumers (e.g., operating one of data consumer devices 103a through 103n) may issue queries on shielded collaborative dataset 160, and data trustee environment 110 may derive collaborative intelligence from shielded collaborative dataset 160, subject to the one or more constraints. In some cases, an authorized data consumer (e.g., which may be defined by one or more of the constraints) may be the same person or entity that owns or provided raw data (e.g., one or more of datasets 105a through 105n) or owns the derived collaborative data (e.g., shielded collaborative dataset 160). In some cases, an authorized data consumer may be some other person or entity.

In the embodiment illustrated in FIG. 1, data trustee environment 110 includes interface 112, constraint manager 115, data privacy pipeline 120, and constrained querying component 170. At a high level, tenants that seek to share data and other designated contributors can interact with interface 112 to specify parameters for a contractual agreement to share and access data. Generally, interface 112 can cause presentation of a user interface that serves as a sandbox for one or more participants to generate, contribute to, or otherwise configure a data privacy pipeline (such as data privacy pipeline 120), which can serve as the basis for a contractual agreement among the participants. Various types of pipelines are possible and may include any number of pipeline inputs (e.g., input datasets), computational steps, and/or output datasets to be generated. Pipelines may be built on top of shielded assets that are required to exist or operate in the data trustee environment 110 and that a participant is permitted to access and/or use. For example, and as explained in more detail below, a participant authorized to access or use a particular data privacy pipeline (e.g., by way of a first contractual agreement) can build another pipeline that includes the data privacy pipeline (e.g., a cross-environment pipeline, another data privacy pipeline governed by a second contractual agreement among multiple participants, etc.).

A data privacy pipeline can be provided as a distributed computing or cloud computing service (cloud service) implemented in the data trustee environment 110, and can be spun up and spun down as needed. Constraint manager 115 can monitor and orchestrate the use of, generation of, and access to collaborative data subject to the specified specify parameters for the agreement. The specified parameters and other features of the agreement may be stored in a contact database (not depicted) accessible to constraint manager 115. Constrained querying component 170 can apply constraint querying to allow authorized data consumers (e.g., operating one of data consumer devices 103a through 103n) to query collaborative data (e.g., shielded collaborative dataset 160) in data trustee environment 110 subject to the specified parameters. Generally, the components of data trustee environment 110 may correspond to the components of data trustee environment 2610 of FIG. 26, which is described in more detail below.

In some embodiments, interface 112 can cause a presentation of a graphical or other visual user interface that includes any arrangement and orientation of interaction elements capable of receiving inputs that specify parameters for a data privacy pipeline and a corresponding agreement to share data. The user interface may allow authorized parties to a contract or authorized participants for a pipeline to select, compose, and arrange any number and combination of pipelines. For a particular data privacy pipeline, for example, the user interface may accept a specification of pipeline inputs (e.g., input datasets), computational steps, and/or pipeline/contract outputs (e.g., output datasets comprising collaborative data to be generated by a data privacy pipeline, permissible named queries on collaborative data, and the like). In some embodiments, interface 112 can be implemented as a web service that prompts users on client devices to specify parameters through a series of related pages, screens, and/or other interface elements. Once a pipeline is built, interface 112 can allow an authorized participant to trigger the pipeline, or use the pipeline as a template when building other pipelines. An example implementation of interface 112 may cause presentation, on a client device, of one or more of the user interfaces depicted in FIGS. 11-25 and described in more detail below. Although in some embodiments, various user interfaces are described as being a graphical user interface, this need not be the case. Other examples of possible interfaces includes programmatic interfaces, command line interfaces, menu-driven interfaces, form-based interfaces, natural language interfaces, gesture-driven interfaces, optical interfaces, haptic interfaces, and 3D interfaces, to name a few. Generally, any suitable interface capable of implementing the functionality described herein is contemplated within the scope of the present disclosure.

Figure 2:
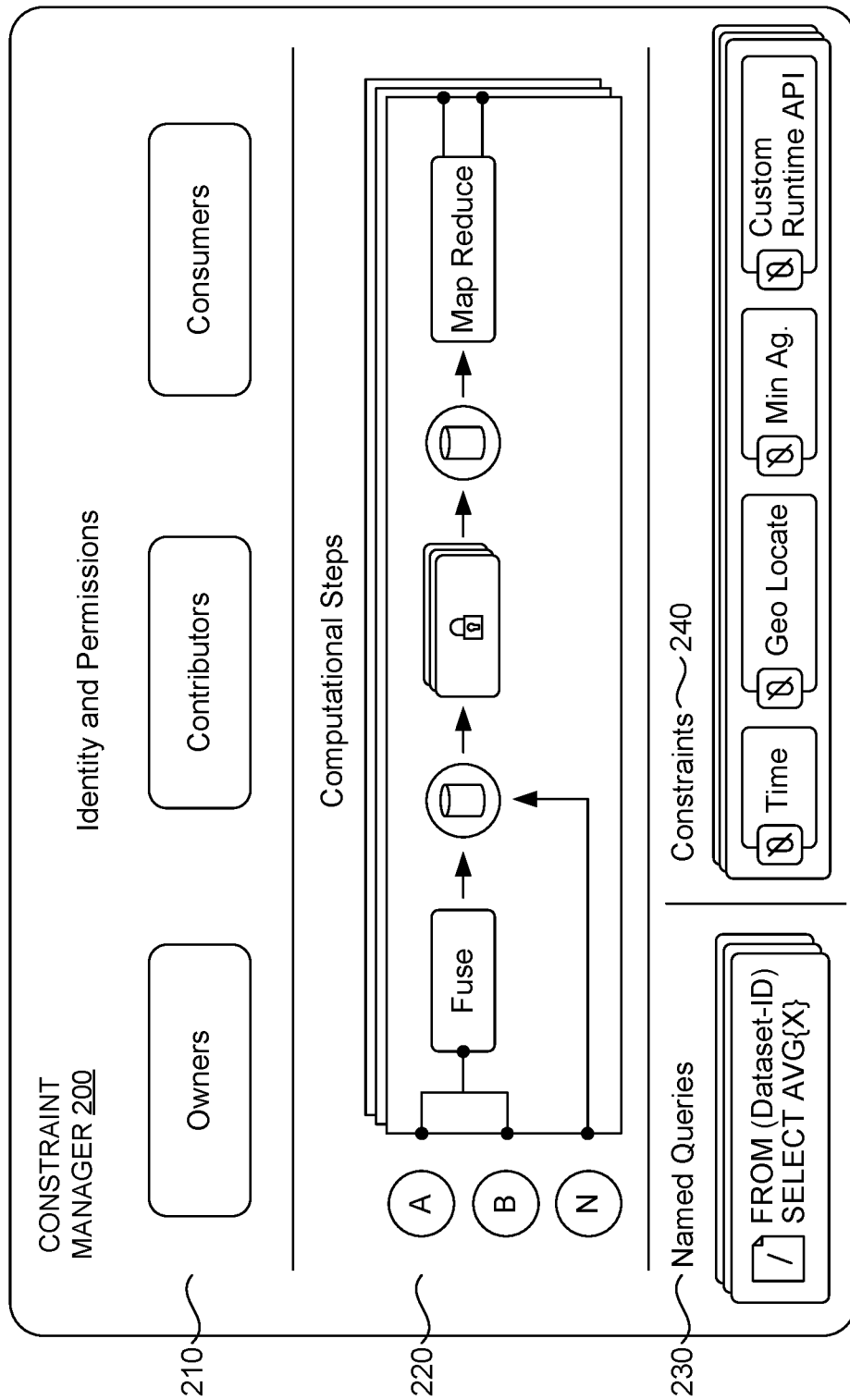
FIG. 2 is a block diagram of an example constraint manager, in accordance with embodiments described herein.

Generally, interface 112 can prompt contributors to a data privacy pipeline to specify various parameters for the pipeline or the corresponding agreement, and constraint manager 115 can store the parameters and orchestrate deploying the pipeline (and contract, if applicable). FIG. 2 illustrates an example constraint manager 200, which may correspond to constraint manager 115 of FIG. 1. For any given pipeline or corresponding collaborative intelligence contract, whether finalized or under development, constraint manager 200 may store a set of roles 210, an arrangement of computational steps 220 that form a data privacy pipeline, permissible named queries 230, and specified constraints 240. For example, the set of roles 210 may include a designation of data owners, authorized contributors, and authorized data consumers. The roles 210 may be applied on an element-by-element basis to different elements of computational steps 220 in order to parameterize access control on an element-by-element basis. For example, computational steps 220 may authorize data owners to provide an input dataset into slots A and/or B, and may authorize a contributor to provide a computational script through slot N.

Generally, a specified computation step may include a specified computation platform (e.g., Javascript, Kusto Query Language, SparkQL, Python, C# Linq), a specified input to the computational step, a specified computation for the computational step, a specified output schema, some combination thereof, or otherwise. In FIG. 2, computational steps 220 are illustrated with an example configuration of a selection of these elements, including slots for inputs A and B, template fuse and map reduce computations, slot N for a custom computation, and a set of unexposed computations (illustrated with a padlock symbol). This configuration is meant merely as an example, and any suitable computational step may be specified. These computational steps 220 can also be thought of as templates that can be used as shielded assets by authorized participants to create pipelines of their own.

Figure 3:
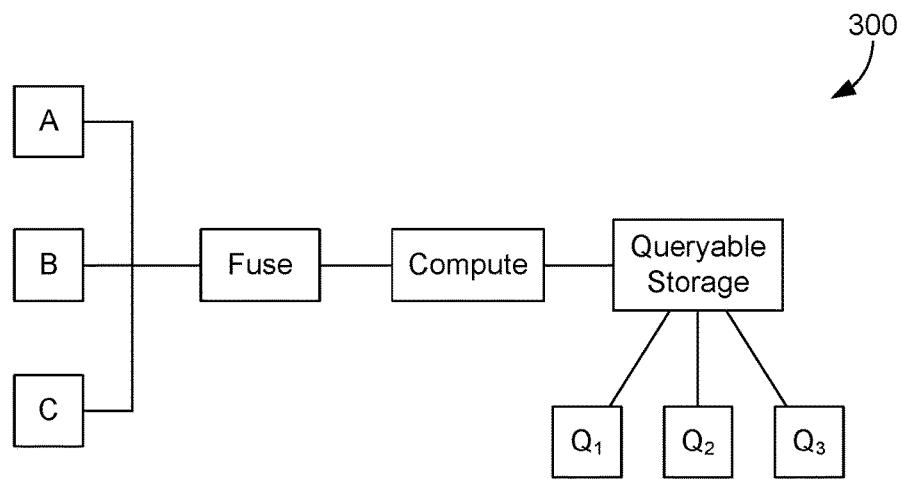
FIG. 3 is a block diagram of an example multi-participant pipeline, in accordance with embodiments described herein.

FIG. 3 illustrates an example multi-participant pipeline, in accordance with certain embodiments. In this example, three participants A, B, and C collaborate to build pipeline 300, which serves as a basis for a single contractual agreement among the three participants. In this simple example, each participant contributes data, and pipeline 300 is configured to fuse and perform some computation over the data, and store the result in some queryable storable. Now consider the possibility that A does not care about the particular computation or the different possible downstream queries, as long as some particular constraint is satisfied, such as an aggregation constraint (e.g., allow access only when aggregating at least N rows or distinct field values). Rather than requiring A to collaborate on an entire pipeline 300, which may require A to review and sign off on the entire pipeline, in some embodiments, A can grant some other participant such as B an entitlement to use A's data, subject to a defined entitlement constraint (applied when the data is used) or entitlement policy (enforced on the entitlement output).

Figure 4:
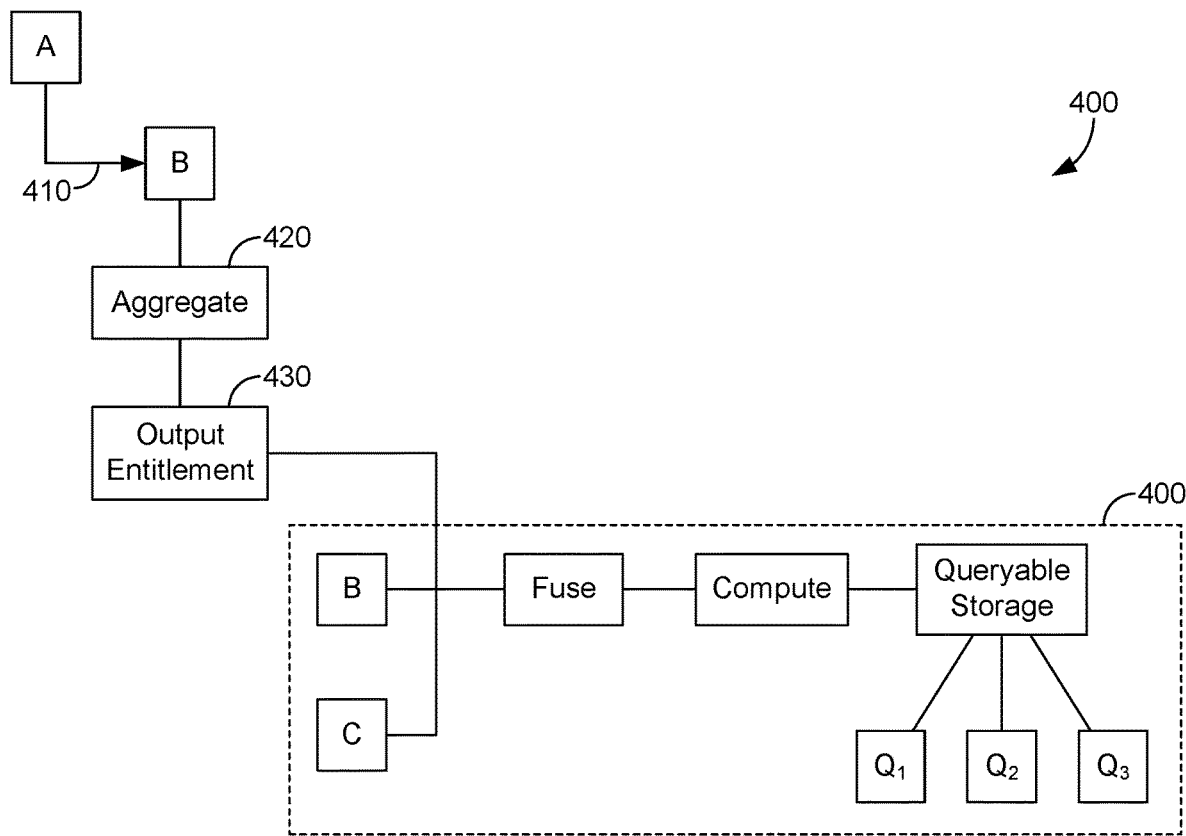
FIG. 4 is a block diagram of an example entitlement and multi-participant pipeline, in accordance with embodiments described herein.

FIG. 4 illustrates an example entitlement, in accordance with certain embodiments. In this example, A grants B an entitlement 410 to use A's data (or some other shielded asset required to exist or execute in a data trustee environment). In granting the entitlement, A can specify any number of entitlement constraints on B's use of A's asset to generate some entitlement output. Additionally or alternatively, A can specify any number of entitlement policies on downstream uses of the entitlement output. Entitlement constraints and policies can implement any of the various types of constraints described here, including by way of nonlimiting example data access constraints, data processing constraints, data aggregation constraints, and/or data sanitation constraints. In the example illustrated in FIG. 4, the entitlement 410 carries with it an aggregation constraint 420. As such, when B accesses and/or uses A's data pursuant to the entitlement, the aggregation constraint 420 can be automatically applied to generate output entitlement 430. This is just an example, and any other constraint may be applied to a beneficiary's entitlement to use a designated shielded asset. Furthermore, any type of shielded asset may be the subject of an entitlement grant, assuming the grantor has the proper permission to grant the entitlement (e.g., an owner of data or a script granting an entitlement to use the owner's own data or script, a participant to a collaborative intelligence contract granting an entitlement to use a shielded asset where permissions in the contract allow the participant to grant the entitlement, etc.).

Technologically, an entitlement can be implemented similar to the way one or more collaborators can build and configure a data privacy pipeline, as described in more detail below. In the case where an asset owner or some other participant with the proper permission grants an entitlement to a beneficiary, the owner can use an interface (e.g., interface 112 of FIG. 1) to designate an asset, a beneficiary, and any entitlement constraints or policies. In some embodiments, the grantor of an entitlement may build, configure, and deploy the entitlement without any participation from the beneficiary. In other embodiments, the grantor may grant permission to the beneficiary to collaborate to build and configure the entitlement (e.g., using parameterized access control on an element-by-element basis). In some embodiments, the beneficiary may initiate a request for an entitlement, and the request can be routed to the potential grantor for approval and/or configuration.

Entitlements are one possible building block that can enable different kinds of multi-participant pipelines. Similar to the way a data privacy pipeline can be thought of as template or a pattern that can be triggered and spun up by an authorized participant, a granted entitlement can be thought of as a template or a pattern that can be triggered and spun up by an authorized beneficiary. Thus, a beneficiary can build upon a granted entitlement, for example, by using the entitlement output when building and configuring a pipeline such as a data privacy pipeline. In the example illustrated in FIG. 4, B and C collaborate to build pipeline 440, which serves as a basis for a contractual agreement among the two participants. When building pipeline 440, B can use the output entitlement 430 from A as one of the inputs into the fuse operation to operate on similar data as in the implementation of pipeline 300 of FIG. 3. The difference between pipeline 300 and pipeline 440 is that A no longer needs to participate in building, configuring, or approving pipeline 440. In this example, when an authorized participant to pipeline 440 (e.g., B or C) triggers the pipeline, A's data is accessed, aggregated 420, and output 430 into pipeline 440, which fuses the output 430 with B's and C's data. In embodiments where entitlement 410 serves as the basis for a contractual agreement between A and B, and pipeline 440 serves as the basis of a contractual agreement between B and C, the combination of the entitlement 410 with pipeline 440 can be thought of as a multi-contract, multi-participant pipeline 400. FIG. 5C discussed below depicts another possible multi-contract, multi-participant pipeline 530.

Figure 5A:
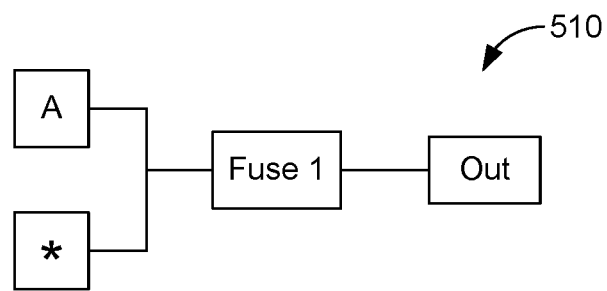
FIGS. 5A-5C are block diagrams of example entitlements used to build a multi-contract, multi-participant pipeline, in accordance with embodiments described herein.
Figure 5B:
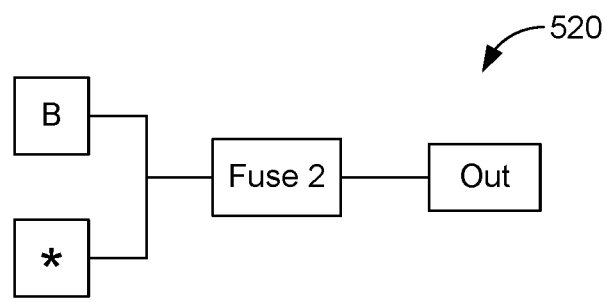
Figure 5C:
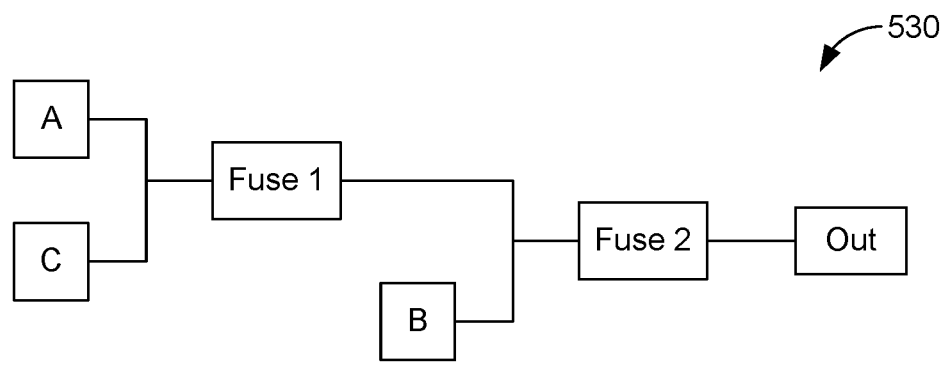

FIGS. 5A-5C illustrate the use of entitlements to build a multi-contract, multi-participant pipeline, in accordance with embodiments described herein. FIGS. 5A and 5B illustrate example entitlements 510 and 520. Although these are described as entitlements, they can additionally or alternatively be implemented as data privacy pipelines, some portion thereof, or some other shielded asset. In the example illustrated in FIGS. 5A and 5B, A is the owner of the fuse 1 script, and B is the owner of the fuse 2 script. A can grant an entitlement 510 to any beneficiary (indicated as an asterisk) to access and/or use the fuse 1 script, and B can grant an entitlement 520 to any beneficiary (indicated as an asterisk) to access and/or use the fuse 2 script. Assume C has been granted the entitlements 510 and 520. Now, C can build its own pipeline 530 that includes both fuse 1 and fuse 2 script. Pipeline 530 is configured to first fuse C's data with A's data using A's fuse 1 script, then fuse the output with B's data using B's fuse 2 script. When C triggers pipeline 530, A's data and B's data are accessed, A's data is fused with C's data, and the output is fused with B's data. In embodiments where entitlement 510 serves as the basis for a contractual agreement between A and C, and entitlement 520 serves as the basis for a contractual agreement between B and C, the pipeline 530 constructed by C using multiple contracts with multiple participants can be thought of as another example of a multi-contract, multi-participant pipeline.

Figure 6:
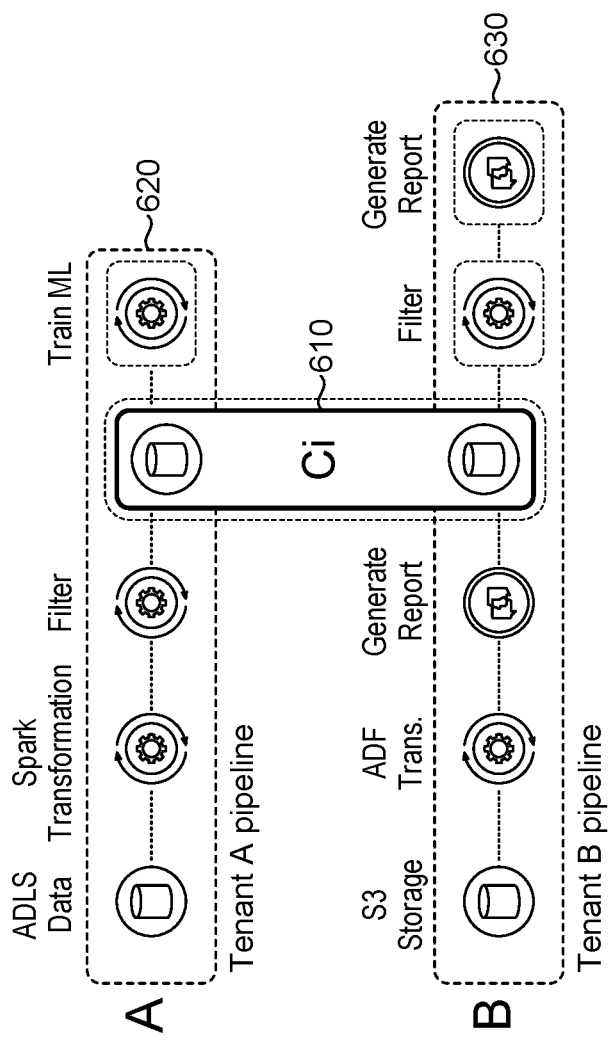
FIG. 6 is a block diagram of an example cross-environment pipeline, in accordance with embodiments described herein.

In some embodiments, a data pipeline that spans multiple environments may be built and configured. Generally, once a participant is granted access to a shielded asset that is required to exist (e.g., datasets) or execute (e.g., scripts) within a data trustee environment, the participant may build off that asset. Although that asset may be restricted to the data trustee environment, a data pipeline that relies on or otherwise uses the asset may include some pre or post-processing steps that need not occur in the data trustee environment. FIG. 6 illustrates an example cross-environment pipeline, in accordance with certain embodiments. In this example, A and B have their own data pipelines 620 and 630 that are configured to feed data into a data privacy pipeline 610 (or some other shielded asset) that A and/or B have built and configured. For example, A's data pipeline 620 may be configured to perform some pre-processing by reading from cloud storage, performing a transformation, and filtering the results before feeding the filtered results into the data privacy pipeline 610. B's data pipeline 630 may be configured to read data from B's cloud storage account, transform it, generate a report, and feed the report into data privacy pipeline 610. In this example, data privacy pipeline 610 can pull in A's filtered results and B's report, perform some agreed upon computation to derive an insight (collaborative intelligence) without exposing each other's data, and the insight can be output back into A's and B's data pipelines 620 and 630. In A's data pipeline 620, the insight is used to train a machine learning model. In B's data pipeline 630, the insight is filtered and used to generate a report. In this example, data privacy pipeline 610 is restricted to a data trustee environment, while A's data pipeline 620 and B's data pipeline 630 cross the data trustee environment. Data pipelines 620 and 630 can therefore be considered cross-environment pipelines.

Figure 7:
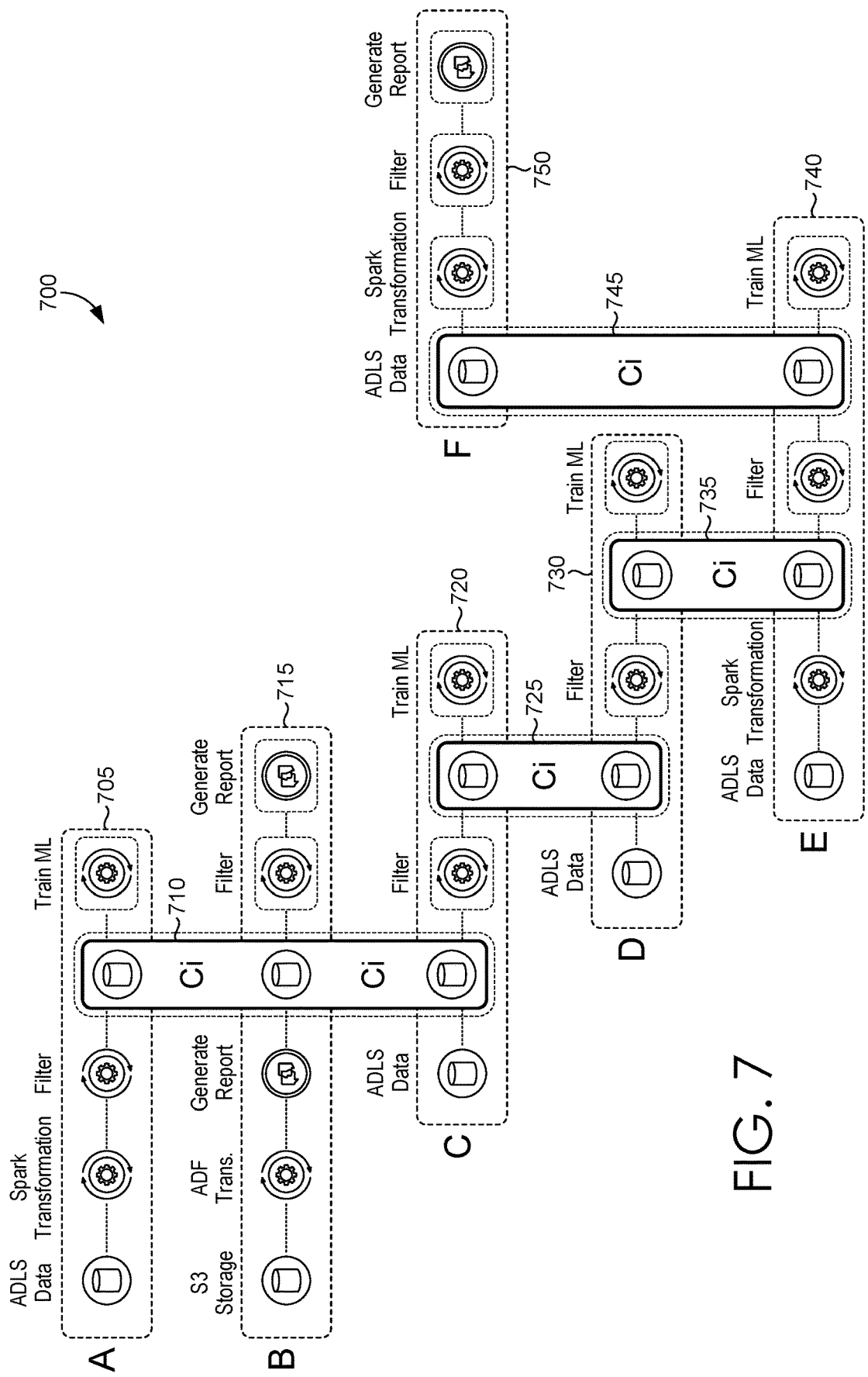
FIG. 7 is a block diagram of an example multi-contract, multi-participant pipeline, in accordance with embodiments described herein.

Generally, entitlements, cross-environment pipelines, and/or shielded assets governed by different collaborative intelligence contracts (e.g., template data privacy pipelines) can be used to build various types of multi-contract, multi-participant pipelines. FIG. 7 illustrates an example multi-contract, multi-participant pipeline, in accordance with certain embodiments. In this example, participants A, B, C, D, E, and F each have their own cross-environment data pipelines 705, 715, 720, 730, 740, and 750, respectively, and certain participants have also collaborated to build and configure various data privacy pipelines (or some other shielded asset). A scenario like this could occur in any number of industries. For example, participants A, B, C, D, E, and F could be hospitals and researchers collaborating to try to identify a treatment for cancer. Some of the participants may want to contribute algorithms, the rest may want to contribute medical data, and they all want to spin up a pipeline to derive insights without exposing the underlying data or algorithms. To accomplish this, certain combinations of participants can collaborate to build and configure data privacy pipelines.

In FIG. 7, A, B, and C are participants to data privacy pipeline 710, which operates on and derives collaborative intelligence for A's, B's, and C's data pipelines 705, 715, and 720. C and D are participants to data privacy pipeline 725, which operates on and derives collaborative intelligence for C's and D's data pipelines 720 and 730. D and E are participants to data privacy pipeline 735, which operates on and derives collaborative intelligence for D's and E's data pipelines 730 and 740. E and F are participants to data privacy pipeline 745, which operates on and derives collaborative intelligence for E's and F's data pipelines 540 and 550, and so on. In combination, these pipelines form one large multi-contract, multi-participant pipeline 700 that serves the combined business goals of the various participants. Although in this example, the participants are described as knowing each other, this need not be the case. For example, A and B need not know that C is collaborating with D, C need not know that D is collaborating with E, and so on.

Another way to implement this type of pipeline is for all participants A, B, C, D, E, and F to collaborate to build and configure one master data privacy pipeline that serves as the basis for a single contract among all the participants. However, by breaking down the data flow into smaller, more discrete units, it becomes easier to facilitate agreements among fewer participants and governing smaller units of collaboration. Thus, multi-contract, multi-participant pipelines can encourage data sharing and development of collaborative intelligence, while ensuring data privacy and facilitating control and access to shared data.

Example Flow Diagrams

Figure 8:
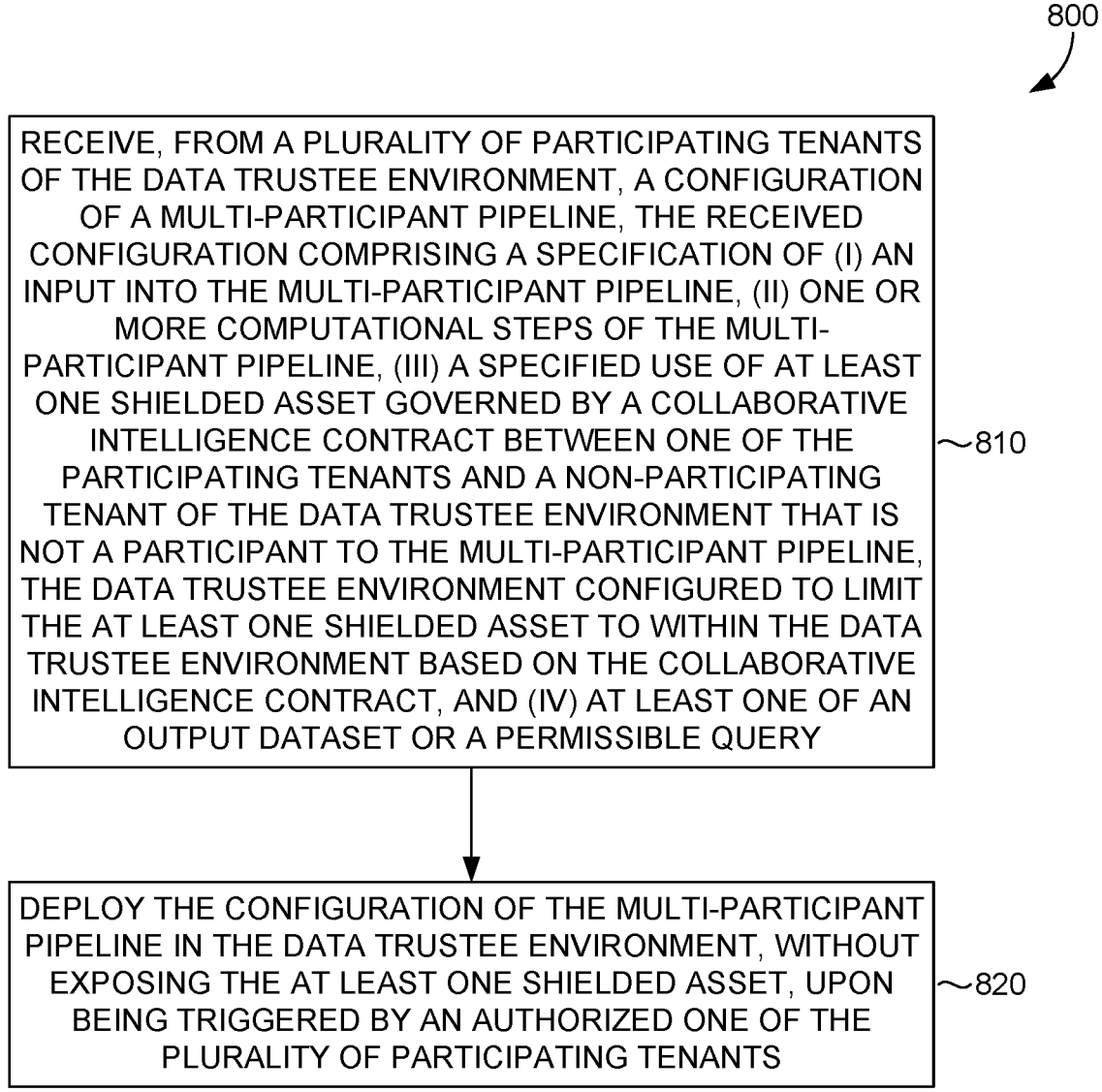
FIGS. 8-10 are flow diagrams showing example methods for generating a data privacy pipeline, in accordance with embodiments described herein.
Figure 9:
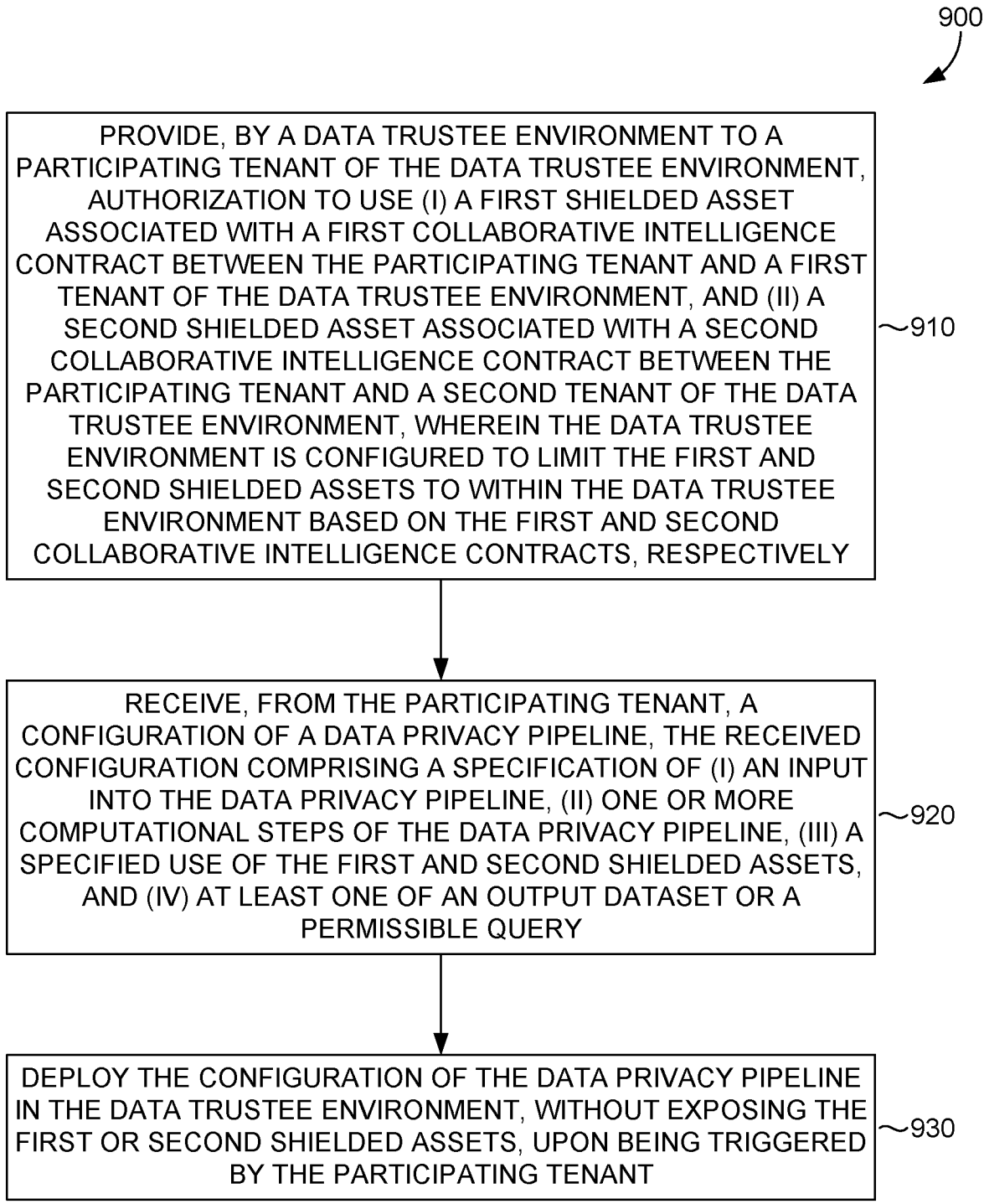
Figure 10:
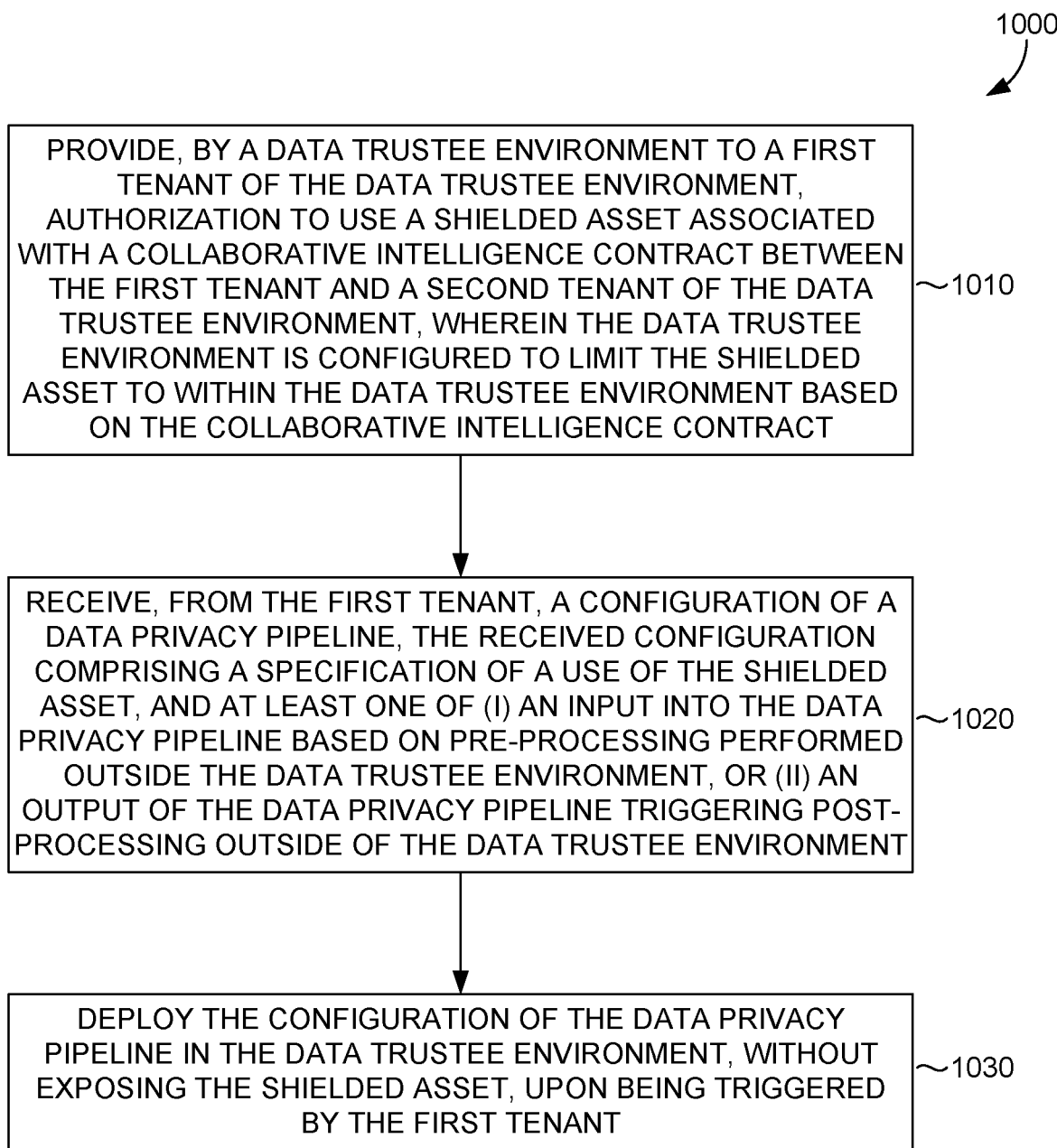

With reference to FIGS. 8-10, flow diagrams are provided illustrating various methods relating to generation of a data privacy pipeline. The methods can be performed using the collaborative intelligence environment described herein. In embodiments, one or more computer storage media having computer-executable instructions embodied thereon can, when executed by one or more processors, cause the one or more processors to perform the methods in the autonomous upgrade system.

Turning now to FIG. 8, a flow diagram is provided that illustrates a method 800 for generating a data privacy pipeline. Initially at block 810, a configuration of a multi-participant pipeline is received from a plurality of participating tenants of a data trustee environment. In this example, the received configuration includes a specification of (i) an input into the multi-participant pipeline, (ii) one or more computational steps of the multi-participant pipeline, (iii) a specified use of at least one shielded asset governed by a collaborative intelligence contract between one of the participating tenants and a non-participating tenant of the data trustee environment that is not a participant to the multi-participant pipeline, the data trustee environment configured to limit the at least one shielded asset to within the data trustee environment based on the collaborative intelligence contract, and (iv) at least one of an output dataset or a permissible query. At block 820, the data trustee environment deploys the configuration of the multi-participant pipeline in the data trustee environment, without exposing the at least one shielded asset, upon being triggered by an authorized one of the plurality of participating tenants.

Turning now to FIG. 9, a flow diagram is provided that illustrates a method 900 for generating a data privacy pipeline. Initially at block 910, authorization is provided, by a data trustee environment to a participating tenant of the data trustee environment, to use (i) a first shielded asset associated with a first collaborative intelligence contract between the participating tenant and a first tenant of the data trustee environment, and (ii) a second shielded asset associated with a second collaborative intelligence contract between the participating tenant and a second tenant of the data trustee environment. In this example, the data trustee environment is configured to limit the first and second shielded assets to within the data trustee environment based on the first and second collaborative intelligence contracts, respectively. At block 920, a configuration of a data privacy pipeline is received from the participating tenant. In this example, the received configuration comprises a specification of (i) an input into the data privacy pipeline, (ii) one or more computational steps of the data privacy pipeline; (iii) a specified use of the first and second shielded assets, and (iv) at least one of an output dataset or a permissible query. Because the first shielded asset is governed by the first collaborative intelligence contract, and the second shielded asset is governed by the second collaborative intelligence contract, the data privacy pipeline can be considered a multi-contract pipeline because it makes use of shielded assets governed by multiple contracts. At block 930, the configuration of the data privacy pipeline is deployed in the data trustee environment, without exposing the first or second shielded assets, upon being triggered by the participating tenant.

Turning now to FIG. 10, a flow diagram is provided that illustrates a method 1000 for generating a data privacy pipeline. Initially at block 1010, authorization is provided, by a data trustee environment to a first tenant of the data trustee environment, to use a shielded asset associated with a collaborative intelligence contract between the first tenant and a second tenant of the data trustee environment. In this example, the data trustee environment is configured to limit the shielded asset to within the data trustee environment based on the collaborative intelligence contract. At block 1020, a configuration of a data privacy pipeline is received the first tenant. In this example, the received configuration comprises a specification of a use of the shielded asset, and at least one of (i) an input into the data privacy pipeline based on pre-processing performed outside the data trustee environment, or (ii) an output of the data privacy pipeline triggering post-processing outside of the data trustee environment. Because the data privacy pipeline can accept an input based on pre-processing performed outside the data trustee environment or on output triggering post-processing outside of the data trustee environment, it can be thought of as part of a cross-environment data pipeline that crosses the data trustee environment. At block 1030, the configuration of the data privacy pipeline is deployed in the data trustee environment, without exposing the shielded asset, upon being triggered by the first tenant.

Example Sandbox Interface for Building a Data Privacy Pipeline

Figure 11:
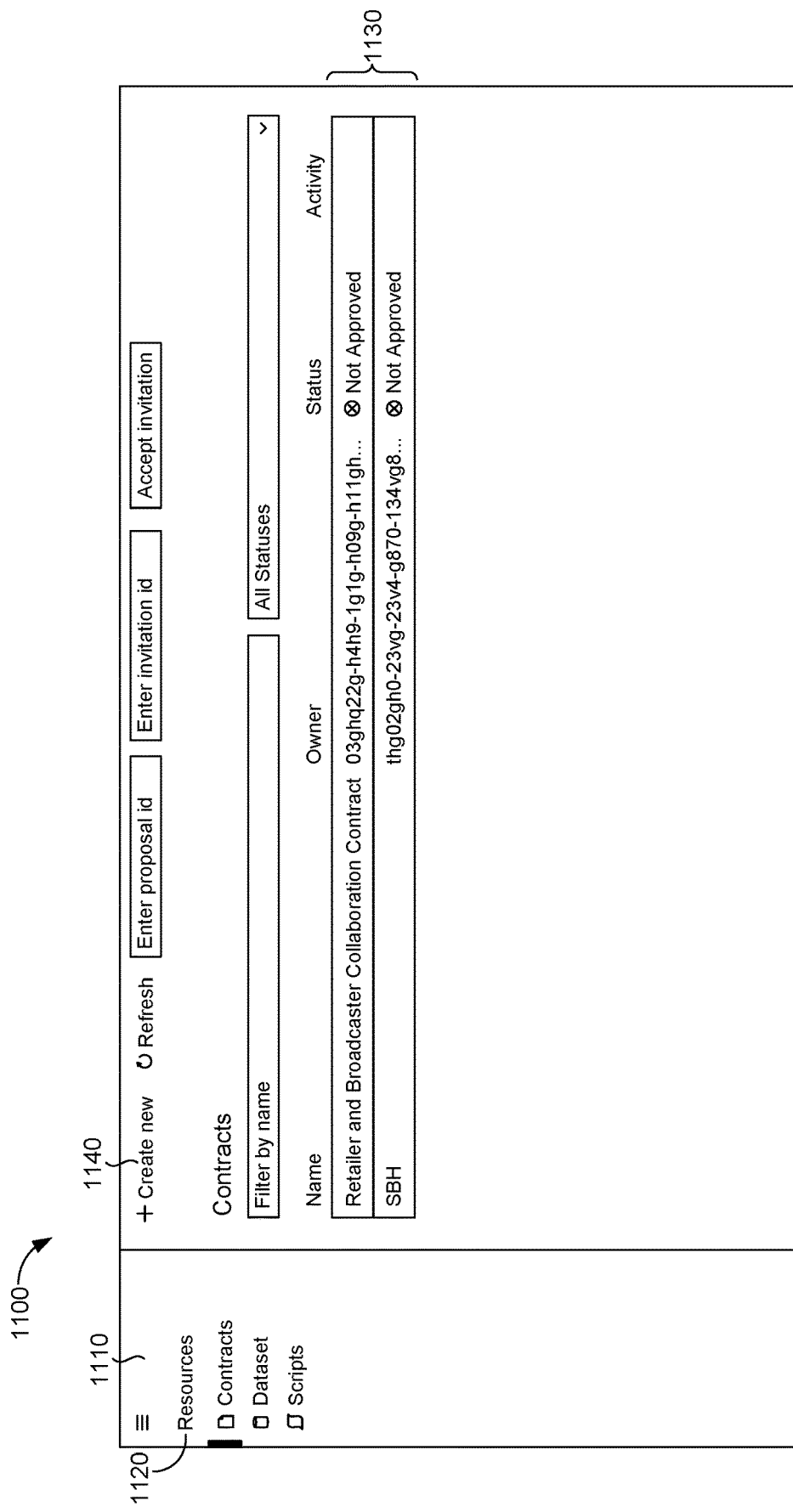
FIG. 11 is an illustration of an example user interface for browsing collaborative intelligence contracts, in accordance with embodiments described herein.

FIGS. 11-25 illustrate a variety of example user interfaces capable of receiving inputs for constructing and configuring a data privacy pipeline to generate collaborative data. FIG. 11 is an illustration of an example user interface 1100 for browsing collaborative intelligence contracts. User interface 1100 may be accessible through a portal of a distributed or cloud computing service, such as AZURE®, by Microsoft Corporation of Redmond, Wash. More specifically, a collaborative intelligence service may be associated with an authorized tenant account, thereby granting access to the collaborative intelligence service through the tenant account. User interface 1100 is an example interface that allows a user to browse assets that are available to the tenant account, such as existing collaborative intelligence contracts for which the tenant account is an authorized participant. For example, banner 1110 may provide a resources menu 1120 that allows a user to browse existing contracts, accessible datasets (e.g., stored by the tenant account), accessible scripts (e.g., stored by the tenant account), pipelines (e.g., for which the tenant account is authorized), jobs (e.g., initiated by, associated with, or otherwise accessible by a tenant account), queries (e.g., initiated by, associated with, or otherwise accessible by a tenant account), audit events (e.g., operations relevant to one of the foregoing resources that were initiated by, associated with, or otherwise accessible by a tenant account), and the like. In the example illustrated in FIG. 11, available contracts are selected for browsing from resources menu 1120, and user interface 1100 presents existing contracts 1130, including an indication of the status of each contract. The presented contracts 1130 may be selectable for viewing and/or editing. User interface 1100 may include an interaction element 1140 that accepts an input indicating a new contract should be created.

User interface 1100 provides an example interface for browsing collaborative intelligence contracts. Other interfaces corresponding to other resources are not depicted, but may be implemented with functionality corresponding to a resource being browsed. For example, a user interface configured to browse available scripts may allow filtering by name, owner, and/or script type (e.g., computational platform, category of functionality, and the like). In another example, a user interface configured to browse available datasets may present or otherwise make available (e.g., by clickable link or menu) information about the dataset, such as name, identifier, owner, storage location, creation time, last read time, last write time, tags associated with the dataset, and/or any other type of relevant information. Generally, a user interface configured to browse an available resource may include functionality that allows a user to create, select, edit, delete, grant access to, or otherwise manipulate properties of a particular resource. Example implementations of such functionality are described in more detail below.

Figure 12:
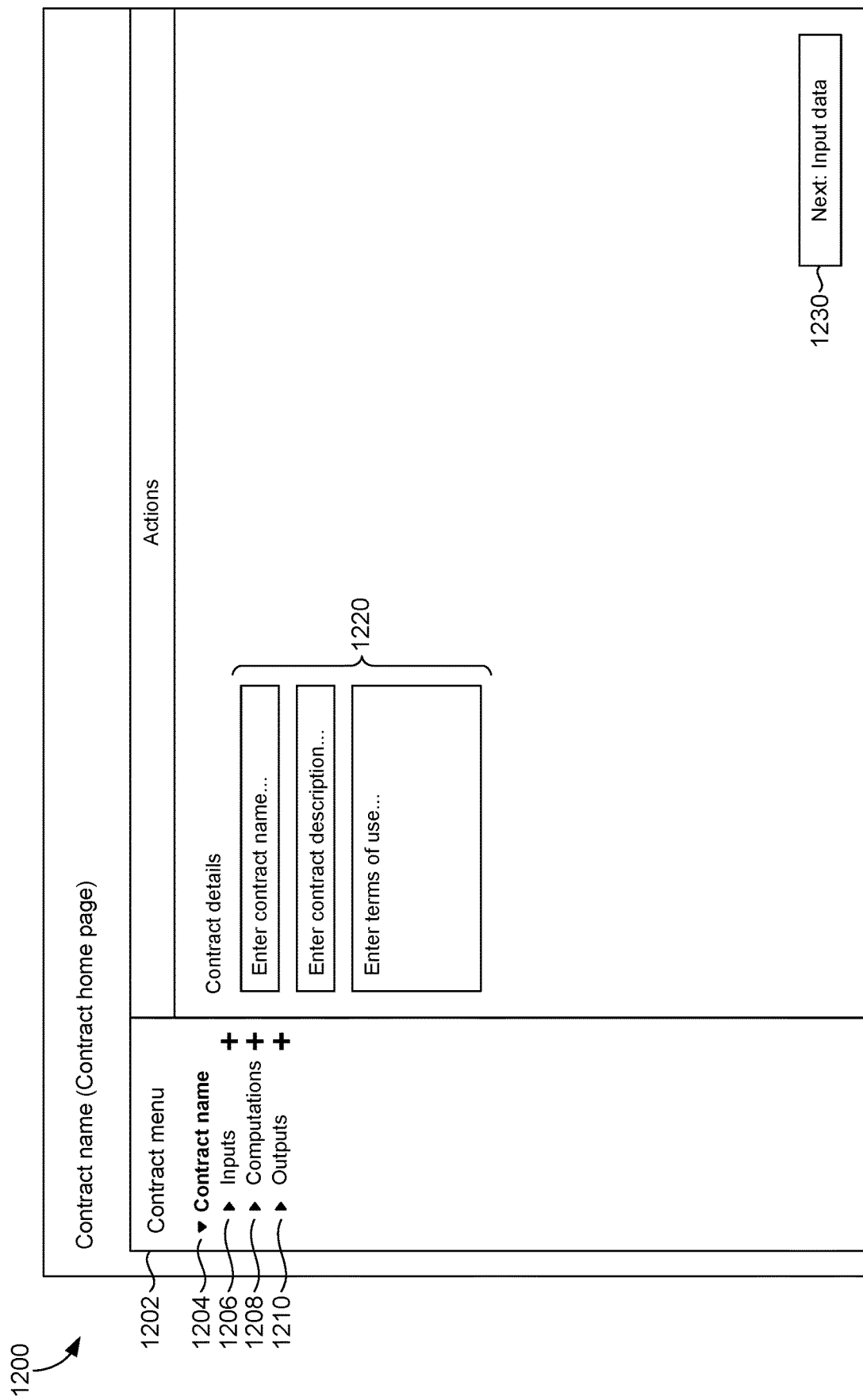
FIG. 12 is an illustration of an example user interface for naming a new collaborative intelligence contract, in accordance with embodiments described herein.

In some embodiments, when an input indicating a new contract should be created is received, a user interface may prompt for inputs that specify parameters of the new contract. For example, FIG. 12 is an illustration of an example user interface 1200 for naming a new collaborative intelligence contract. User interface 1200 may include a contract menu 1202 that presents a representation of the new contract. For example, contract menu 1202 may include a nested menu item 1204 representing the new contract. The nested menu item 1202 may be expanded to present selectable representations of the elements of the new contract, such as inputs 1206, computations 1208, and outputs 1210. Generally, menu items from contract menu 1202 may be similarly expandable, and selecting a menu item from contract menu 1202 may prompt a user to enter or edit parameters corresponding to the selected menu item. For example, selecting menu item 1204 representing the new contract can prompt for inputs (e.g., via input fields 1220) specifying details for the new contract. In this example, the inputs include contract name (e.g., "Advertising efficiency"), a brief description of the contract (e.g., "how well ads work"), and a textual description of the proposed terms of use. When the user is finished, selection of an interaction element (e.g., next button 1230) can navigate the user to a subsequent screen. Similar or other navigational interaction elements may be presented to navigate through a series of related pages, screens, and/or other interface elements.

Figure 13:
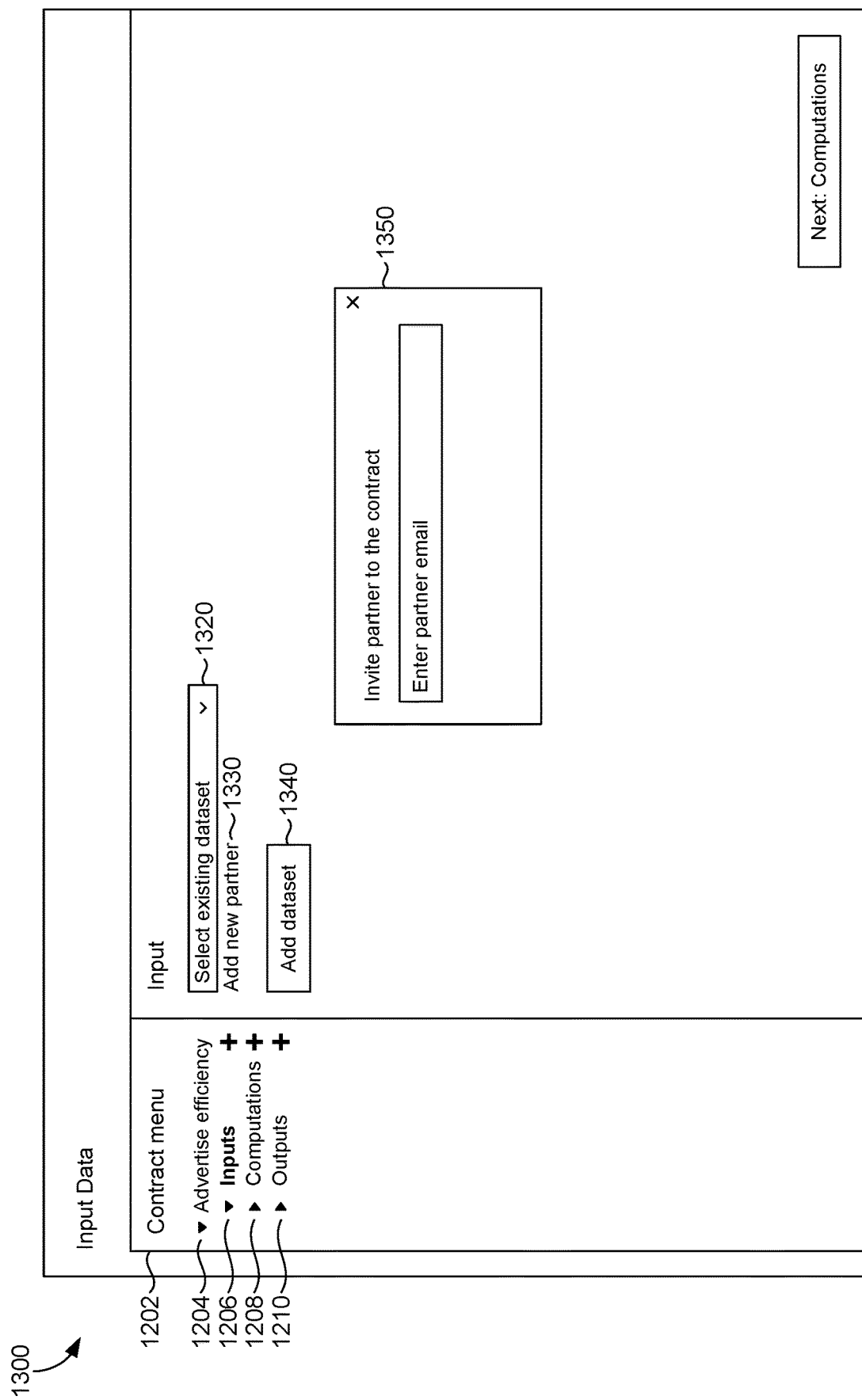
FIG. 13 is an illustration of an example user interface for specifying inputs to a data privacy pipeline associated with a collaborative intelligence contract, in accordance with embodiments described herein.
Figure 14:
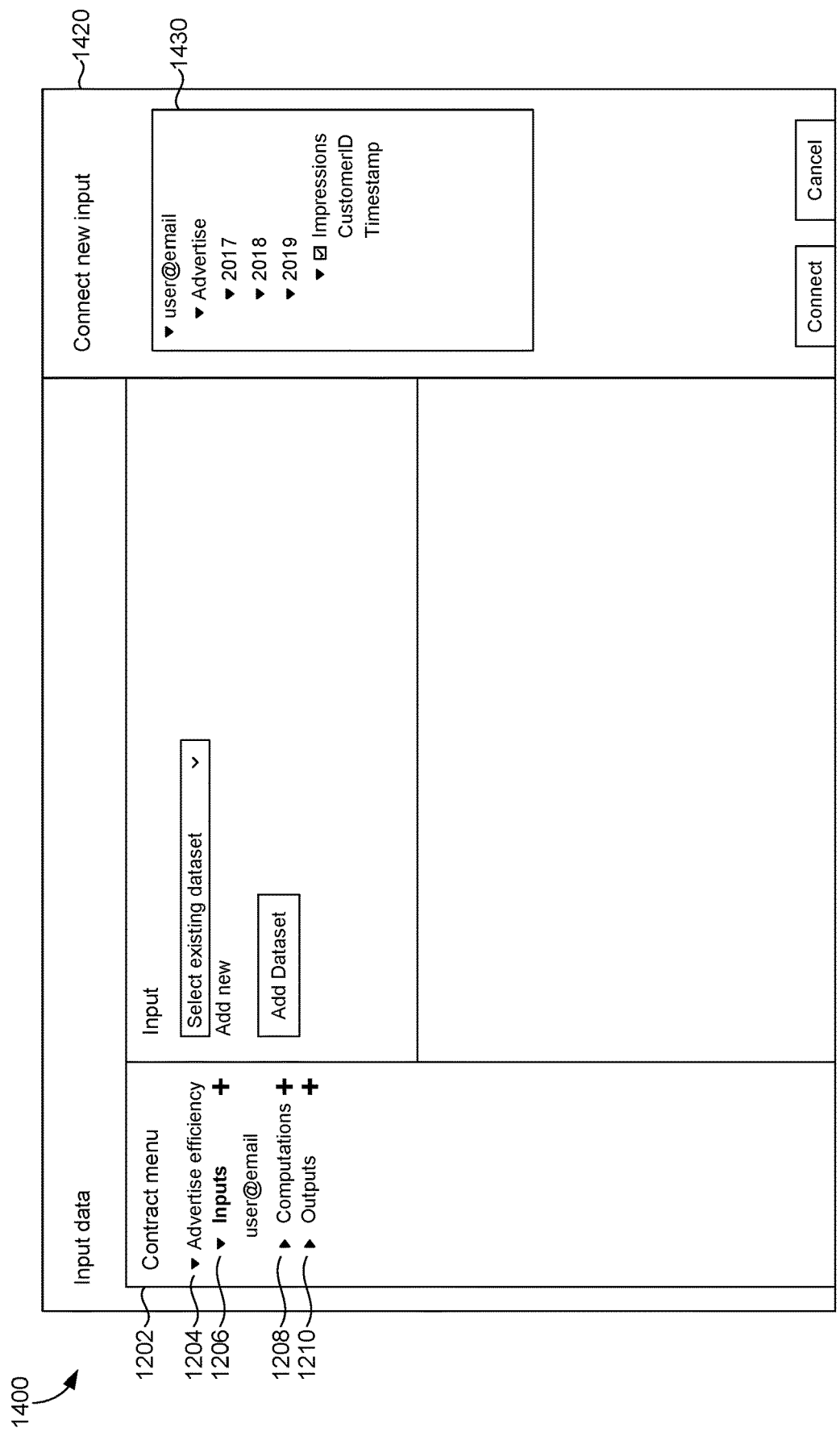
FIG. 14 is an illustration of another example user interface for specifying inputs to a data privacy pipeline associated with a collaborative intelligence contract, in accordance with embodiments described herein.

FIG. 13 is an illustration of an example user interface 1300 for specifying inputs to a data privacy pipeline associated with a collaborative intelligence contract. In user interface 1300, menu item 1204 has been renamed to reflect the specified name of the new contract (Advertise efficiency). Selection of menu item 1206 for the contract inputs may prompt the user to enter parameters for the inputs. For example, interaction element 1320 can allow a user to select an existing, accessible dataset (e.g., stored by the tenant account). In another example, interaction element 1330 can allow a user to invite a contributor to the contract or otherwise associate an account with the contract (e.g., by specifying an email address or some other indication of a particular account in popup window1350). In yet another example, interaction element 1340 can allow a user to connect a new input dataset. For example, selection of interaction element 1340 can cause a presentation of a directory of available datasets (e.g., local datasets available for upload, authorized datasets associated with a participating contributor account, datasets associated with a selected project or contract). FIG. 14 depicts an example user interface 1400 with a panel 1420 that presents a directory 1430 of available datasets. An available dataset (e.g., Impressions) can be selected and connected, to associate the selected dataset with an active contract (e.g., associated with a selected element in contract menu 1202).

Figure 15A:
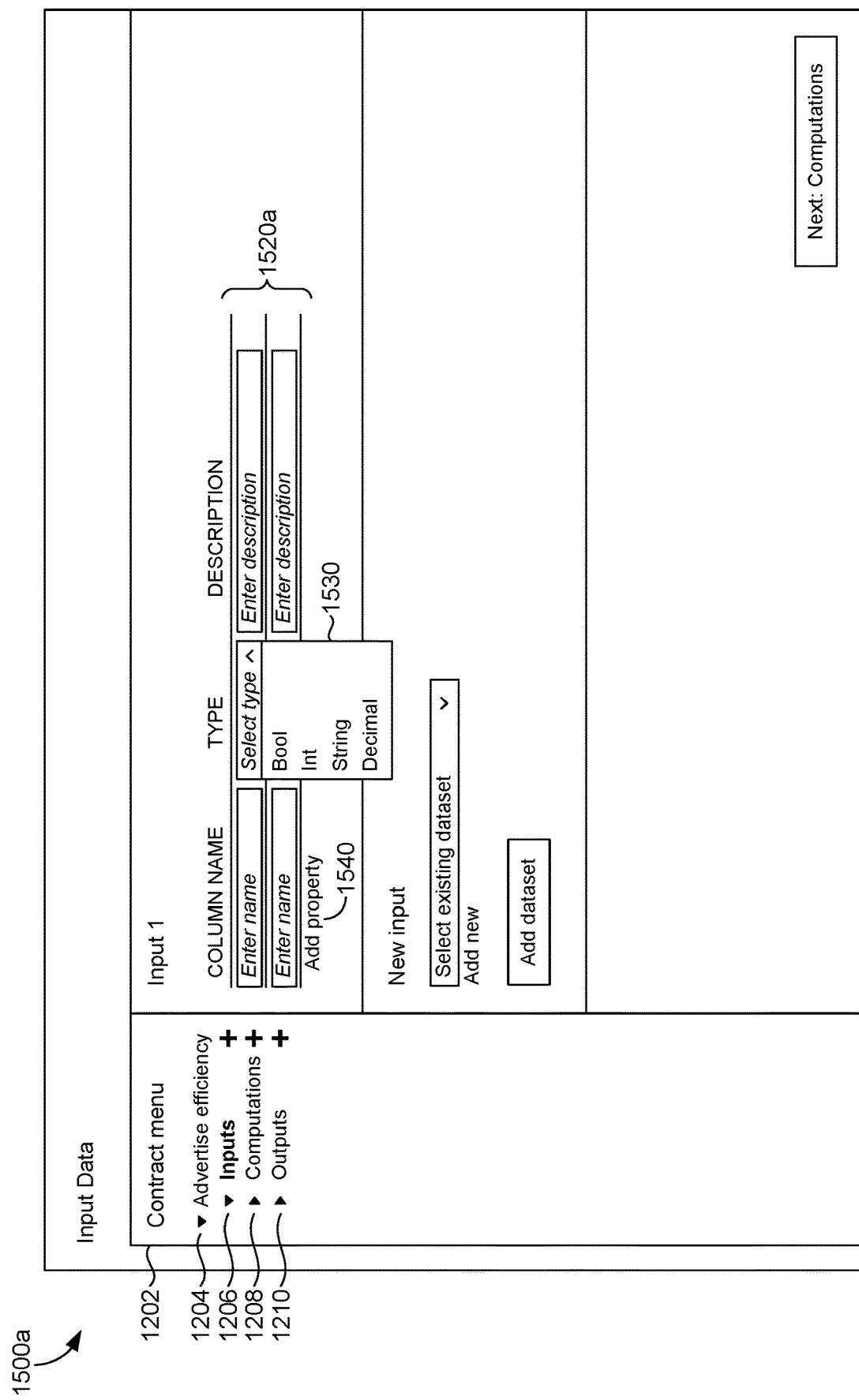
FIGS. 15A-B are illustrations of example user interfaces for specifying an input schema for an input dataset associated with a collaborative intelligence contract, in accordance with embodiments described herein.
Figure 15B:
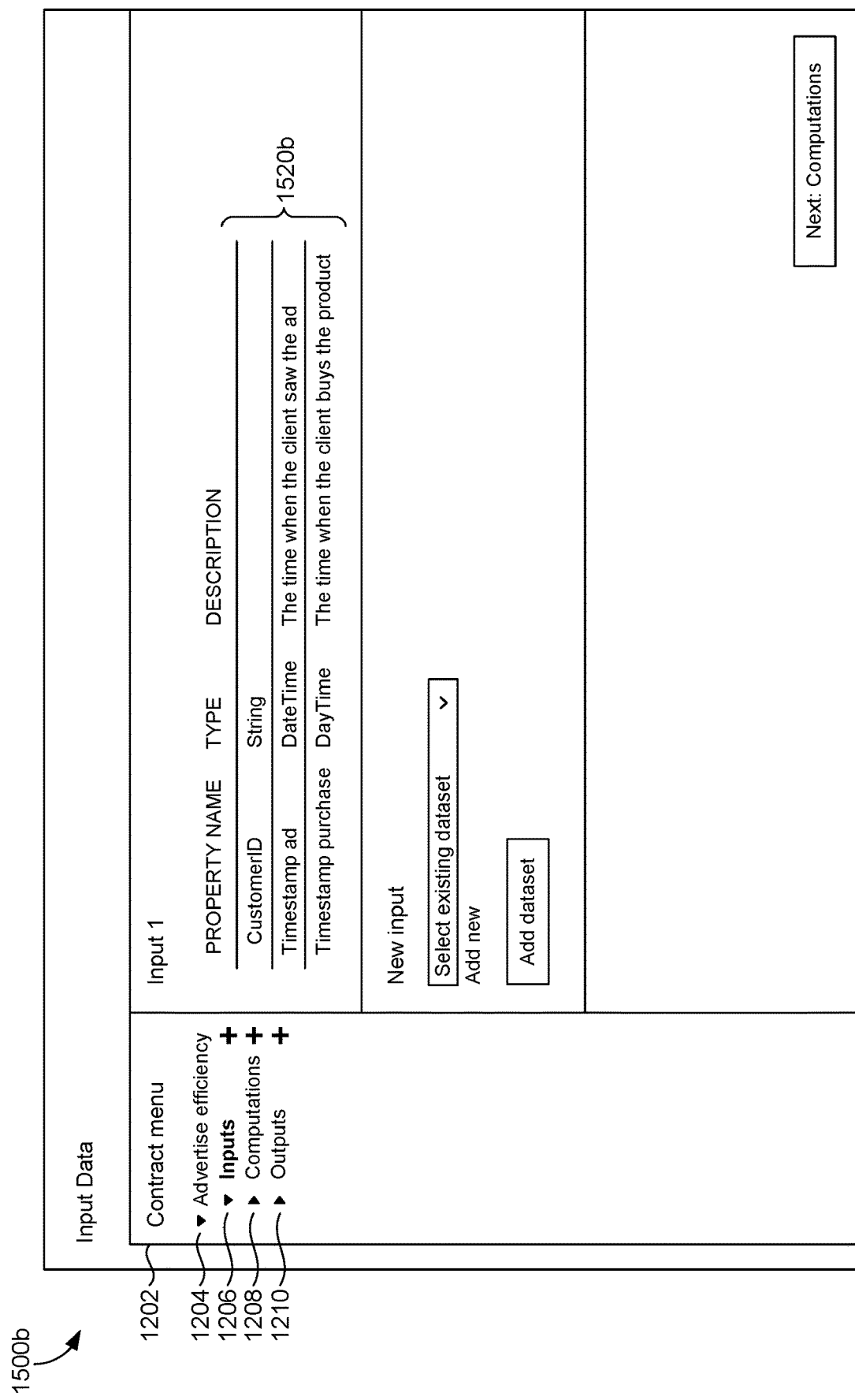

In some embodiments, an input schema for an input dataset may be specified. FIGS. 15A-B illustrate example user interfaces 1500*a* and 1500*b* for specifying an input schema. User interface 1500*a* of FIG. 15A includes input fields 1520*a* that allow a user to define parameters of an input schema for an input dataset. For example, a specified input schema may include an identification of a particular component of an input dataset (e.g., variable, array, vector, matrix, row, column, property) and one or more corresponding attributes (e.g., name, data type, description, dimensionality). If a user is connecting a new input dataset, input fields 1520*a* may allow the user to specify particular portions of the input dataset to connect (e.g., designated columns). If a user is specifying a placeholder dataset, input fields 1520*a* may allow the user to specify an input schema for an input dataset to be provided at some point in the future. In some embodiments, a menu of available options (e.g., dropdown menu 1530) may be limited to a set of detected or compatible values. In some embodiments, new properties can be added to the set of input fields 1520*a* (e.g., by selecting an interaction element such as add property 1540). User interface 1500*b* of FIG. 15B illustrates an example in which input fields 1520*b* are automatically populated (e.g., detected from a connected input dataset). These are just a few examples, and other variations for specifying an input schema for an input dataset are contemplated.

Figure 16A:
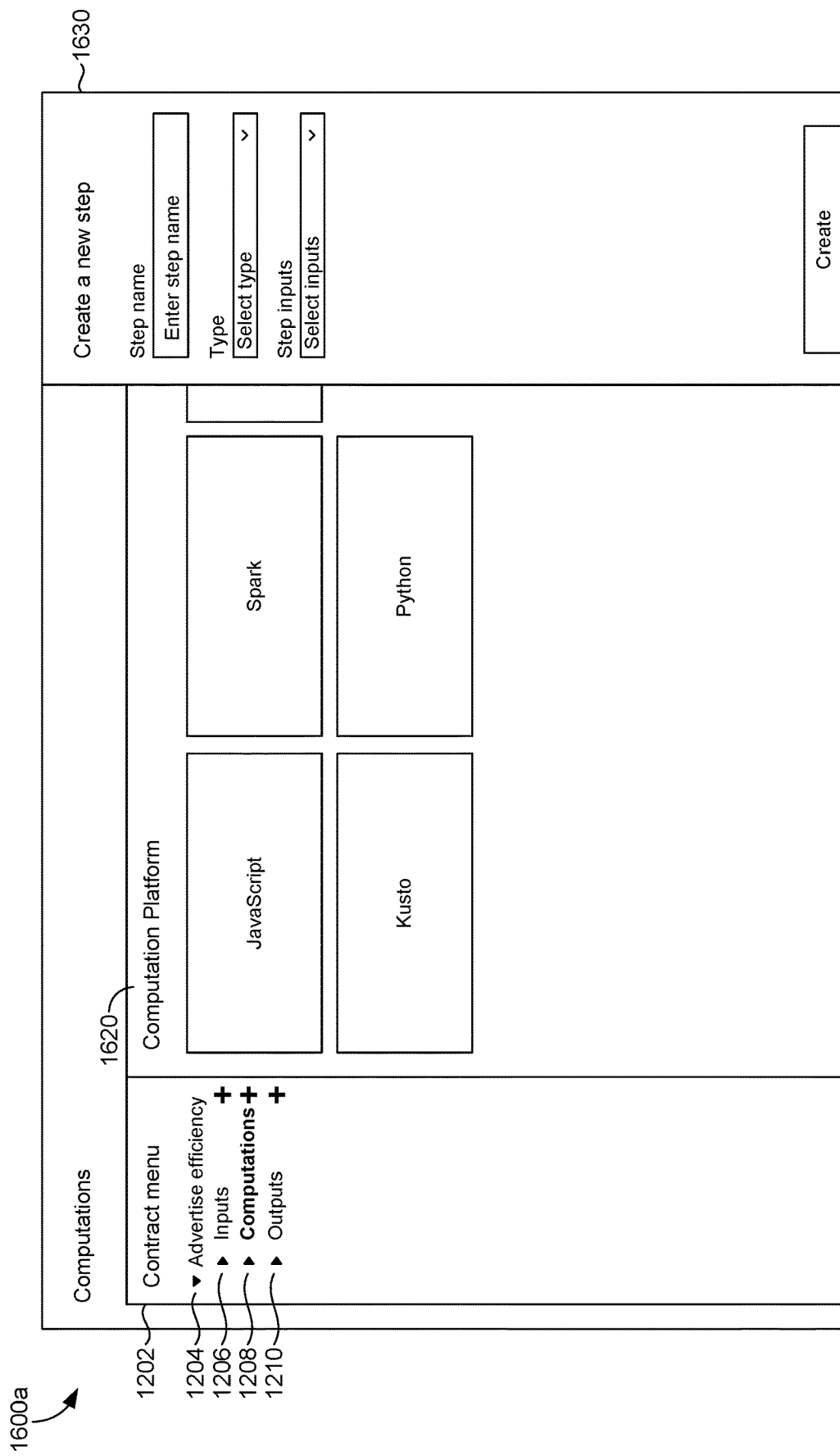
Figure 16B:
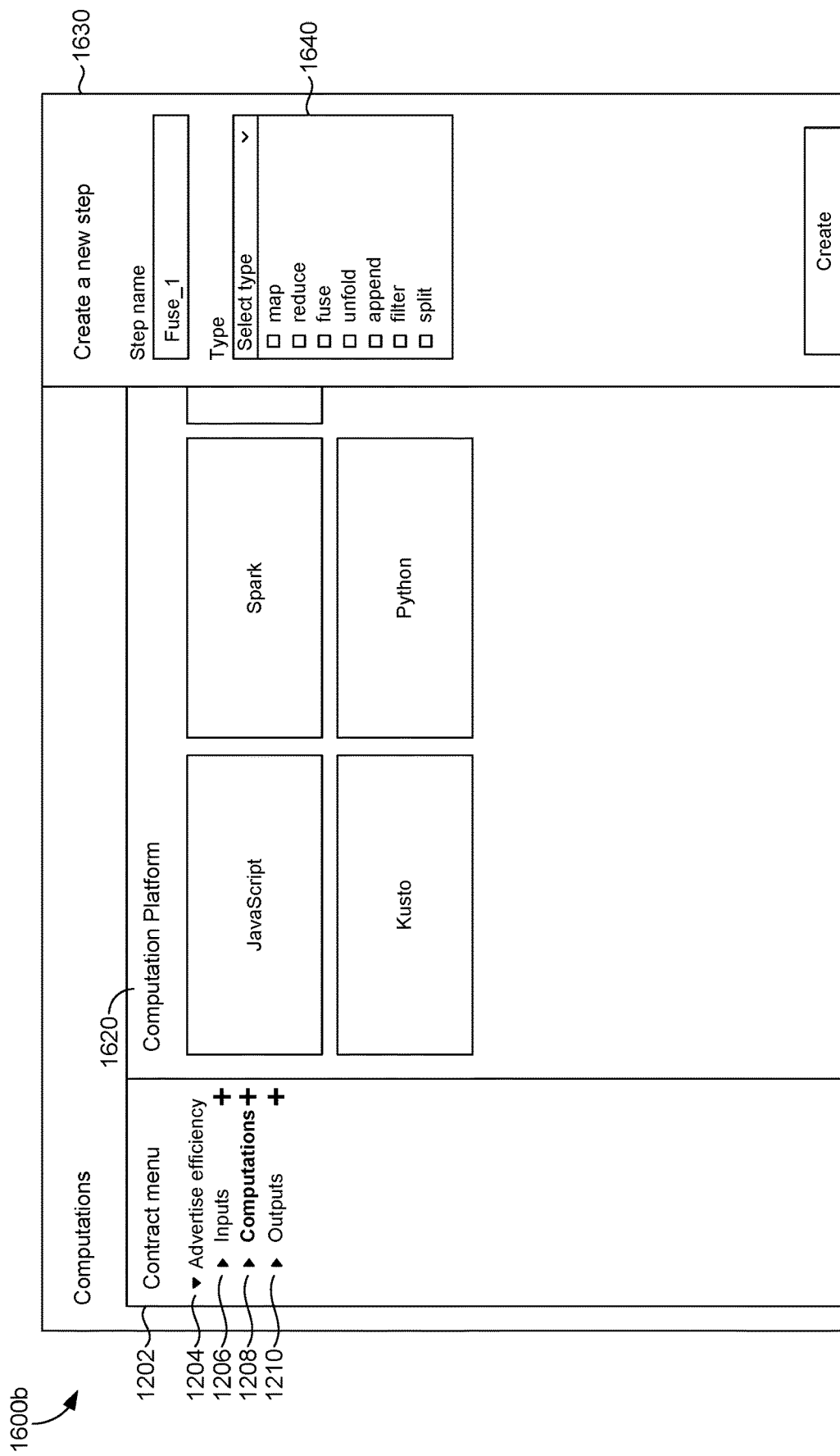
Figure 16C:
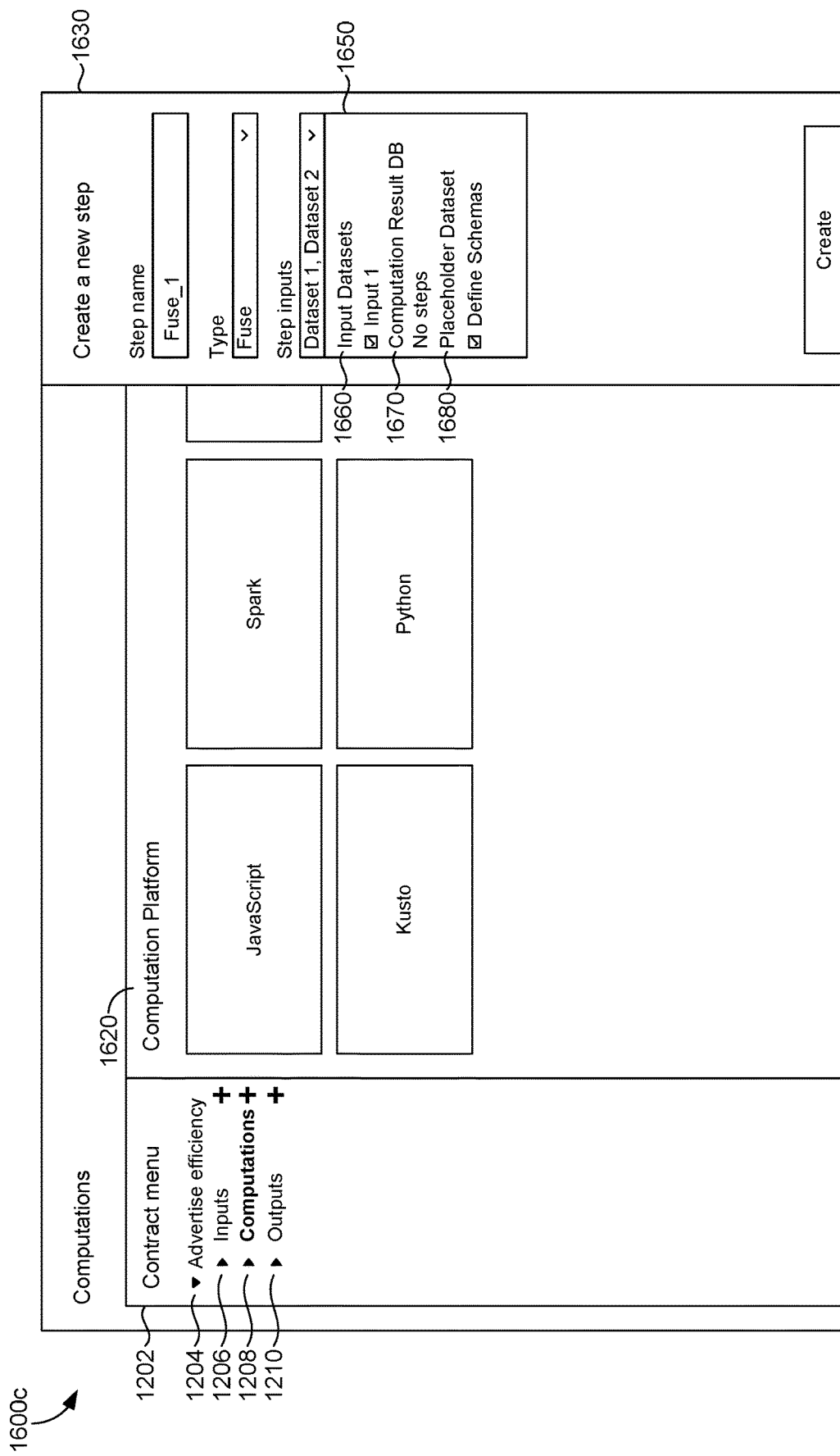

FIGS. 16A-C are illustrations of example user interfaces 1600*a*, 1600*b*, and 1600*c* for creating a new computational step in a data privacy pipeline associated with a collaborative intelligence contract. Generally, selection of an interaction element associated with a menu item in contract menu 1202 (e.g., the plus sign next to the computations menu item 1208 in contract menu 1202 in FIG. 16A) can prompt a user to specify parameters for an associated new element (e.g., a new computational step). For example, panel 1620 of FIG. 16A can prompt a user to select a compatible or supported computation platform capable of executing a specified computation step. Panel 1630 can prompt a user to select parameters such as step name, step type, and step inputs. FIG. 16B illustrates an example new step called Fuse_1. In FIG. 16B, the step type input field includes an interactive dropdown menu 1640 that accepts a selection of one or more template computations. In FIG. 16C, a template fuse computation has been selected for the step type. Also in FIG. 16C, the step inputs field includes an interactive dropdown menu 1650 that accepts a selection of one or more computational step inputs. For example, available computational step inputs may include connected inputs 1660, computational results 1670 (i.e., an output of an existing computational step associated with the project or contract), and placeholder datasets 1680. In FIG. 16C, dropdown menu 1650 presents an indication that there are no computational results available (e.g., because, in this example, Fuse_1 is the first computational step for this particular contract). In the example illustrated by FIG. 16C, the user has selected two inputs to the Fuse_1 computational step: one of the input datasets 1660 (i.e., the input dataset that was connected in association with FIG. 14) and a placeholder dataset 1680 (i.e., an indication to define an input schema for a placeholder dataset). These and other variations for specifying inputs to a computational step may be implemented.

Figure 17A:
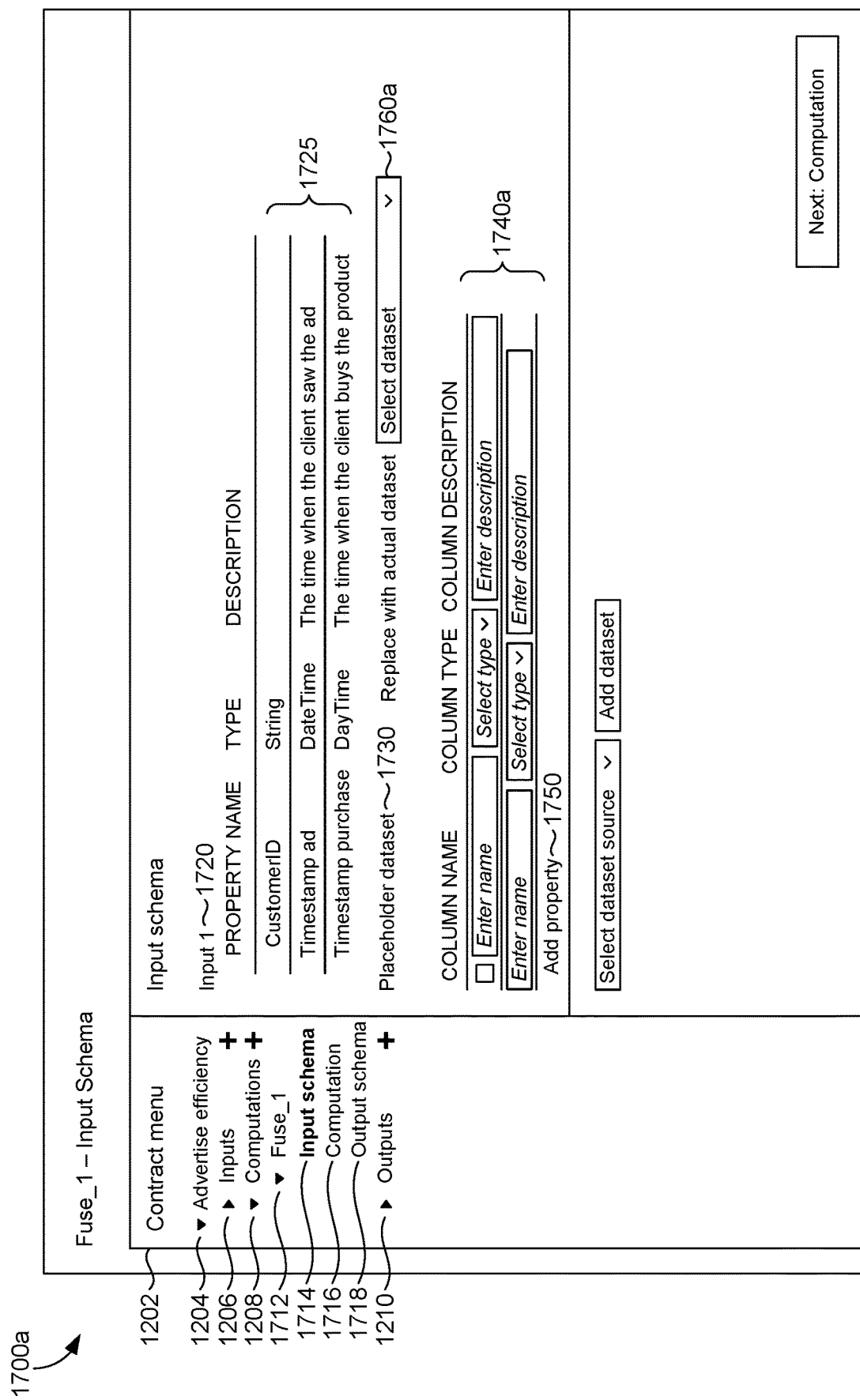
FIGS. 17A-B are illustrations of example user interfaces for specifying an input schema for a computational step in a data privacy pipeline associated with a collaborative intelligence contract, in accordance with embodiments described herein.
Figure 17B:
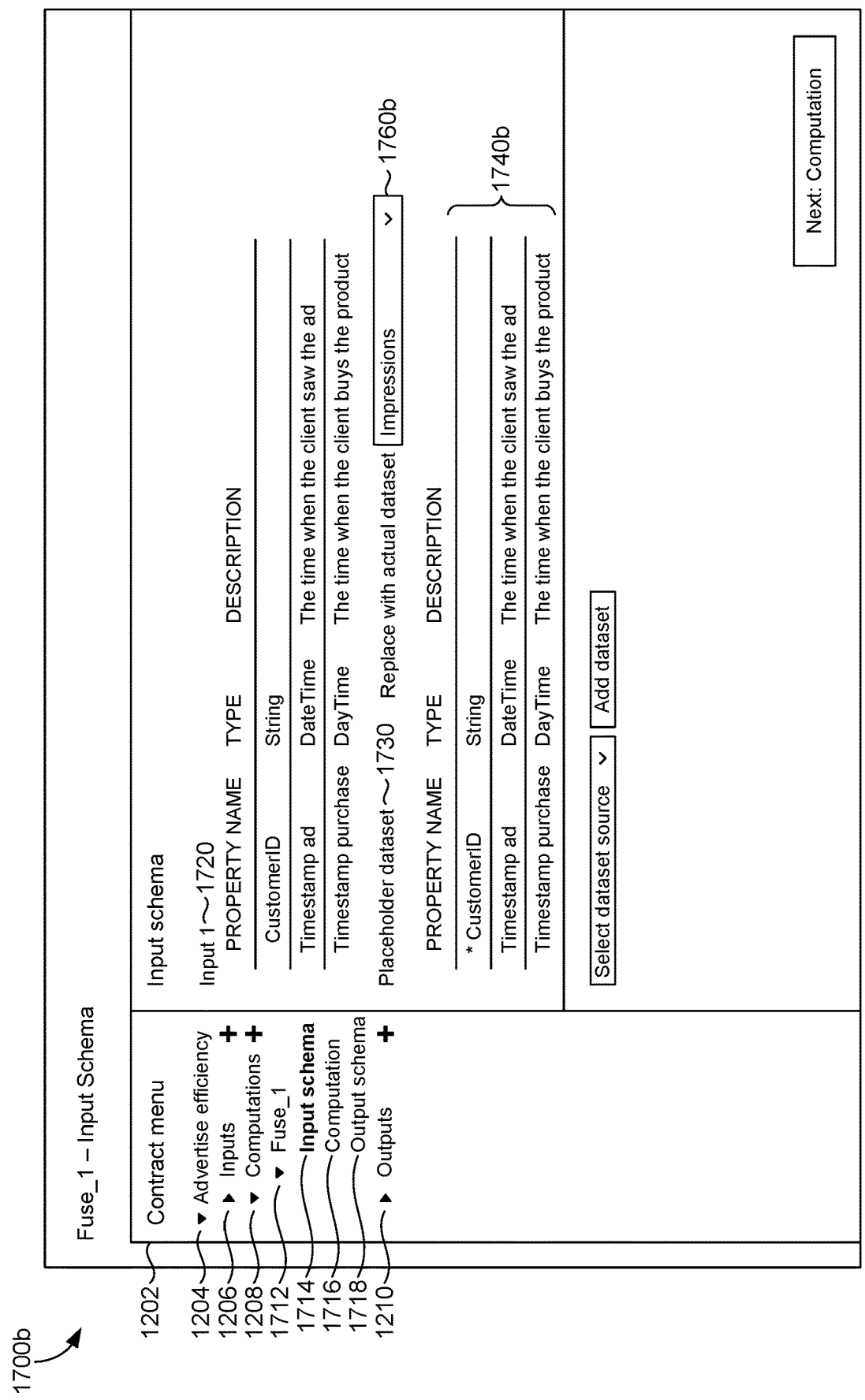

Continuing with the present example, once the user selects a set of inputs to the computational step, the user can be prompted to specify an input schema for the inputs. FIGS. 17A-B are illustrations of example user interfaces 1700*a* and 1700*b* for specifying an input schema for a computational step. Note that in contract menu 1202, nested menu item 1712 has been added representing the Fuse_1 step. As with other menu items in contract menu 1202, nested menu item 1712 may be expanded to present selectable representations of the elements of the associated computational step, such as input schema 1714, computation 1716, and output schema 1718. In user interface 1700*a* of FIG. 17A, menu item 1714 for the input schema to the Fuse_1 computational step is selected. User interface 1700*a* presents an input schema 1725 for input dataset 1720 (which may have been previously specified or otherwise identified) and input fields 1740*a* for the input schema for placeholder dataset 1730 (which may be filled out via user interface 1700*a*). In some embodiments, new properties can be added to the set of input fields 1740*a* for the input schema (e.g., by selecting an interaction element such as add property 1750). In some embodiments, user interface 1700*a* may include an interaction element that allows a user to replace a selected input with another one. For example, dropdown menu 1760*a* may allow a user to replace placeholder dataset 1730 with an available input dataset or a computational result. User interface 1700*b* of FIG. 17B illustrates a selection of a connected input dataset (Impressions) to replace placeholder dataset 1730, and input fields 1740*b* have been updated to reflect the input schema for the selected input dataset. User interfaces 1700*a* and 1700*b* can also be thought of as presenting a summary of the step inputs for a particular computational step. Generally, interaction elements (e.g., a button, clickable link, clickable entry) may be provided for a particular step input that allows a user to rename the step input, remove the step input, unassociate a dataset with the step input (i.e., convert the input to a placeholder dataset), associate a dataset with the step input (i.e., populate a placeholder dataset), edit a schema for the step input, or otherwise manipulate properties of the step input.

Turning now to FIGS. 18A-C, FIGS. 18A-C illustrate example user interfaces 1800*a*, 1800*b*, and 1800*c* for specifying a computation for a computational step. In user interface 1800*a* of FIG. 18A, menu item 1716 for the computation to the Fuse_1 computational step is selected. User interface 1800*a* includes an interaction element 1820 that allows a user to select an available computation (e.g., via a dropdown menu) and an interaction element 1825 that allows a user to create a new one. User interface 1800*b* illustrates an example in which a user selects to create a new computation. In response to such a selection, a user interface such as user interface 1800*b* may be presented with a script editor and/or a compiler for a specified computational platform. The embodiment illustrated in FIG. 18B includes a script editor, a compiler, and an interaction element 1830 that allows a user to specify whether the specified computation should be visible to others. FIG. 18C illustrates an example script 1840 that may be provided.

Figure 19A:
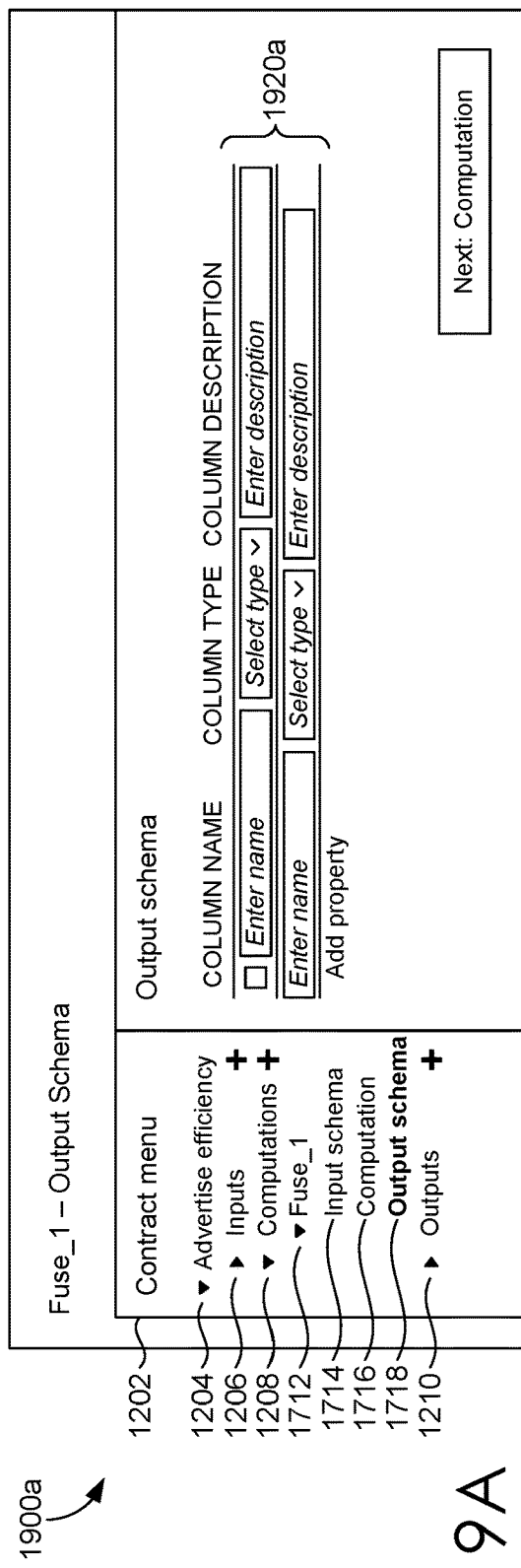
FIGS. 19A-B are illustrations of example user interfaces for specifying an output schema for a computational step in a data privacy pipeline associated with a collaborative intelligence contract, in accordance with embodiments described herein.
Figure 19B:
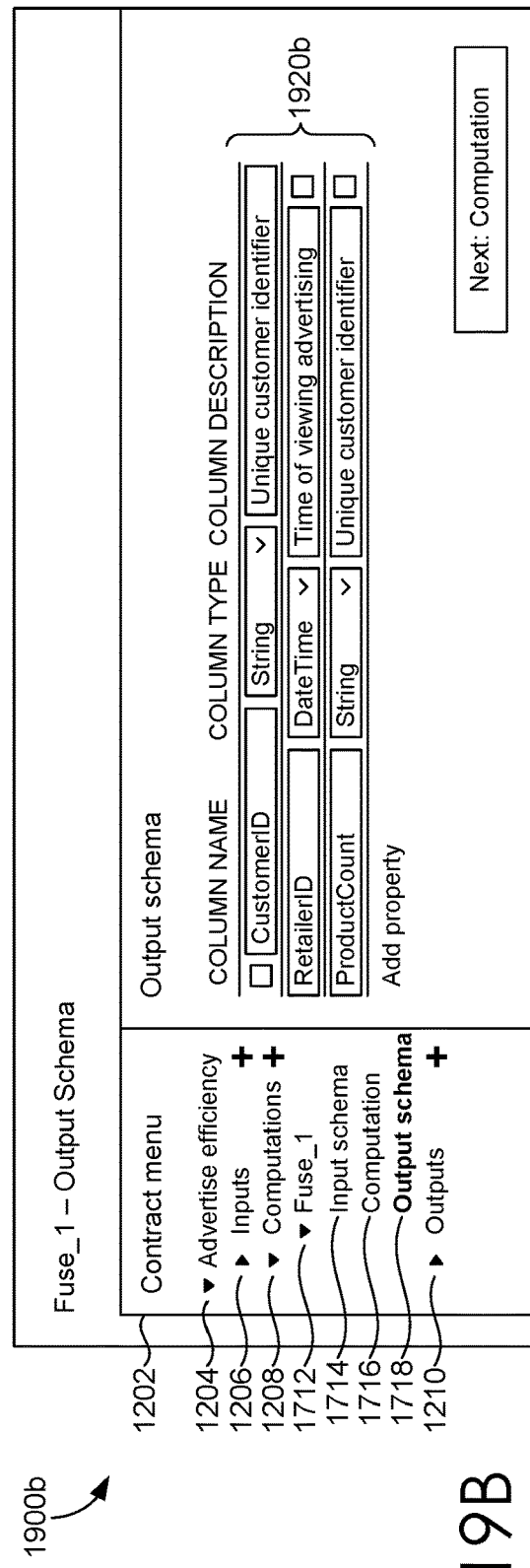

FIGS. 19A-B illustrate example user interfaces 1900*a* and 1900*b* for specifying an output schema for a computational step. In user interface 1900*a* of FIG. 19A, menu item 1718 for the output schema to the Fuse_1 computational step is selected, and input fields 1920*a* may be populated to specify parameters for the output schema. User interface 1900*b* depicts an example output schema 1920*b* that may be provided for the Fuse_1 step. User interfaces 1900*a* and 1900*b* can also be thought of as presenting a summary of the step outputs for a particular computational step (although only one step output is depicted in FIGS. 19A and 19B). Generally, interaction elements (e.g., a button, clickable link, clickable entry) may be provided for a particular step output that allows a user to rename the step output, remove the step output, designate a location to export the step output, edit a schema for the step output, or otherwise manipulate properties of the step output.

Figure 20:
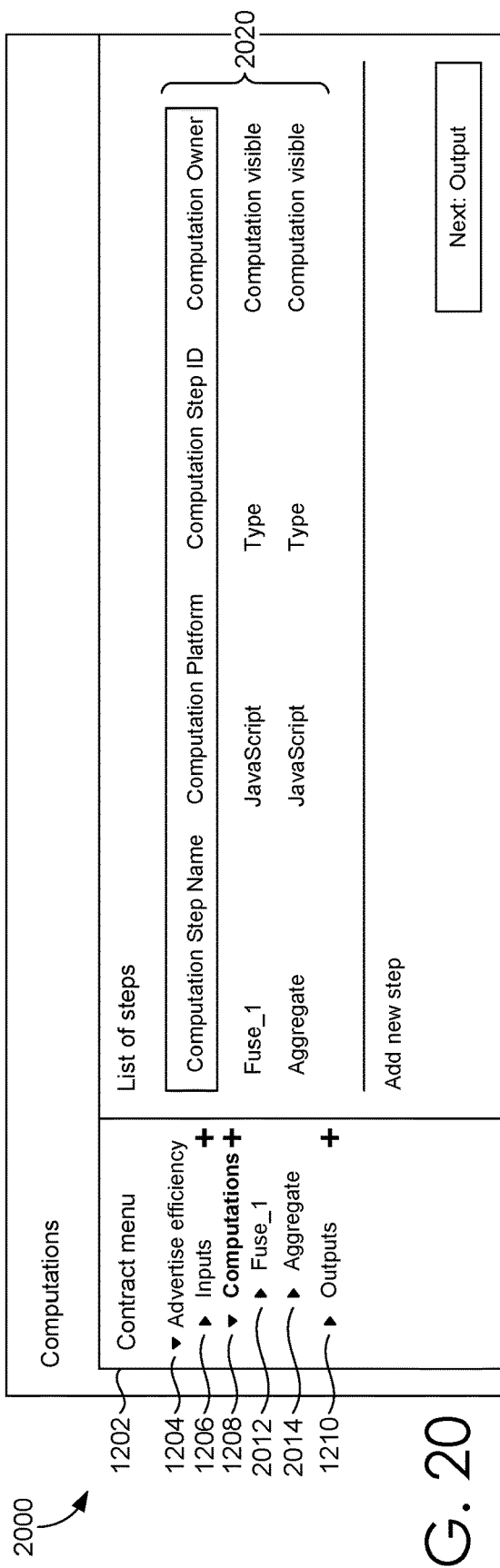
FIG. 20 is an illustration of an example user interface summarizing computation steps in a data privacy pipeline associated with a collaborative intelligence contract, in accordance with embodiments described herein.

FIG. 20 is an illustration of an example user interface 2000 summarizing computation steps in a selected contract and/or an associated data privacy pipeline. In user interface 2000*a*, menu item 1208 for the computational steps in the Advertise efficiency contract is selected. In this example, contract menu 1202 has been updated with menu items reflecting two completed computational steps: Fuse_1 (menu item 2012) and Aggregate (menu item 2014). Furthermore, table 2020 displays a summary of the computational steps for the contract, including an indication of the computation platform, an indication of the owner of the step, and/or an indication of the visibility of the step. In some embodiments, an interaction element may be provided that links to a corresponding interface configured to edit a selected computational step (e.g., a button, selectable text such as the name of the computational step, a selectable entry such as a row in table 2020). Additionally or alternatively, an interaction element may be provided that deletes a selected computational step (e.g., prompting for confirmation first), renames a computational step, changes access rights, or other manipulations.

Figure 21:
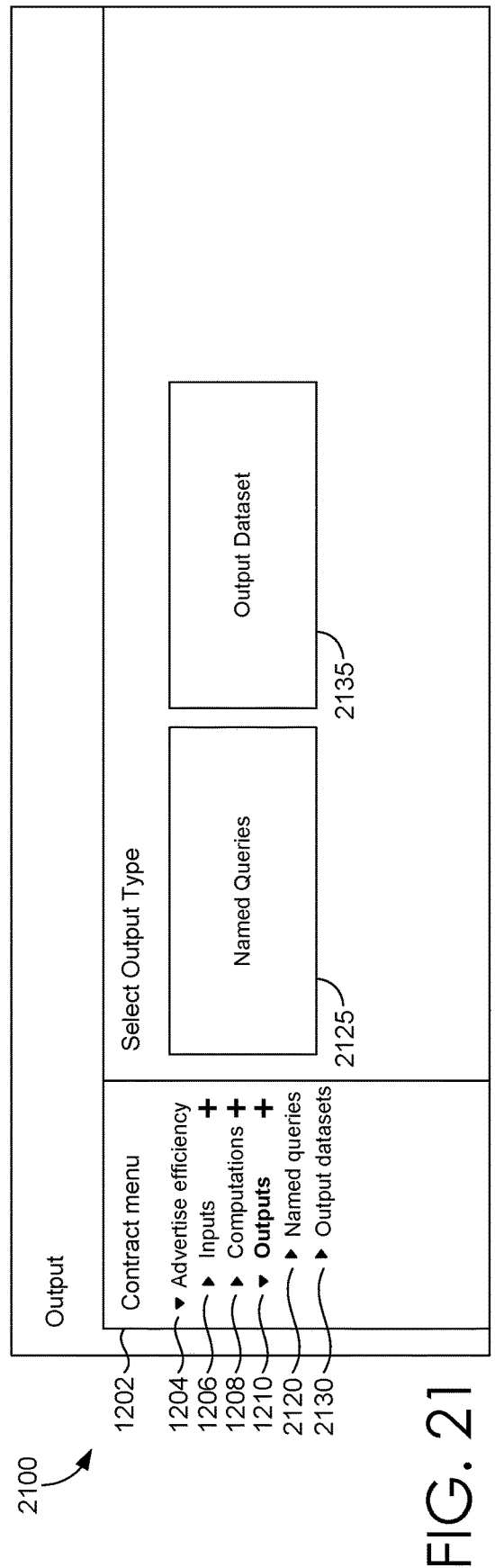
FIG. 21 is an illustration of an example user interface for specifying contract outputs associated with a collaborative intelligence contract, in accordance with embodiments described herein.

FIG. 21 illustrates an example user interface 2100 for specifying contract outputs associated with a collaborative intelligence contract. In user interface 2100, menu item 1210 for the outputs of the Advertise efficiency contract is selected. Generally, any type of output may be supported. In the embodiment illustrated in FIG. 21, user interface 2100 include interaction elements 2125 and 2135 that allow a user to enter parameters for named queries and output datasets, respectively. Note that corresponding menu items 2120 and 2130 are nested underneath the menu item 1210 for the outputs of the Advertise efficiency contract.

Figure 22A:
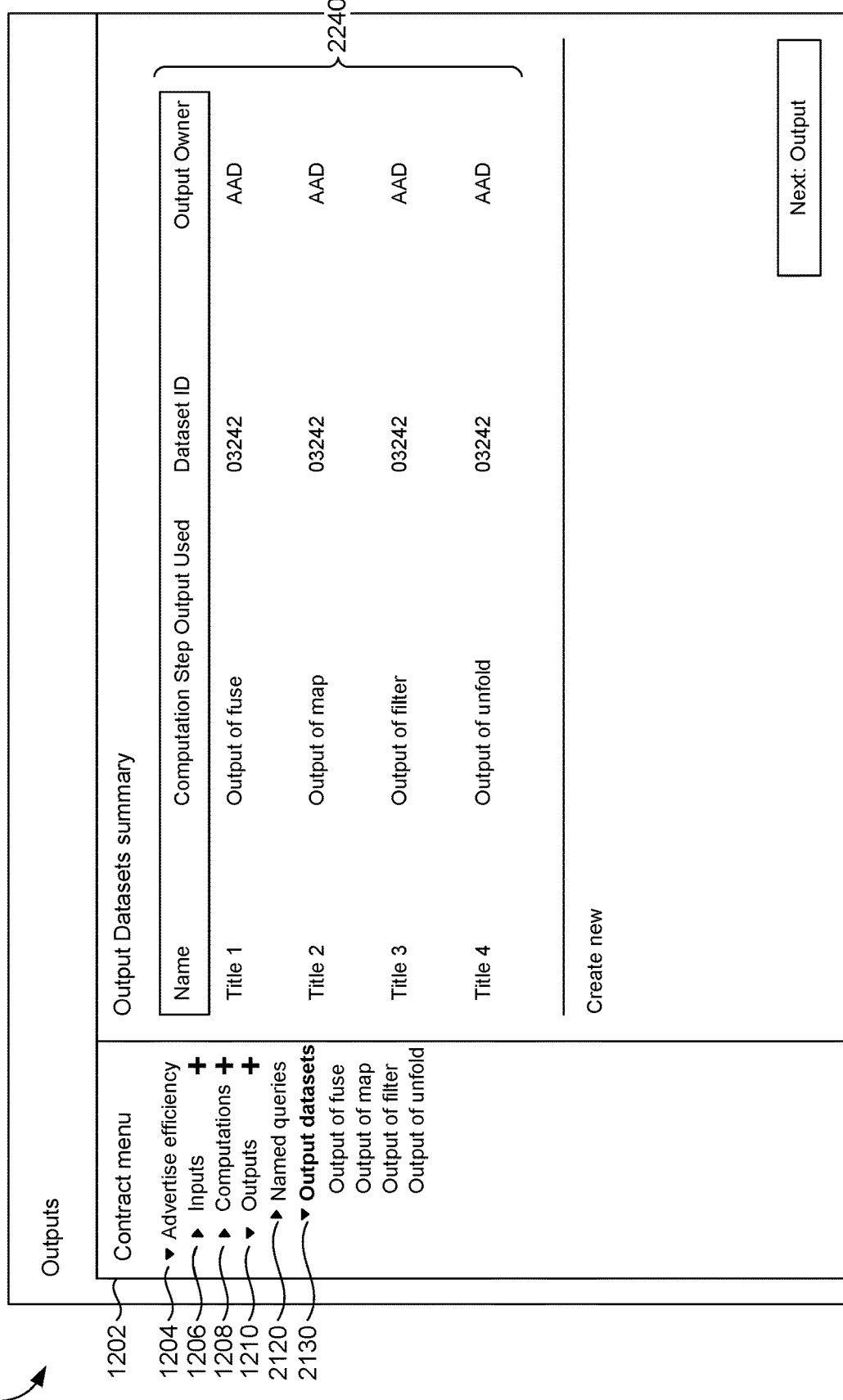
FIGS. 22A-B are illustrations of example user interfaces for specifying output datasets from a data privacy pipeline associated with a collaborative intelligence contract, in accordance with embodiments described herein.
Figure 22B:
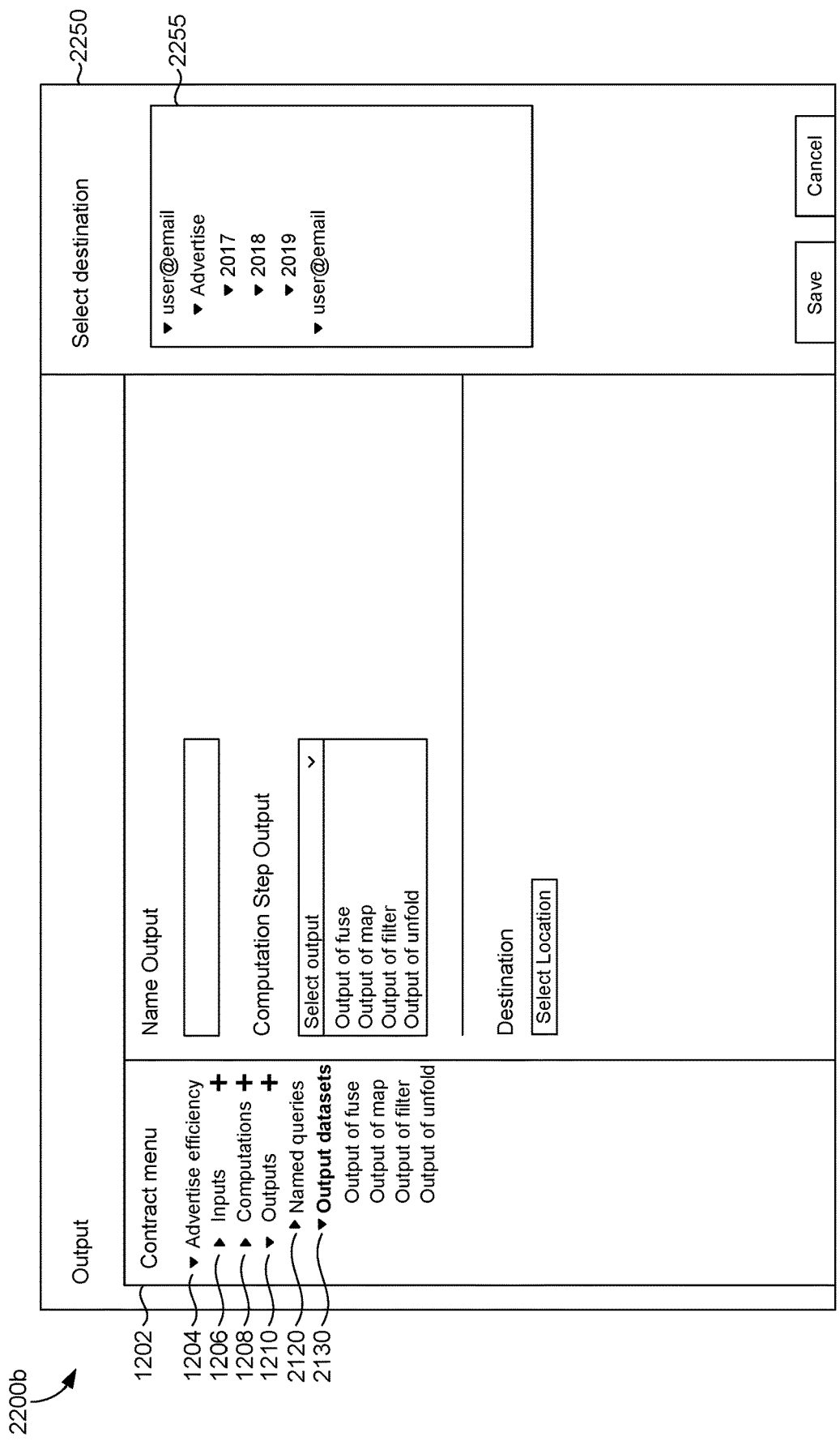

FIGS. 22A-B illustrate example user interfaces 2200*a* and 2200*b* for specifying output datasets to be generated by a data privacy pipeline. In user interfaces 2200*a* and 2200*b*, menu item 2130 for the outputs datasets for the Advertise efficiency contract is selected. User interface 2200*a* of FIG. 22A may include a summary 2240 of the specified output datasets to be generated. Further, menu item 2130 may be expandable to display the currently specified output datasets as corresponding menu items in contract menu 1202. As with other user interfaces described here, user interface 2200*a* may include an interaction element that allows a user to create a new contract element, here a new output dataset. In response, a user interface such as user interface 2200*b* of FIG. 22B may prompt the user to specify parameters for the new output dataset. For example, user interface 2200*b* may prompt the user to specify a computational step from which a corresponding computational result should be used as an output dataset. In some embodiments, user interface 2200*b* may prompt the user to specify a destination for the output dataset. In response, a directory 2255 of available locations may be presented (e.g., via panel 2250), and a desired location can be selected.

Figure 23A:
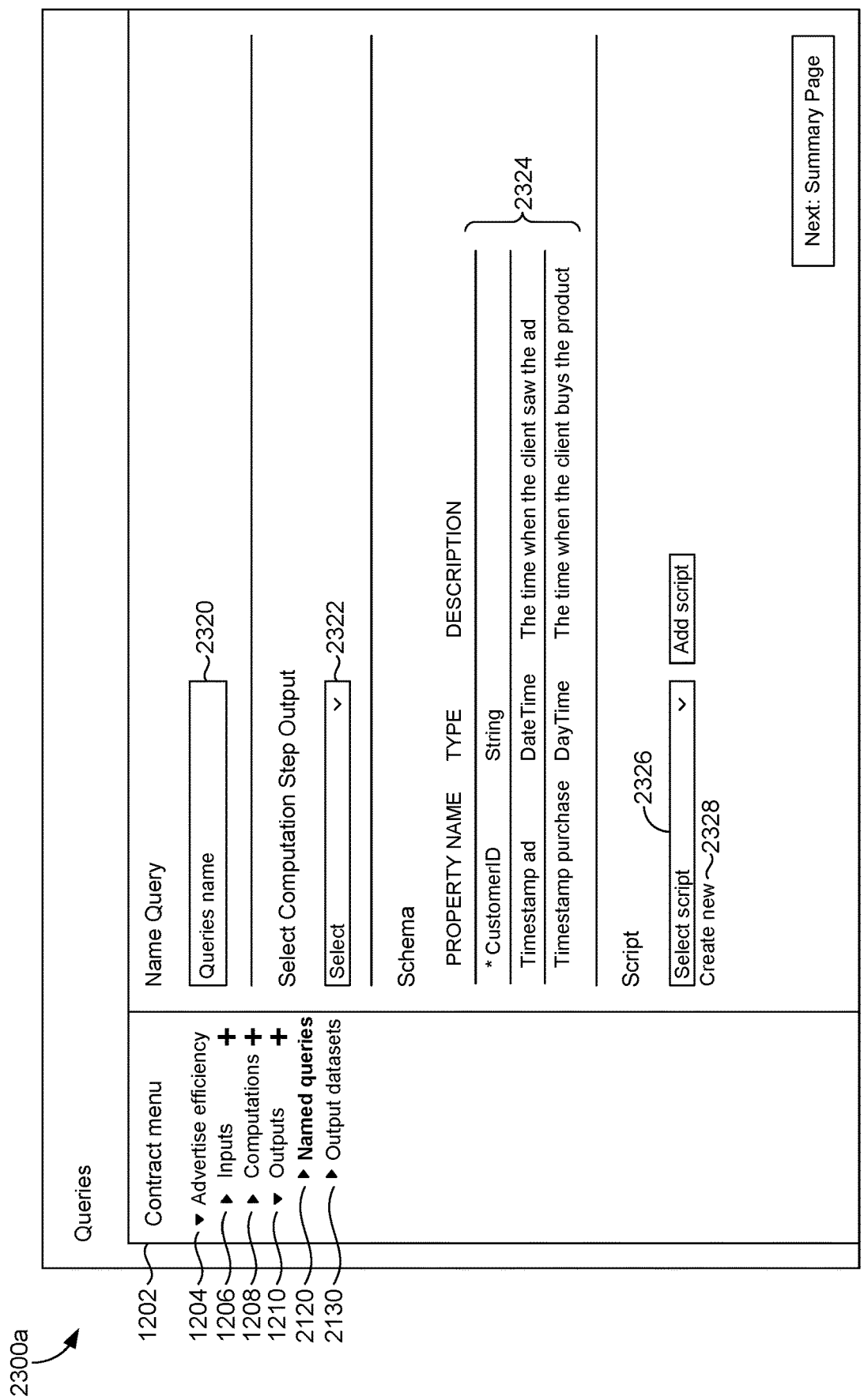
FIGS. 23A-D are illustrations of example user interfaces for specifying permissible named queries associated with a collaborative intelligence contract, in accordance with embodiments described herein.
Figure 23B:
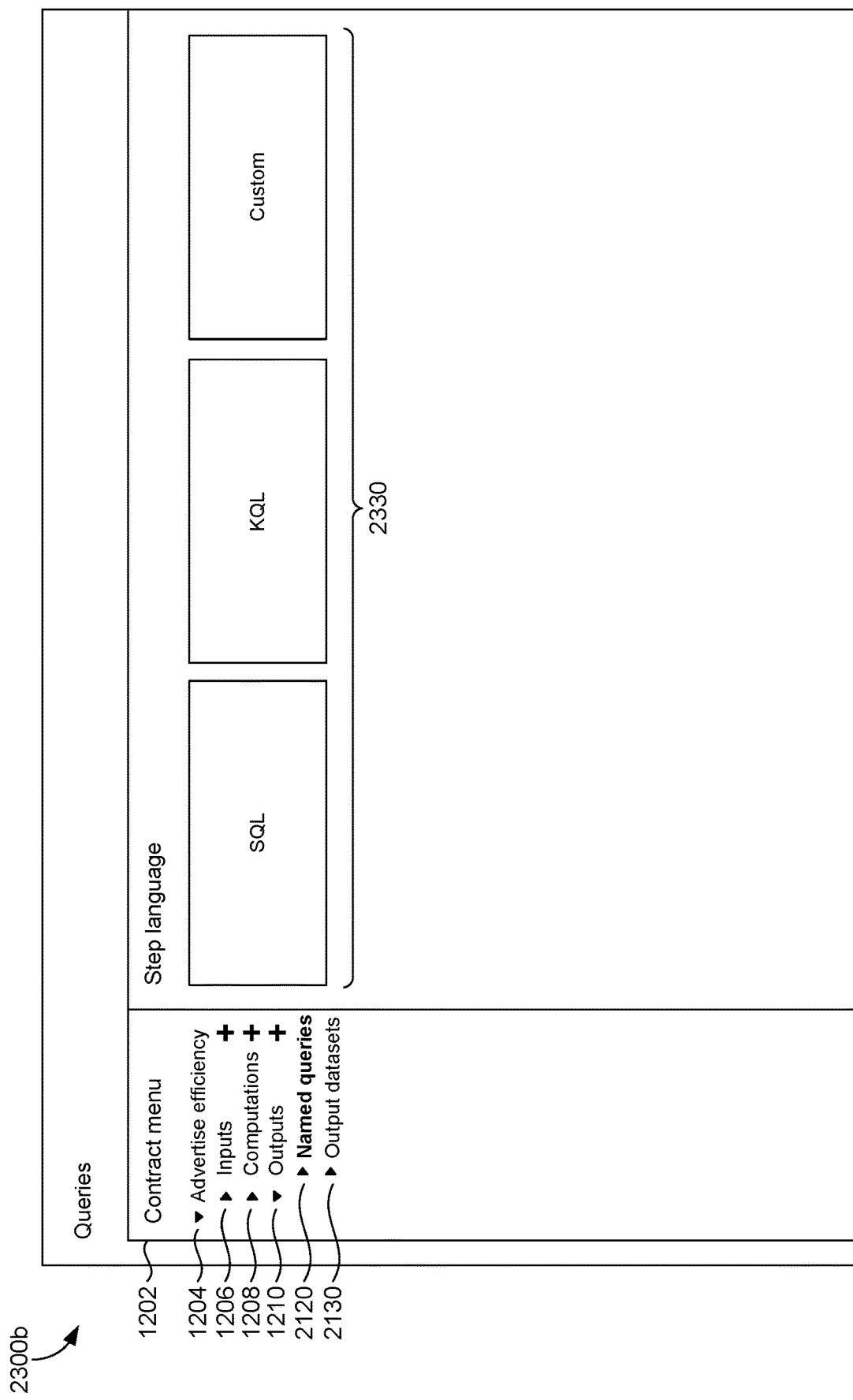
Figure 23C:
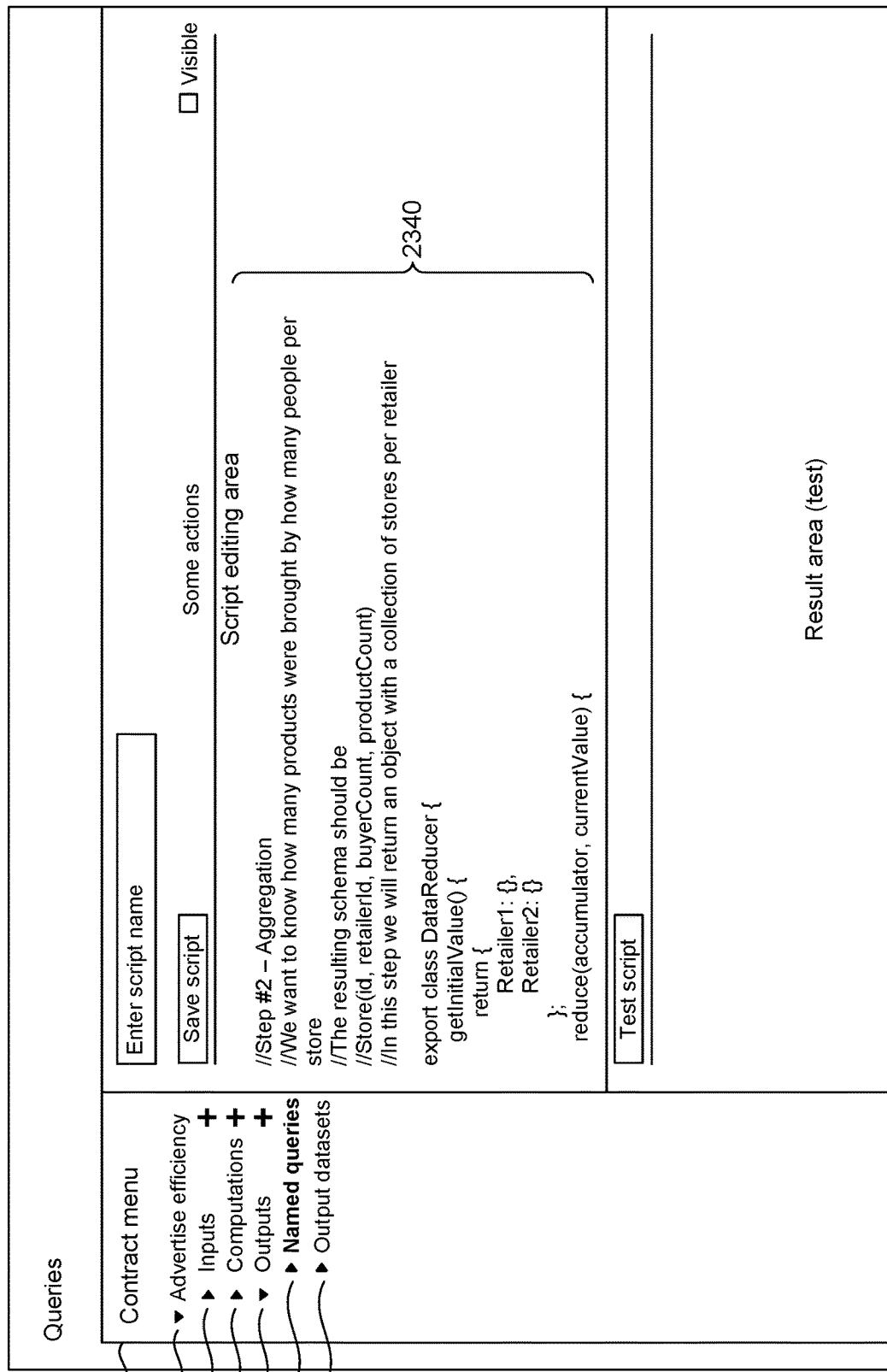
Figure 23D:
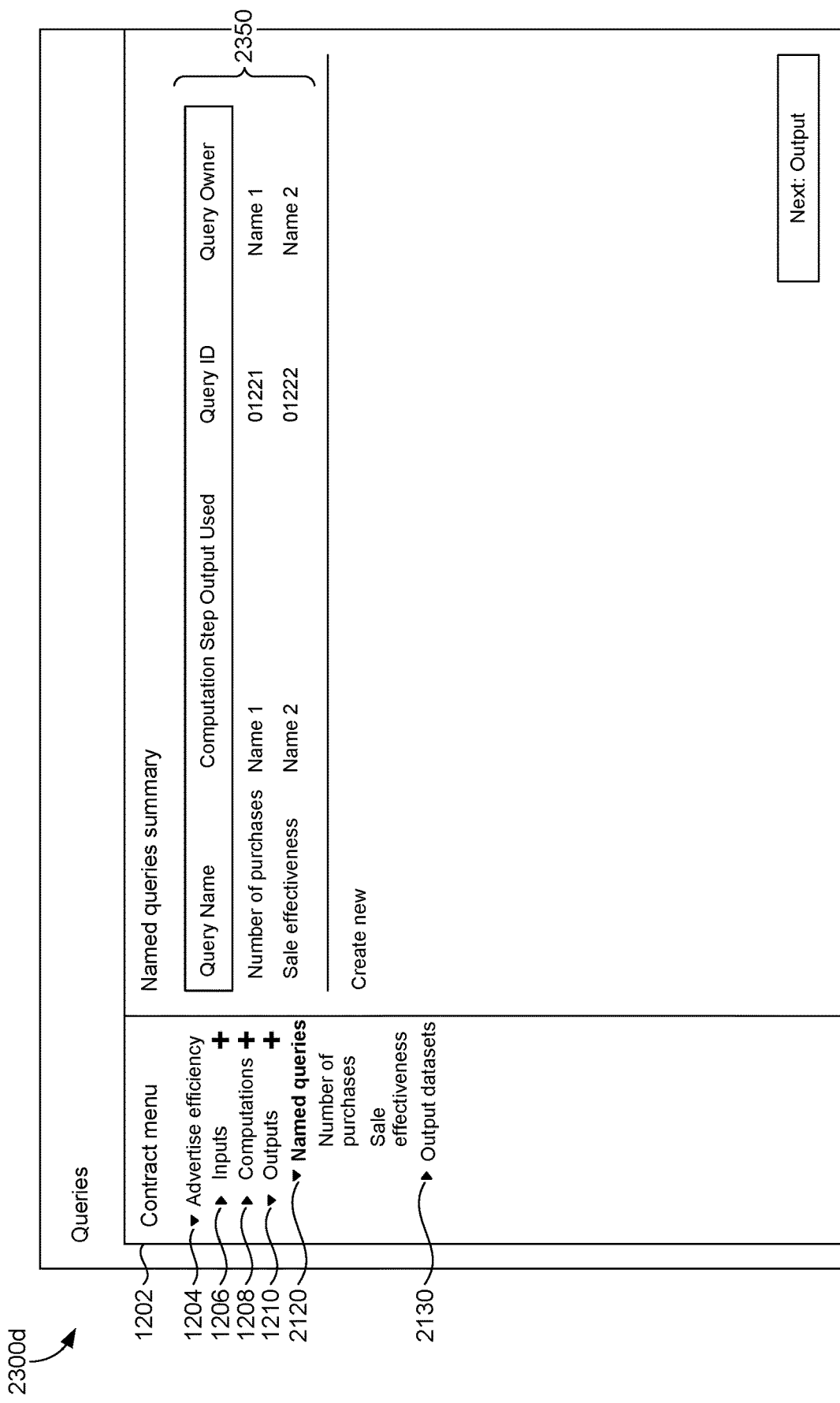

FIGS. 23A-D illustrate example user interfaces 2300*a*, 2300*b*, 2300*c*, and 2300*d* for specifying permissible named queries associated with a collaborative intelligence contract. In these user interfaces, menu item 2120 for permissible named queries for the Advertise efficiency contract is selected. Generally, parameters that may be specified for a named query may be similar to the parameters that may be specified for a computation for a computational step. For example, user interface 2300*a* may include a query name field 2320, a field 2322 for specifying the output of a particular computational step on which the query may operate, input fields 2324 for specifying an input schema, an interaction element 2326 for selecting an existing available script, and/or an interaction element 2328 for creating a new script 2328. Selection of interaction element 2328 to create a new script may cause presentation of a user interface such as user interface 2300*b* of FIG. 23B that accepts a selection of a programming language 2330 for the new script. Additionally or alternatively, a user interface such as user interface 2300*c* of FIG. 23C may be presented to accept an input of a script such as script 2340. In some embodiments, user interface 2300*c* may include a script editor and a compiler (e.g., for a specified programming language). FIG. 23D illustrates a summary 2350 of the named queries associated with the Advertise efficiency contract. Note that corresponding menu items for the named queries in summary 2350 have been added to menu item 2120 in the contract menu 1202. Generally, interaction elements (e.g., a button, clickable link, clickable entry) may be provided for a particular named query that allows a user to rename the named query, remove the named query, view or edit a description of the named query, or otherwise manipulate properties of the named query.

Figure 24A:
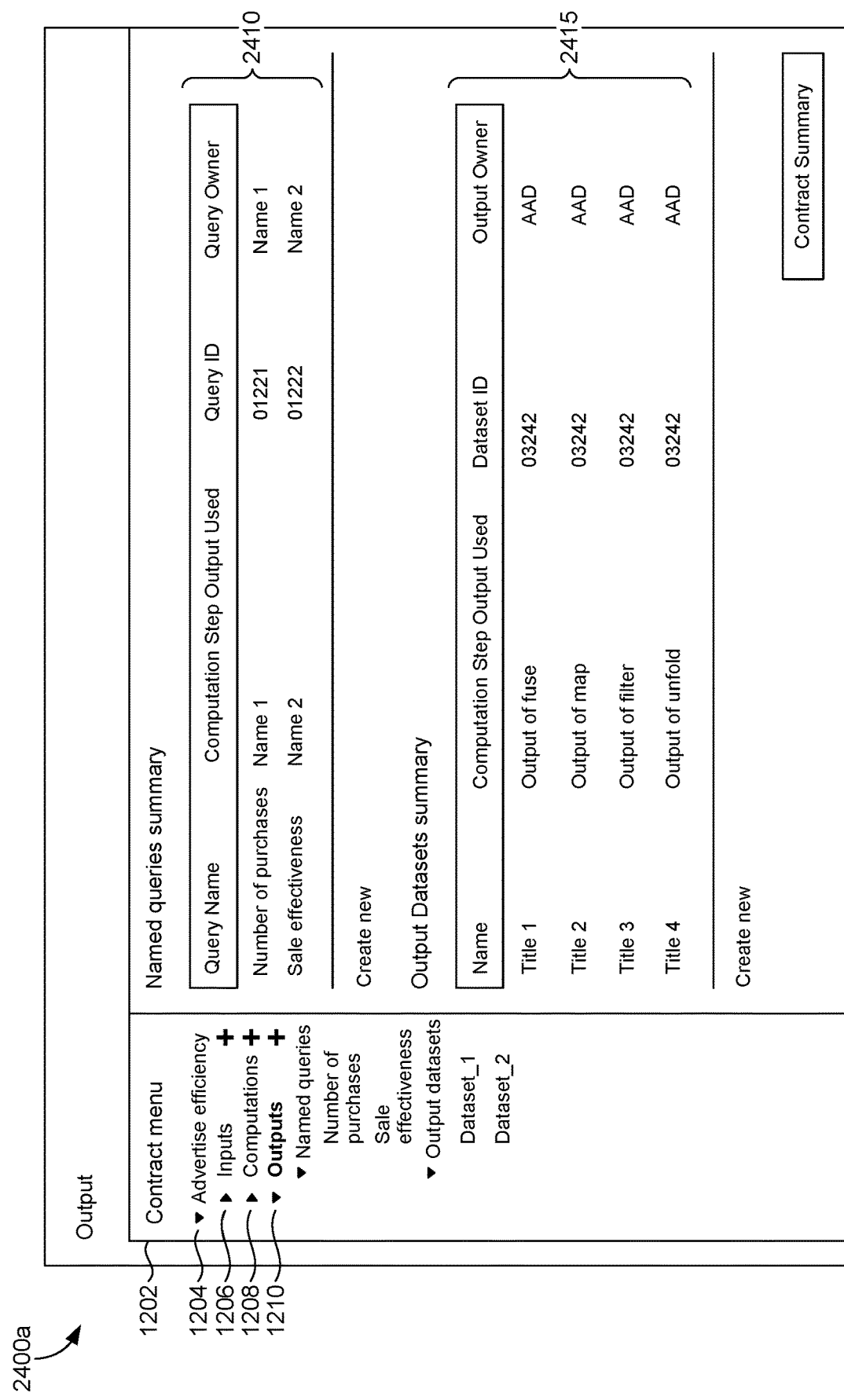
FIG. 24A is an illustration of an example user interface summarizing contract outputs associated with a collaborative intelligence contract, in accordance with embodiments described herein.

FIG. 24A illustrates an example user interface 2400 a summarizing contract outputs associated with a collaborative intelligence contract. In user interface 2400a, menu item 1210 for the outputs to the Advertise efficiency contract is selected. User interface 2400a includes summary 2410 of the named queries associated with the contract and summary 2415 of the output datasets to be generated by deploying the data privacy pipeline associated with the contract.

Figure 24B:
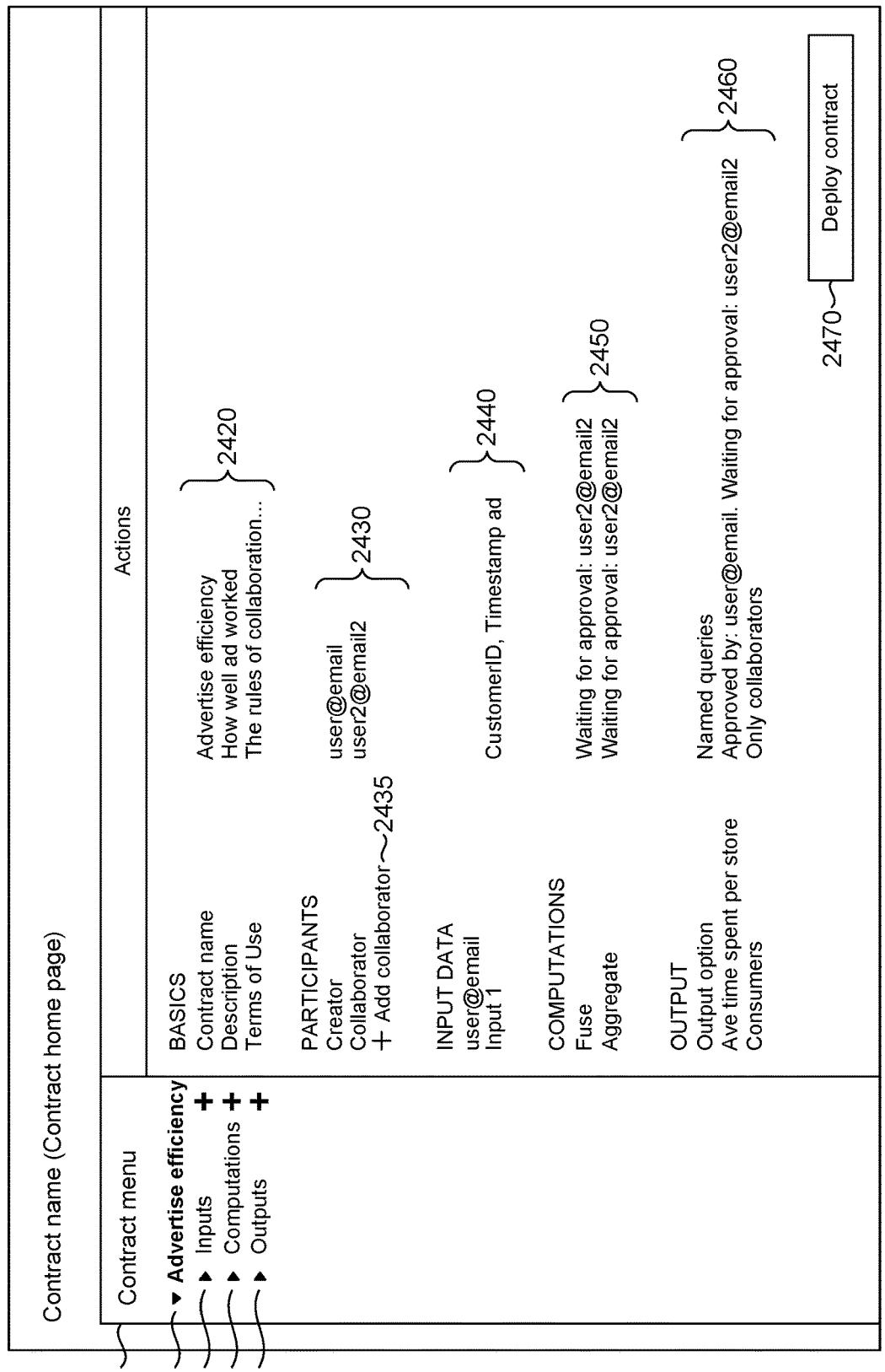
FIG. 24B is an illustration of an example user interface for reviewing approvals and deploying a collaborative intelligence contract, in accordance with embodiments described herein.

FIG. 24B illustrates an example user interface 2400b for reviewing approvals and deploying a collaborative intelligence contract. In user interface 2400b, menu item 1204 for the Advertise efficiency contract is selected. In this example, user interface 2400b may include a summary of the specified parameters for the contract, including a basic description 2420, authorized participants 2430, input datasets 2440, specified computations 2450, and contract outputs 2460. In some embodiments, user interface 2400b may include an interaction element (e.g., interaction element 2435) that allows a user to add a participant and define access rights (e.g., a role) for the new participant. User interface 2400b may prompt each participant to approve the contract. In some embodiments, interaction elements (e.g., buttons) can be provided that allow a participant to sign a contract, revoke an existing signature, or edit contract details (e.g., basic description 2420). When all participants have approved, user interface 2400b may prompt a user to deploy the contract and corresponding data privacy pipeline (e.g., via interaction element 2470).

Figure 25C:
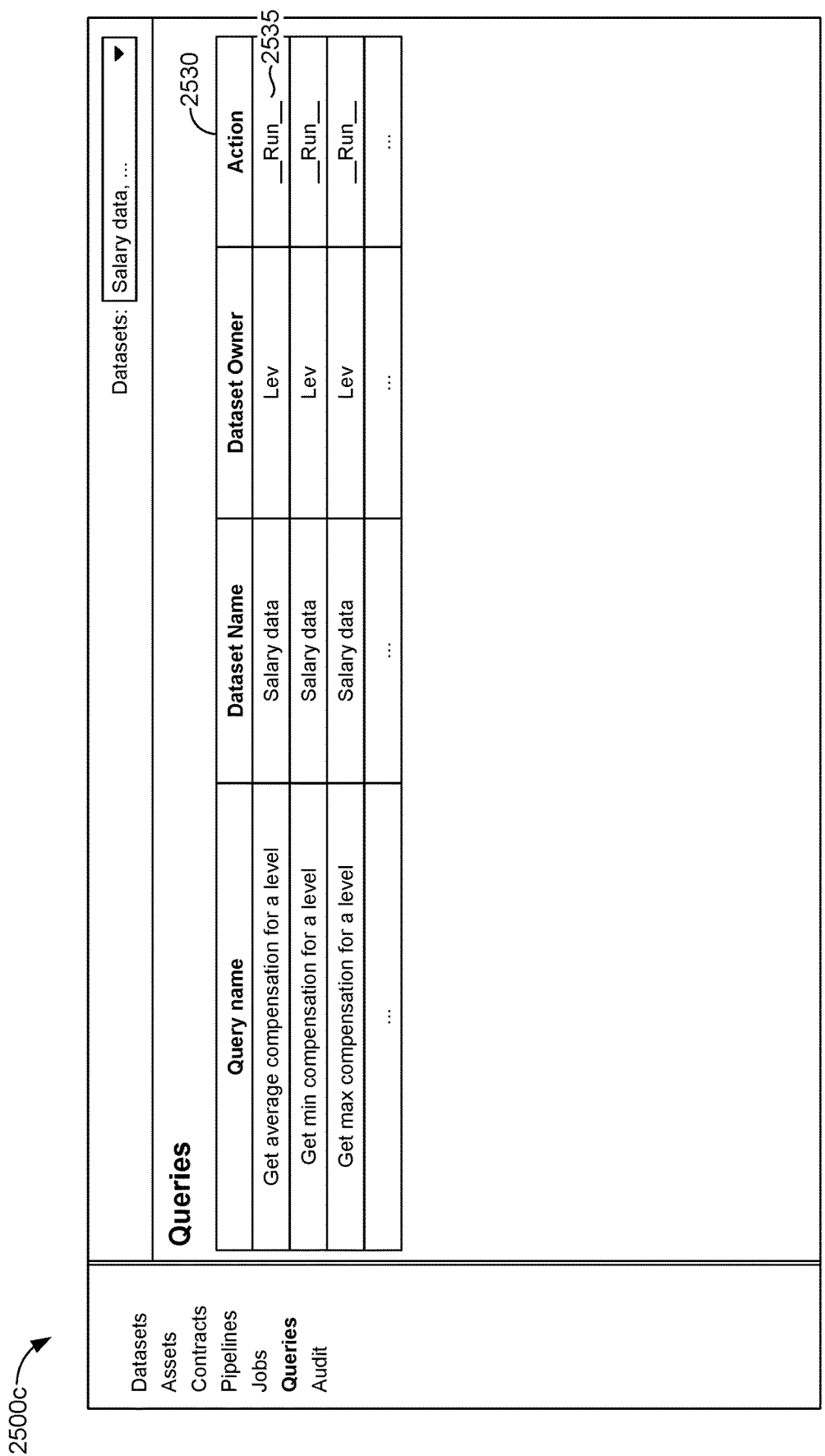

FIGS. 25A-25E are illustrations of example user interfaces for browsing and interacting with accessible resources, such as data privacy pipelines (FIG. 25A), jobs (FIG. 25B), named queries (FIGS. 25C and 25D), and audit events (FIG. 25E).

FIG. 25A illustrates an example user interface 2500a for browsing and interacting with available pipelines (e.g., for which a tenant account is authorized). For example, a particular account may be authorized to trigger a pipeline based on a corresponding permission specified in an associated collaborative intelligence contract. An accessible pipeline may be presented with a corresponding interaction element (e.g., trigger 2510) that triggers a request to initiate a job defined by the pipeline. In some embodiments, when a triggered job succeeds, a tool tip may be shown indicating the successful creation. Conversely, when a triggered job fails, a tool tip may be shown indicating the failure.

FIG. 25B illustrates an example user interface 2500b for browsing and interacting with available jobs (e.g., collaborative intelligence jobs initiated by, associated with, or otherwise accessible by a tenant account). For example, a table 2520 of collaborative intelligence jobs (e.g., triggered pipeline jobs) may be presented along with information about the jobs, such as an identifier for a job, an identifier for the pipeline a job was created from, the execution status of a job (e.g., running, aborted, succeeded, failed), duration of the job from the moment it was started, and the like. In some embodiments, a job may be presented with an associated interaction element (e.g., button, clickable link, clickable entry) configured to perform an available action related to the job. For example, if a job is running, an available action may be an abort action. If a job has succeeded, an available action may be a view results action. If a job has failed, an available action may be a view errors action. In some embodiments, table 2520 may include associated interaction elements configured to filter the jobs being presented (e.g., by date, status, name, start time, duration). These and other variations are contemplated within the present disclosure.

FIGS. 25C and 25D illustrate example user interfaces 2500c and 2500d for browsing and interacting with available named queries (e.g., initiated by, associated with, or otherwise accessible by a tenant account). For example, a table 2530 of permissible named queries available to the account may be presented along with information about the named queries, such as an identifier for the named query, a corresponding dataset on which the named query is configured to operate, an identifier for an owner of the corresponding dataset, and the like. In some embodiments, a named query may be presented with an associated interaction element (e.g., button, clickable link, clickable entry) configured to perform an available action related to the named query, such as run action element 2535, which may be configured to initiate a request to run a named query. In some embodiments, as a precursor to initiating a request to run a named query, one or more prompts for entry of relevant parameters for the named query can be presented. For example, user interface 2500d may be presented and may prompt for a description for the named query, a selection of permissible configurable parameters (e.g., defined by an associated collaborative intelligence contract), and the like. In the embodiment illustrated in 2500d, trigger button 2540 may initiate the named query, and results (e.g., results table 2545) may be presented.

FIG. 25E illustrates an example user interface 2500e for browsing and interacting with available audit events (e.g., jobs, collaborative intelligence contract proposals, or other operations relevant to a collaborative intelligence resource that were initiated by, associated with, or otherwise accessible by a tenant account). For example, a table 2550 of audit events available to the account may be presented along with information about the audit events, such as date and time for an event, a type of object operated on (e.g., job, proposal), a corresponding identifier for the object, a type of performed operation (e.g., started, aborted, created), an identifier for an account that initiated or is otherwise associated with the event, and the like. In some embodiments, table 2550 may include associated interaction elements configured to filter the audit events being presented (e.g., by date, object type, operation, associated account, description). These and other variations are contemplated within the present disclosure.

In this manner, one or more user interfaces can guide collaborators to build and configure a data privacy pipeline and a corresponding contractual agreement to share data. Although the interfaces described herein have been described with a certain configuration of interaction elements, these examples are not meant to be limiting. Generally, any suitable interface(s) capable of facilitating multi-party collaboration, generation of a data privacy pipeline, and/or specification of corresponding parameters is contemplated within the scope of the present disclosure.

Example Collaborative Intelligence Environment

Some embodiments of the present disclosure are directed to techniques for deriving collaborative intelligence based on constraint computing and constraint querying. At a high level, a data trustee can operate a trustee environment configured to derive collaborative intelligence for tenants subject to configurable constraints, without exposing underlying raw data provided by the tenants or collaborative data shielded by the trustee environment. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some embodiments, collaborative intelligence may be derived from exposable data and/or restricted data, and the collaborative intelligence may be provided without exposing the restricted data. For example, configurable constraints may programmatically manage limitations (e.g., allowing some operations, but not others) on certain underlying data (e.g., personally identifiable information, some other sensitive information, or any other designated information that is collected, stored, or used) and how the underlying data can and cannot be accessed, used, stored, or displayed (or variations thereof). Further, the configurable constraints may programmatically support collaborative intelligence operations on accessible data (e.g., deriving aggregate statistics), without displaying the individual data entries that were operated on.

By relying on trustee computing to perform data processing, tenants can derive collaborative intelligence from each other's data without compromising data privacy. To accomplish this, the trustee environment can include one or more data privacy pipelines through which data can be ingested, fused, derived, and/or sanitized to generate collaborative data. A data privacy pipeline can be provided as a distributed computing or cloud computing service (cloud service) implemented in the trustee environment, and can be spun up and spun down as needed. In some embodiments, tenants providing data into a data privacy pipeline cannot access the pipeline. Instead, the pipeline outputs collaborative data subject to constraints provided by one or more of the tenants. Depending on the designated constraints, the collaborative data can be output from the trustee environment (e.g., because it has been sanitized according to specified constraints) and/or may be stored in, and shielded by, the trustee environment. Shielded collaborative data can be queried to derive collaborative intelligence subject to the configurable constraints (e.g., without exposing the shielded collaborative data).

Generally, a data privacy pipeline can accept data provided by one or more tenants. Initially, the data privacy pipeline may determine whether input data is joint data pursuant to a contract or other tenant agreement with one or more tenants. Data that is determined to be joint data can be ingested, and data that is determined not to be joint data can be dropped. In this regard, joint data refers to any shared data that is designated for ingestion in generating collaborative data (e.g., a c designated or otherwise identified in a tenant agreement with one more tenants). Ingested data can include data from multiple sources, so the data privacy pipeline may fuse data from multiple sources according to computations and constraints specified in the tenant agreement. For example, constrained data fusion can implement one or more constraints to combine ingested data to form fused joint data in any number of ways, including the use of one or more join operations (e.g., left, right, inner, outer, anti), custom joins (e.g., via imperative scripts), data appends, normalization operations, some combination thereof, and others.

In some embodiments, a data privacy pipeline can perform constrained computations to generate derived joint data. Constrained computing can take data from one source (e.g., ingested data, fused joint data) and perform any number of specified computations (e.g., arithmetic operations, aggregation, summarization, filtering, sorting, bounding). A simple example of a constraint computation is a calculation of average age per city, where the computation is only to be performed for a city if the underlying dataset includes entries for at least five people in the city. Additionally or alternatively, a data privacy pipeline can perform data sanitation to generate collaborative data that implements constraints for storage, access, precision, and the like. For example, data sanitation can implement constraints specified in the tenant agreement designating whether collaborative data should be shielded (e.g., stored in the trustee environment), whether collaborative data can be exported, whether exported collaborative data should be restricted (e.g., do not export email, credit card numbers, portions thereof), and the like. As such, a data privacy pipeline can generate collaborative data from data provided by one or more tenants, and provide agreed-upon access to the collaborative data without sharing the underlying raw data with all the tenants.

In some embodiments, to enable constraint computing and querying, the use and generation of collaborative data in a trustee environment can be monitored and orchestrated subject to configurable constraints. At a high level, constraints can be provided through a user interface to enable tenants (e.g., customers, businesses, users) to specify desired computations and constraints on the use of and access to their data in the trustee environment, including eligible data sources and how their data may be processed or shared. Any number of various types of constraints may be implemented, including data access constraints, data processing constraints, data aggregation constraints, and data sanitation constraints.

For example, data access constraints can be specified to allow or forbid access (e.g., to a specific user, account, organization). In some embodiments, designated constraints can be universal such that the constraints apply to all potential data consumers (e.g., only allow access to average age no matter the data consumer). In some embodiments, a designated constraint can be applied to a designated user, account, organization, and the like (e.g., do not allow group A to access salary data, but allow group B to access it). Generally, a tenant may specify constraints defining how the tenant's data can be merged with designated datasets or portions thereof, constraints limiting the schema of data being read from the tenant's data (e.g., specifying horizontal filtering to be applied to a tenant's data), constraints limiting the size of ingested data (e.g., specifying storage limitations, sub-sampling of the tenant's data, vertical filtering to be applied to a tenant's data), constraints limiting the schema of collaborative data that can be output, constraints defining ownership of collaborative data, constraints defining whether collaborative data should be open, encrypted, or shielded (e.g., stored in the trustee environment), and the like.

In some embodiments, various types of data processing constraints may be designated, such as constraints designating what operations can be performed (e.g., allowable and restricted computations, binary checks), constraints limiting a comparison precision (e.g., for numeric data, geographic data, date and time data), constraints limiting an accumulation precision (e.g., for geographical data, numerical data, date or time data), constraints limiting location bounding precision (e.g., limiting allowable geofencing determinations to specific grids, minimum geographic divisions such as neighborhood, county, city, state, or country, and the like), and other precision and/or data processing requirements.

Additionally or alternatively, one or more data aggregation constraints can be specified, such as constraints requiring a minimum aggregation amount (e.g., at least N rows or distinct field values), constraints requiring some statistical distribution condition to be valid (e.g., minimum standard deviation), constraints defining allowed aggregation functions (e.g., allow min, max, average, but not percentiles), to name a few examples.

In some embodiments, one or more data sanitation constraints can be specified, such as constraints requiring sanitation of personally identifiable information (e.g., remove e-mails, names, IDs, credit card numbers), constraints requiring lower precision sanitation (e.g., lower the numeric, data and time, and/or geographical precision), constraints requiring sanitization of values coming from specific fields (which may entail tracking transformations applied in a data privacy pipeline), constraints requiring custom sanitations (e.g., requiring execution of one or more custom and/or third party sanitation scripts), constraints requiring data masking (e.g., output certain data such as phone numbers, credit cards, dates, but mask a portion of the number), and the like.

Additionally or alternatively to the constraints listed above, one or more constraints can be specified limiting a number of allowable queries and/or data accesses per unit time (e.g., minute, hour, day). Such a constraint can operate to reduce the risk of brute-force attempts to reverse engineer shielded data by asking a set of slightly different questions within a relatively small time window. In general, one or more custom constraints can be specified such as a constraint requiring that some designated property match some designated criteria. These and other types of constraints are contemplated within the present disclosure.

In some embodiments, a constraint manager can monitor and orchestrate data flow, generation, and access, subject to the designated constraints. For example, the constraint manager can communicate with various components in the trustee environment (e.g., a data privacy pipeline) to implement the constraints, which may be maintained in a contract database accessible to the constraint manager. In some embodiments, components can issue requests to the constraint manager for permission to execute a particular command, function call, or other executable unit of logic. The constraint manager can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any portion of a data privacy pipeline, constrained querying). Accordingly, corresponding functionality enforcing a constraint can be applied at any step, or multiple steps. In some embodiments, enforcement of certain constraints can be allocated to certain portions of a data privacy pipeline (e.g., data access constraints get applied during ingestion, processing and aggregation constraints get applied during data fusion and/or constrained computation, sanitation constraints get applied during data sanitation. In another example, a particular data access constraint (e.g., only pass data for patients who participated in at least five different studies) may be applied during data fusion. These are meant merely as examples, and any suitable constraint enforcement regime may be implemented within the present disclosure.

Enforcement of a constraint (e.g., precision or aggregation constraints) on a particular executable unit of logic (e.g., for a designated computation, a requested operation) can result in any number of scenarios. In one example, a particular executable unit of logic can be rejected entirely. In another example, a particular executable unit of logic can be allowed, but the result is filtered (e.g., no value is returned for a particular row or entry of data). In yet another example, a particular executable unit of logic can be allowed, but the result is changed (e.g., precision reduced, a question is answered with false). These and other variations may be implemented.

As constraints are applied to generate collaborative data, any combination of schema, constraints, and/or attribution metadata can be associated with the collaborative data, intermediate data used to arrive at the collaborative data, or otherwise. Generally, constraints can be enforced across multiple steps and computations. As such, in some embodiments, applicable and/or satisfied constraints for each step can be tracked and/or associated with data produced by a given step. Taking aggregation constraints as an example, once an aggregation constraint has been fulfilled during a particular step, subsequent steps no longer need to consider this constraint. In another example where different constraints have been specified for different datasets to be merged, a merging operation may only need to apply the stricter constraint. Generally, an appropriate allocation or combination of constraints can be applied and/or tracked as data flows through a data privacy pipeline. This tracking can facilitate validating whether a particular constraint has been applied to particular data. Accordingly, as constraints are applied and data is generated, corresponding schema, applicable or satisfied constraints, and/or attribution metadata indicating ownership or providence can be associated with a dataset, or a corresponding entry, row, field, or other element of data. In some embodiments, any intermediate data used in arriving at collaborative data (e.g., ingested data, fused joint data, derived joint data) may be deleted, and collaborative data may be stored in the trustee environment and/or provided as an output, depending on an applicable constraint.

In some embodiments, constraint querying can be applied to allow data consumers to query collaborative data in a trustee environment subject to configurable constraints. At a high level, constraint querying can operate as a search engine that allows data consumers to access or derive collaborative intelligence from collaborative data without exposing underlying raw data provided by the tenants or collaborative data shielded by the trustee environment. Constraints can be applied in response to a query in any number of ways, including reformatting a query prior to execution, applying constraints after executing a query, constraining eligible queries for execution, applying access constraints prior to execution, and others.

By way of nonlimiting example, an issued query can be validated against a specified aggregation constraint by ensuring that the query contains at least one aggregation element and ensuring that the aggregation element(s) are consistent the aggregation constraint. In another example, an execution plan corresponding to the issued query can be executed, and the results can be validated against the aggregation constraint and/or the aggregation element(s) of the query (e.g., confirming the results correspond to a requested number of distinct rows, fields, statistical distribution). In some embodiments, a constraint can be enforced on a corresponding element of a query by modifying the element based on the constraint (e.g., to limit a corresponding number of distinct rows, fields, statistical distribution), by executing the modified element prior to the other elements of the query, some combination thereof, or otherwise.

By way of background, queries are generally not executable code. In order to execute a query, it is normally converted into an execution plan that is executable. In some embodiments, in order to enforce constraints on a received query, the query can be parsed into a corresponding execution tree comprising a hierarchical arrangement of executable units of logic that, when executed, implement the query. Applicable constraints can be accessed, and the executable units of logic can be validated against the constraints. In some embodiments, if one or more of the executable units of logic is not allowed, the query can effectively be reformatted by altering one or more of the executable units of logic based on one or more constraints. More specifically, the execution tree corresponding to the query can be reformatted into a constrained execution tree by traversing the execution tree and replacing executable units of logic inconsistent with a particular constraint with custom executable units of logic that are consistent with the constraint. Additionally or alternatively, one or more executable units of logic may be added to the constrained execution tree to enforce constraints (e.g., precision constraints) on the output. These are simply meant as examples, and any suitable technique for generating a constrained execution tree can be implemented.

Generally, an executable unit of logic of an execution tree can be validated against a corresponding constraint context comprising an applicable accessed constraint and runtime information such as information identifying the requesting data consumer issuing the query, information identifying an applicable tenant agreement, information identifying target collaborative data on which to operate, and the like. Validation of an executable unit of logic can involve validation of a constituent command or operation, one or more constituent parameters, and/or consideration of other parts of the execution tree. Validation of an executable unit of logic can result in a number of possible results. For example, an executable unit of logic can be allowed (e.g., the executable unit of logic can be copied into a constrained execution tree), an executable unit of logic can be disallowed (e.g., the query can be disallowed in its entirety), or an executable unit of logic can be allowed but with changes (e.g., copying a corresponding constrained executable unit of logic into the constrained execution tree). In some embodiments, the resulting constrained execution tree is translated into a language used by the trustee environment. The resulting execution tree can be executed (e.g., by traversing and executing the hierarchy of executable units of logic of the tree), and the results can be returned to the requesting data consumer.

As such, using implementations described herein, users can efficiently and effectively share data through a data trustee that allows them derive collaborative intelligence, while ensuring data privacy and providing configurable control and access to shared data.

Figure 26:
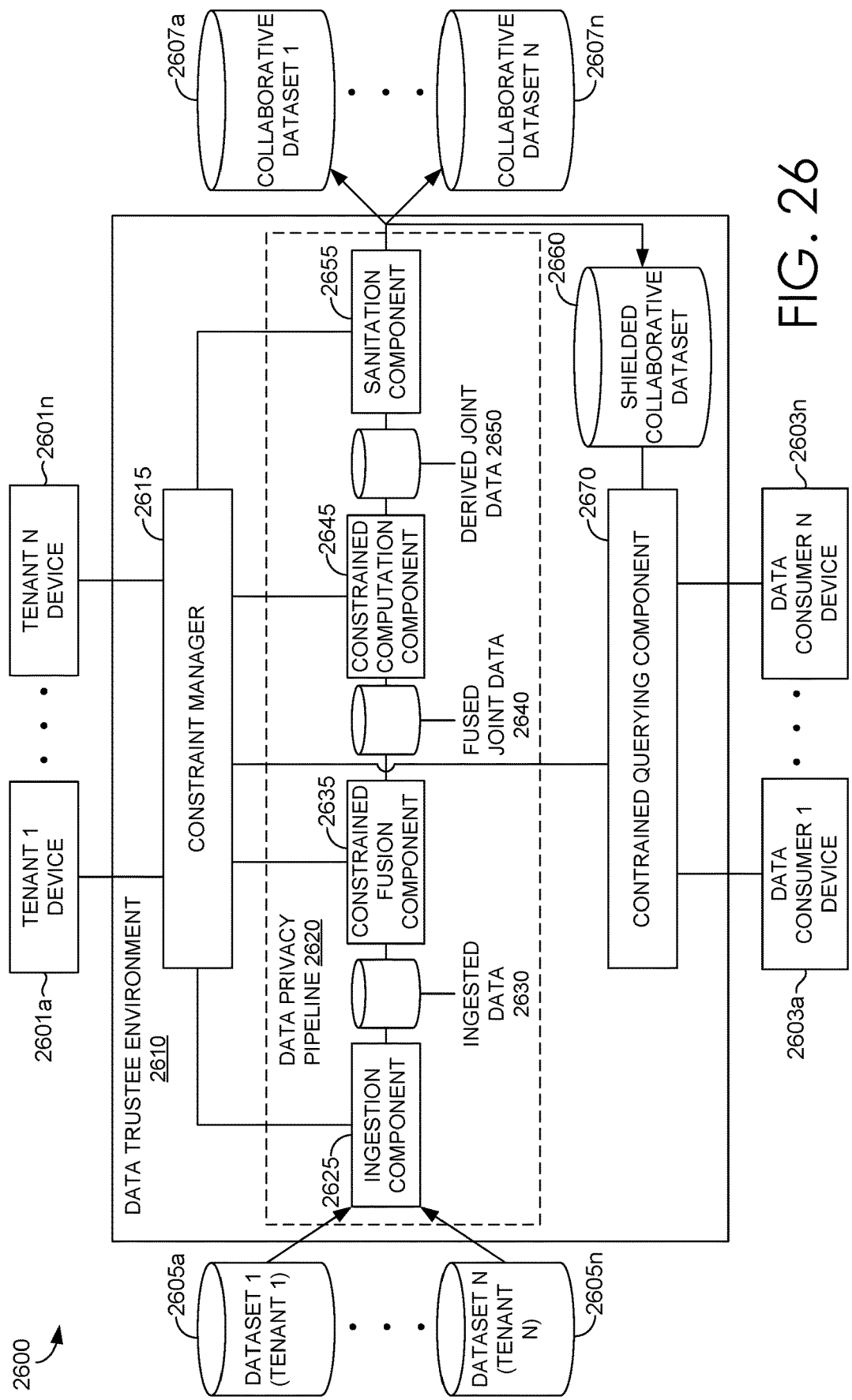
FIG. 26 is a block diagram of an example collaborative intelligence environment, in accordance with embodiments described herein.

Referring now to FIG. 26, a block diagram of example collaborative intelligence environment 2600 suitable for use in implementing embodiments of the invention is shown. Generally, collaborative intelligence environment 2600 is suitable for generation of collaborative intelligence, and, among other things, facilitates constraint computing and constraint querying. Collaborative intelligence environment 2600 or a portion thereof (e.g., data trustee environment 2610) may, but need not, be implemented in a distributed computing environment such as distributed computing environment 3000, discussed below with respect to FIG. 30. Any or all of the components of collaborative intelligence environment 2600 can be implemented as any kind of computing device, or some portion thereof. For example, in an embodiment, tenant devices 2601a through 2601n and data consumer devices 2603a through 2603n can each be a computing device such as computing device 3100, as described below with reference to FIG. 31. Further, data trustee environment 2610 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 2600 may communicate with each other via one or more networks, which may include, without limitation, one or more local area networks (LANs) and/or wide area networks (WANs). Such networking environments are commonplace in offices, enterprise-wide computer networks, intranets, and the Internet.

Collaborative intelligence environment 2600 includes data trustee environment 2610 that is capable of deriving collaborative data and/or collaborative intelligence from raw data provided by data owners or providers (e.g., tenants) subject to configurable constraints, without sharing the raw data. Generally, any number of tenants can input their data (e.g., datasets 2605a through 2605n) into data trustee environment 2610 and designate one or more constraints (e.g., from one of tenant devices 2601a through 2601n). Data trustee environment 2610 can derive collaborative data (e.g., collaborative datasets 2607a through 2607n, shielded collaborative dataset 2660) based on the one or more constraints. Any number of data consumers (e.g., operating one of data consumer devices 2603a through 2603n) may issue queries on shielded collaborative dataset 2660, and data trustee environment 2610 may derive collaborative intelligence from shielded collaborative dataset 2660, subject to the one or more constraints. In some cases, an authorized data consumer (e.g., which may be defined by one or more of the constraints) may be the same person or entity that owns or provided raw data (e.g., one or more of datasets 2605a through 2605n) or owns the derived collaborative data (e.g., shielded collaborative dataset 2660). In some cases, an authorized data consumer may be some other person or entity.

In the embodiment illustrated in FIG. 26, data trustee environment 2610 includes constraint manager 2615. At a high level, tenants that seek to share data can provide one or more desired computations and constraints (which may be embodied in a contractual agreement) to constraint manager 2615 through a user interface of data trustee environment 2610. The user interface can enable tenants to specify the desired computations and constraints that will control the use of their data in data trustee environment 2610, including eligible data sources (e.g., one or more of datasets 2605a through 2605n) and how their data may be processed or shared. Various types of constraints may be implemented, including data access constraints, data processing constraints, data aggregation constraints, data sanitation constraints, some combination thereof, or others. The specified computations and constraints, and other features of a tenant agreement, may be stored in a contact database (not depicted) accessible to constraint manager 2615.

In the embodiment illustrated in FIG. 26, data trustee environment 2610 includes data privacy pipeline 2620. At a high level, data privacy pipeline 2620 can accept data from one or more specified sources (e.g., one or more of datasets 2605a through 2605n). The data can be ingested, fused, derived, and/or sanitized to generate collaborative data (e.g., one or more of collaborative datasets 2607a through 2607n, shielded collaborative dataset 2660) based on one or more specified computations and/or constraints. The data privacy pipeline 2620 can be provided as a distributed computing or cloud computing service (cloud service) implemented in data trustee environment 2610, and can be spun up and spun down as needed. In some embodiments, tenants providing data into data privacy pipeline 2620 cannot access the pipeline. Instead, the pipeline outputs collaborative data subject to applicable constraints. Depending on the designated constraints, the collaborative data can be output from data trustee environment 2610 as one or more of collaborate datasets 2607a through 2607n (e.g., because it has been sanitized according to specified constraints) and/or may be shielded (e.g., stored as shielded collaborative dataset 2660) in data trustee environment 2610. As explained in more detail below, collaborative dataset 2660 can be queried to derive collaborative intelligence subject to the configurable constraints.

In the embodiment illustrated in FIG. 26, data privacy pipeline 2620 includes ingestion component 2625 (which produces ingested data 1830), constrained fusion component 2635 (which produces fused joint data 2640), constrained computation component 2645 (which produces derived joint data 2650), and sanitation component 2655 (which produces collaborative datasets 2607a through 2607n and 2660). Initially, one or more of datasets 2605a through 2605 may be provided to data privacy pipeline 2620 (e.g., through a user interface, a programming interface, or some other interface of data trustee environment). Ingestion component 2625 can determine whether input data or some portion thereof, is joint data pursuant to a contract or other tenant agreement. For example, input data or some portion thereof may be identified in some way, and ingestion component 2625 can communicate with constraint manager 2615 to confirm whether the identified data is joint data pursuant to a tenant agreement represented in the contract database. Data determined to be joint data can be stored as ingested data 2630, and data determined not to be joint data can be dropped.

Ingested data can include data from multiple sources, so constrained fusion component 2635 may fuse ingested data from multiple sources according to computations and constraints specified in a tenant agreement. For example, constrained fusion component 2635 can communicate with constraint manager 2615 to obtain, validate, or request a specified fusion operation pursuant to a tenant agreement represented in the contract database. By way of nonlimiting example, constrained fusion component 2635 can implement one or more constraints to combine ingested data (e.g., ingested data 2630) to form fused joint data (e.g., fused joint data 3640) in any number of ways, including the use of one or more join operations (e.g., left, right, inner, outer, anti), custom joins (e.g., via imperative scripts), data appends, normalization operations, some combination thereof, and others.

Generally, constrained computation component 2654 can perform constrained computations (e.g., on ingested data 2630, fused joint data 2640) to generate derived joint data (e.g., derived joint data 2650). Constrained computing can involve any number of specified computations (e.g., arithmetic operations, aggregation, summarization, filtering, sorting, bounding). Generally, constrained computation component 2645 can communicate with constraint manager 2615 to obtain, validate, or request a specified computation pursuant to a tenant agreement represented in the contract database. By way of a simple example, a number of retailers may agree to expose average sales data, so a corresponding computation may involve averaging. A simple example of a constraint computation is a calculation of average age per city, where the computation is only to be performed for a city if the underlying dataset includes entries for at least five people in the city. These are meant simply as examples, and any type of computation and/or constraint can be implemented.

In some embodiments, sanitation component 2655 can perform data sanitation (e.g., on derived joint data 2650) to generate collaborative data (e.g., one or more of collaborative datasets 2607a through 2607n, shielded collaborative dataset 2660) in a manner that implements constraints for storage, access, precision, and the like. For example, sanitation component 2655 can communicate with constraint manager 2615 to obtain, validate, or request a specified sanitation operation pursuant to a tenant agreement represented in the contract database. As such, sanitation component 2655 can implement a constraint specified in a tenant agreement that designates whether collaborative data should be shielded (e.g., stored as shielded collaborative dataset 2650 in data trustee environment 2610), whether collaborative data can be exported (e.g., as one or more of collaborative datasets 2607a through 2607n), whether exported collaborative data should be restricted (e.g., do not export email, credit card numbers, portions thereof), some combination thereof, and the like. In some embodiments, any or all intermediate data used in arriving at collaborative data (e.g., ingested data, fused joint data, derived joint data) may be deleted, for example, in association with spinning down data privacy pipeline 2620. As such, data privacy pipeline 2620 can generate collaborative data from data provided by one or more tenants.

As explained above, constraint manager 2615 can monitor and orchestrate the use and generation of collaborative data subject to one or more specified constraints. Additionally or alternatively, constraint manager 2615 can monitor and orchestrate access to collaborative data subject to the constraints. Generally, constraint manager 2615 can communicate with various components in data trustee environment 2610 and/or data privacy pipeline 2610 to implement specified computations and/or constraints, which may be maintained in a contract database accessible to constraint manager 2615. In some embodiments, components can issue requests to constraint manager 2615 for permission to execute a particular command, function call, or other executable unit of logic. Constraint manager 2615 can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any component of data privacy pipeline 2620, data trustee environment 2610). Accordingly, corresponding functionality enforcing a constraint can be applied at any step, or multiple steps. In some embodiments, enforcement of certain constraints can be allocated to certain components of data privacy pipeline 2620 (e.g., data access constraints get applied by ingestion component 2625, processing and aggregation constraints get applied by constrained fusion component 2635 and/or constrained computation component 2645, sanitation constraints get applied by sanitation component 2655). In another example, a particular data access constraint (e.g., only pass data for patients who participated in at least five different studies) may be applied by constrained fusion component 2635. These are meant merely as examples, and any suitable constraint enforcement regime may be implemented within the present disclosure.

In some embodiments, constraint manager 2615 can enforce a constraint (e.g., precision or aggregation constraints) on a particular executable unit of logic (e.g., for a designated computation, a requested operation) by communicating, indicating, or otherwise facilitating any number of dispositions. In one example, constraint manager 2615 can reject a particular executable unit of logic entirely. In another example, constraint manager 2615 can allow a particular executable unit of logic, but require the result to be filtered (e.g., no value is returned for a particular row or entry of data). In yet another example, constraint manager 2615 can allow a particular executable unit of logic, but require the result to be changed (e.g., precision reduced, a question is answered with false). These and other variations may be implemented.

As constraints are applied to generate collaborative data (e.g., collaborative datasets 2607*a* through 2607*n*, shielded collaborative dataset 2670), any combination of schema, constraints, and/or attribution metadata can be associated with the collaborative data, intermediate data used to arrive at the collaborative data (e.g., ingested data 2630, fused joint data 2640, derived joint data 2650), or otherwise. Generally, constraints can be enforced across multiple steps and computations. As such, in some embodiments, applicable and/or satisfied constraints for each step can be tracked and/or associated with data produced by a given component of data privacy pipeline 2620. Taking aggregation constraints as an example, once an aggregation constraint has been fulfilled by a particular component of data privacy pipeline 2620, downstream components no longer need to consider this constraint. In another example where different constraints have been specified for different datasets to be merged, a merging operation may only need to apply the stricter constraint. Generally, an appropriate allocation or combination of constraints can be applied and/or tracked as data flows through data privacy pipeline 2620. This tracking can facilitate validating whether a particular constraint has been applied to particular data. Accordingly, as constraints are applied and data is generated, corresponding schema, applicable or satisfied constraints, and/or attribution metadata indicating ownership or providence of the data can be associated with a dataset, or a corresponding entry, row, field, or other element of data. Generally, the schema, applicable or satisfied constraints, and/or attribution metadata can be generated pursuant to a tenant agreement represented in the contract database (e.g., via communication with constraint manager 2615). In some embodiments, any or all intermediate data used in arriving at collaborative data (e.g., ingested data 2630, fused joint data 2640, derived joint data 2650) may be deleted, and collaborative data may be stored in data trustee environment 2610 as shielded collaborative dataset 2660 and/or exported as one or more of collaborative datasets 2607*a* through 2607*n*, depending on an applicable constraint.

In some embodiments, data trustee environment 2610 includes constrained querying component 2670, which can apply constraint querying to allow data consumers (e.g., operating one of data consumer devices 2603*a* through 2603*n*) to query collaborative data (e.g., shielded collaborative dataset 2660) in data trustee environment 2610 subject to one or more specified constraint. At a high level, constrained querying component 2670 can operate as a search engine that allows data consumers to access or derive collaborative intelligence from shielded collaborative dataset 2660, without exposing raw data provided by a tenant (e.g., one or more of datasets 2605*a* through 2605*n*), intermediate data used to generate the shielded collaborative dataset 2660 (e.g., ingested data 2630, fused joint data 2640, derived joint data 2650), and/or shielded collaborative dataset 2660. Generally, constrained querying component 2670 can communicate with constraint manager 2615 to obtain, validate, or request a specified operation pursuant to a tenant agreement represented in the contract database. Constrained querying component 2670 can facilitate enforcement of constraints in response to a query in any number of ways, including reformatting a query prior to execution, applying constraints after executing a query, constraining eligible queries for execution (e.g., only permit a set of whitelisted queries), applying access constraints prior to execution, and others.

Figure 27:
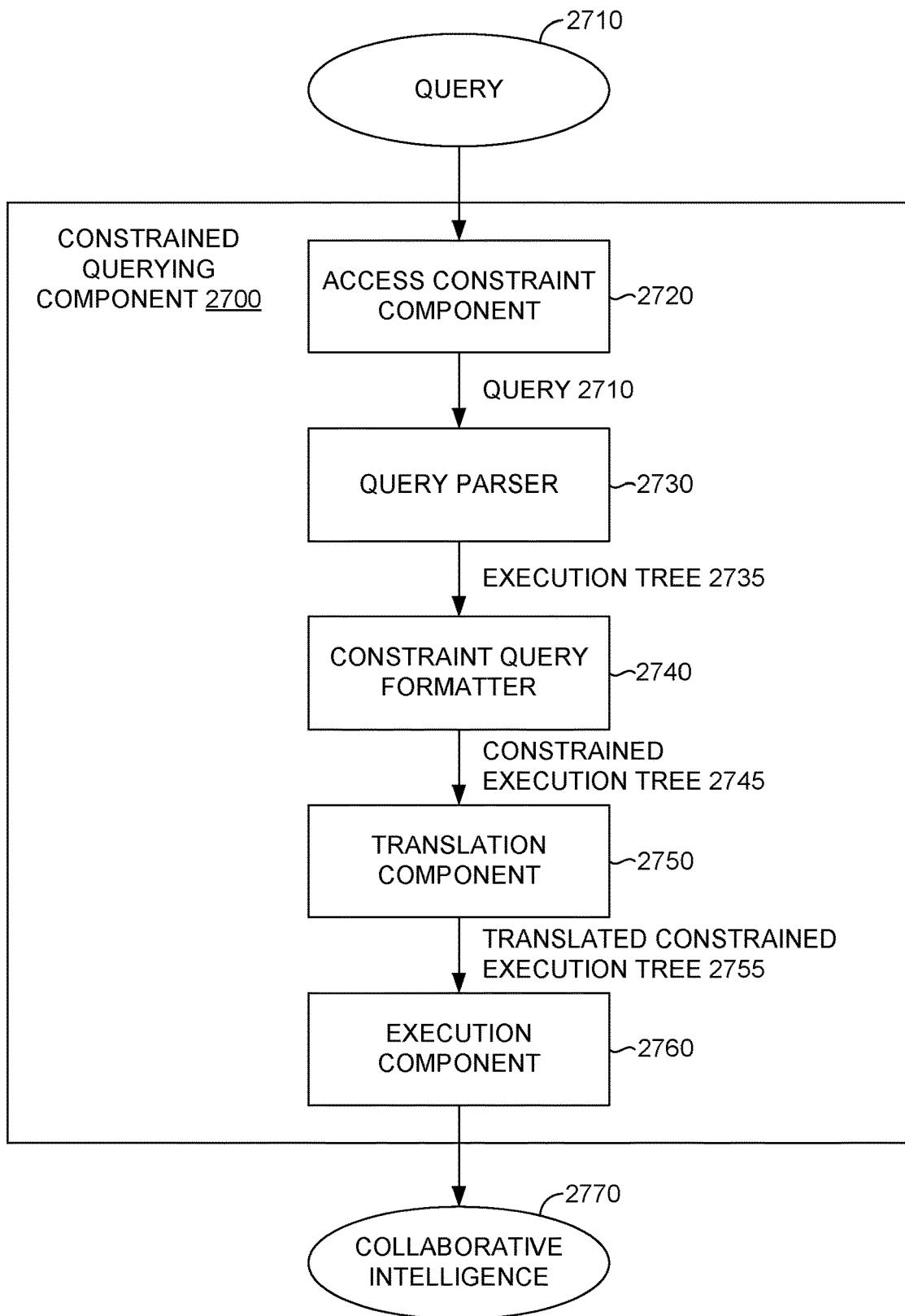
FIG. 27 is a block diagram of an example constrained querying component, in accordance with embodiments described herein.

Turning now to FIG. 27, FIG. 27 is a block diagram of an example constrained querying component 2700, in accordance with embodiments described herein. Constrained querying component 2700 may correspond with constrained querying component 2670 of FIG. 26. At a high level, constrained querying component 2700 can operate as a search engine, enabling data consumers to query collaborative data and derive collaborative intelligence therefrom, subject to one or more constraints designated in a corresponding tenant agreement. By way of background, queries are generally not executable code. In order to execute a query, the query is normally converted into an execution tree, which serves as the basis for an execution plan that is executable. Generally, constrained querying component 2700 can enforce constraints, or facilitate the enforcement of constraints, by reformatting an execution tree corresponding to a received query to account for any applicable constraints prior to execution. In a simple example, a constraint may permit queries on compensation data, but the result has to be rounded. As such, the query and/or its corresponding execution tree can be reformatted prior to execution, such that any returned search results account for applicable constraints. In the embodiment illustrated in FIG. 27, constrained querying component 2700 includes access constraint component 2720, query parser 2730, constraint query formatter 2740, translation component 2750, and execution component 2760. This configuration is meant merely as an example, and other configurations with similar or different functionality may be implemented in accordance with the present disclosure.

At a high level, constrained querying component 2700 may receive query 2710 issued by a data consumer (e.g., operating one of data consumer devices 2603*a* through 2603*n* of FIG. 26) requesting collaborative intelligence based on collaborative data (e.g., shielded collaborative dataset 2660 of FIG. 26). Query 2710 may take any suitable form or query language, and may comprise one or more requested operations on collaborative data. In some embodiments, query 2710 may specify or otherwise be associated with runtime information, such as information identifying the requesting data consumer issuing the query, information identifying an applicable tenant agreement, information identifying target collaborative data on which to operate, and the like.

In some embodiments, access constraint component 2720 can use the runtime information associated with query 2720 to trigger a lookup and enforcement of an applicable data access constraint (e.g., via communication with constraint manager 2615 of FIG. 26). For example, access constraint component 2720 can validate query 2710 against a corresponding constraint context comprising an applicable data access constraint and the runtime information associated with query 2710. Generally, in scenarios where a data consumer is not authorized to access a collaborative dataset, target collaborative data within a collaborative dataset (e.g., a particular row of data), a particular type of requested collaborative intelligence to be derived, access constraint component 2720 can deny the request. In this case, access constraint component 2720 may return a notification to the issuing data consumer informing the data consumer that the requested query was denied. If the requested access is determined to be authorized and/or consistent with an applicable data access constraint, query 2710 can be passed to query parser 2730.

Generally, query parser 2730 can parse query 2710 and generate a corresponding execution tree 2735. At a high level, execution tree 2735 comprises a hierarchical arrangement of executable units of logic that, when executed, implement query 2710. The executable units of logic can include any suitable arrangement and combination of commands, operations, function calls, and the like. Constraint query formatter 2740 can access applicable constraints (e.g., via communication with constraint manager 2615 of FIG. 26) and can validate the executable units of logic of execution tree 2735 against the constraints. In some embodiments, if one or more of the executable units of logic is not allowed, query 2710 can effectively be reformatted by adding, removing, and/or altering one or more executable units of logic based on one or more constraints.

More specifically, constraint query formatter 2740 can reformat execution tree 2735 into constrained execution tree 2745 by traversing execution tree 2735 and replacing executable units of logic inconsistent with a particular constraint with custom executable units of logic that are consistent with the constraint. Additionally or alternatively, constraint query formatter 2740 can add or remove one or more executable units of logic to enforce constraints (e.g., precision constraints) on the output. Generally, constraint query formatter 2740 can validate an executable unit of logic of execution tree 2735 against a corresponding constraint context comprising an applicable constraint and the runtime information associated with query 2710. This check can involve validation of a constituent command or operation, one or more constituent parameters, and/or consideration of other parts of execution tree 2735, and can result in a number of possible results. For example, an executable unit of logic can be allowed (e.g., the executable unit of logic can be copied into constrained execution tree 2735), an executable unit of logic can be disallowed (e.g., query 2710 can be disallowed in its entirety), or an executable unit of logic can be allowed but with changes (e.g., copying a corresponding constrained executable unit of logic into constrained execution tree 2745). These are meant simply as examples, and other variations are contemplated within the present disclosure.

As such, constraint query formatter 2740 can evaluate each executable unit of logic against the constraints, add or remove executable units of logic, and/or replace one or more executable units of logic inconsistent with a constraint with a custom executable unit of logic that incorporates and/or applies the constraint. Mappings between executable units of logic and custom executable units of logic and/or executable units of logic corresponding to one or more constraints (e.g., a list of rules) can be retrieved, accessed, and/or maintained in any suitable manner (e.g., stored locally, accessed via communication with constraint manager 2615 of FIG. 26, some combination thereof, or otherwise). Mappings can be one-to-one, one-to-many, or many-to-one.

In some embodiments, a received query may not be in the same query language used by the target collaborative dataset (e.g., shielded collaborative dataset 2660 of FIG. 26). As such, translation component 2750 can translate constrained execution tree 2745 from a first query language to a second query language. That is, translation component can translate constrained execution tree 2745 into translated constrained execution tree 2755. Any suitable query language may be implemented (e.g., SQL, SparkQL, Kusto Query Language, C# Linq). In some embodiments, constrained execution tree 2745 and/or translated constrained execution tree 2755 can be executed to test for failure, and a failure may result in rejection of a particular execution, a set of executable units of logic, the entire query 2710, or otherwise.

A resulting execution tree (e.g., constrained execution tree 2745 and/or translated constrained execution tree 2755, as the case may be) can be passed to execution component 2760 for execution (e.g., execution of a corresponding execution plan). Generally, this execution operates to derive collaborative intelligence 2770 from collaborative data. In some embodiments, collaborative intelligence 2770 is returned to the requesting data consumer as is. In some embodiments, one or more constraints may additionally or alternatively be enforced on collaborative intelligence 2770 prior to transmission to the requesting data consumer.

Figures 28A, 28B:
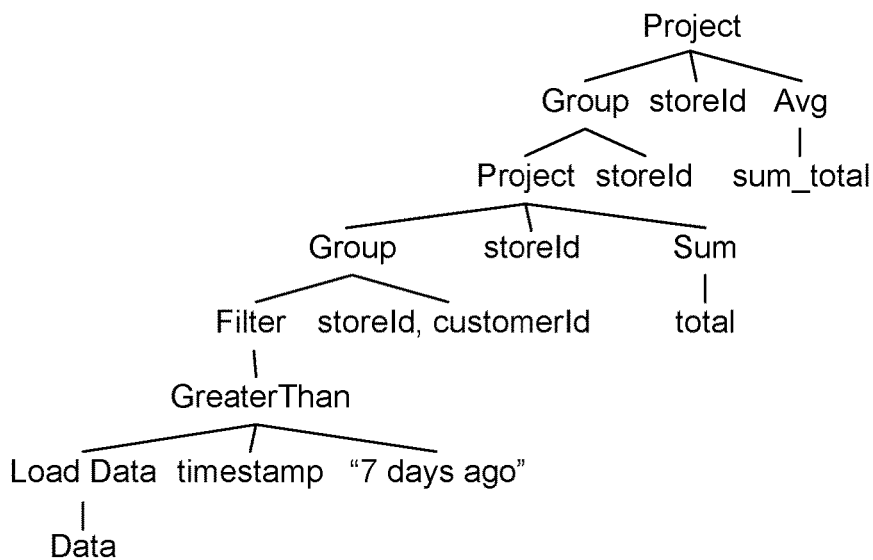
FIG. 28A is an example of an issued query, in accordance with embodiments described herein.
FIG. 28B is an example of a corresponding execution tree, in accordance with embodiments described herein.

By way of nonlimiting example, assume that pursuant to a particular tenant agreement, a number of retailers have agreed to expose sales data that includes some sensitive customer information that should not be exposed. In this example, the tenant agreement specifies a number of constraints, including requirements of at least 20 unique customers per aggregation, aggregations must span at least 48 hours, no aggregation by userid, no export of userid, and round numeric results to the nearest two digits. Assume further that the tenant agreement allows a data consumer to derive the average amount of money spent by each customer in each store each week. FIG. 28A illustrates an example of a corresponding query 2810 in Structured Query Language (SQL). This query language is meant merely as an example, and any suitable query structure may be implemented.

Query 2810 may be parsed and converted into a corresponding execution tree (e.g., by query parser 2730 of FIG. 27). FIG. 28B illustrates a simplified representation of an example execution tree 2820 that corresponds with query 2810 of FIG. 28A. Generally, in a query execution tree, each executable unit of logic receives data from a previous executable unit of logic and one or more parameters for transforming the data. When executing execution tree 2820, data gets passed along the left branch of execution tree 2820, from the bottom to the top. As the data gets passed, each executable unit of logic applies one or more associated commands or operations. As will be appreciated by those of ordinary skill in the art, execution tree 2820 comprises a hierarchical arrangement of executable units of logic that, if executed, would implement query 2810.

Figure 29A:
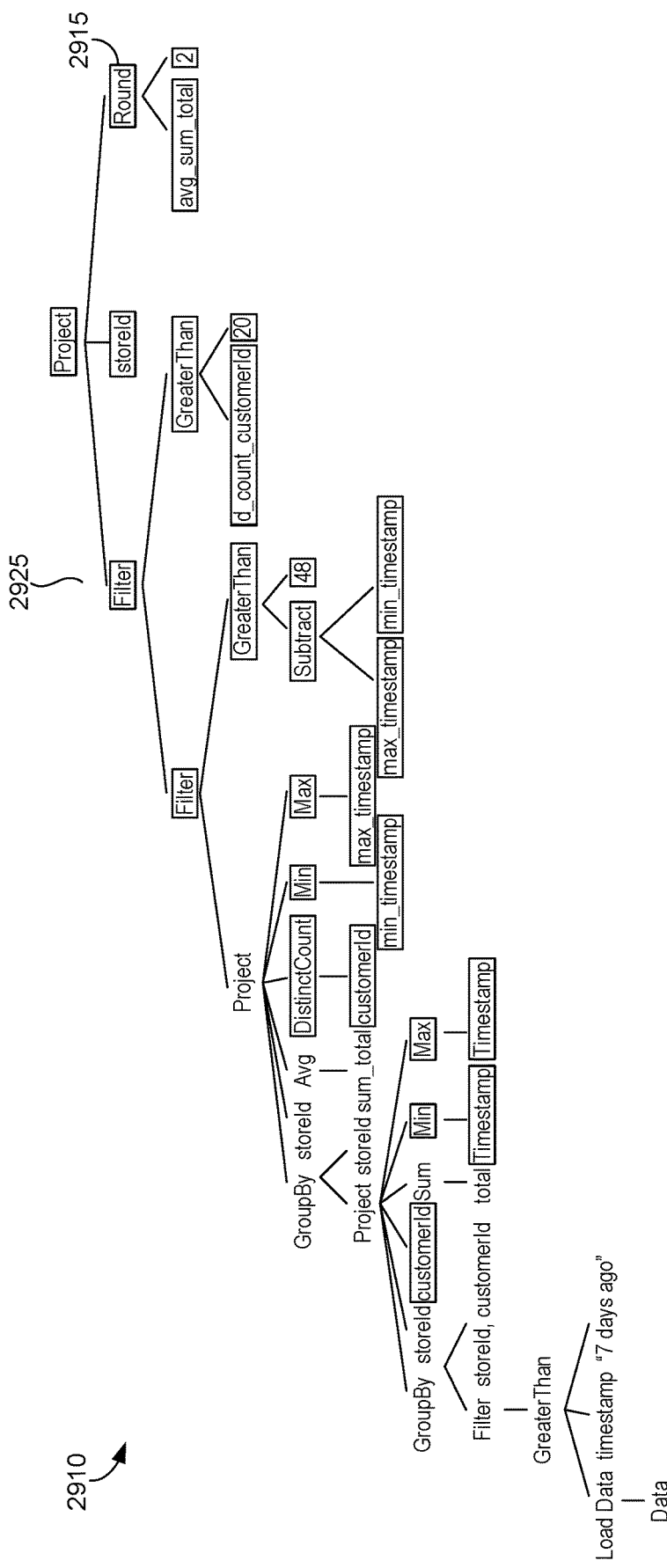
FIG. 29A is an example of a constrained execution tree, in accordance with embodiments described herein.

To account for applicable constraints, execution tree 2820 can be converted into constrained execution tree 2910 of FIG. 29A (e.g., by constraint query formatter 2740 of FIG. 27). Differences between execution tree 2820 of FIG. 28B and constrained execution tree 2910 of FIG. 29A are illustrated with boxes drawn around the different elements. For example, constrained execution tree 2910 includes a rounding operation 2915 that implements the constraint described above in which numeric results must be rounded to the nearest two digits. In another example, constrained execution tree 2910 includes a filtering operation 2925 that implements the constraint described above in which aggregations must include data for at least 20 unique customers. This configuration for constrained execution tree 2910 is simply meant as an example, and any suitable configuration may be implemented. FIG. 29B illustrates an example of a corresponding query 2920 that corresponds with constrained execution tree 2910, for illustration purposes. As will be appreciated, query 2920 includes additional elements not present in query 2810 that serve to enforce the example constraints described above. Constrained execution tree 2910 can be executed by traversing and executing the hierarchy of executable units of logic of the tree along the left branch, from bottom to top, as will be appreciated by those of ordinary skill in the art. As such, constrained execution tree 2910 can be executed to derive collaborative intelligence, and the collaborative intelligence can be returned to a requesting data consumer.

Example Distributed Computing Environment

Figure 30:
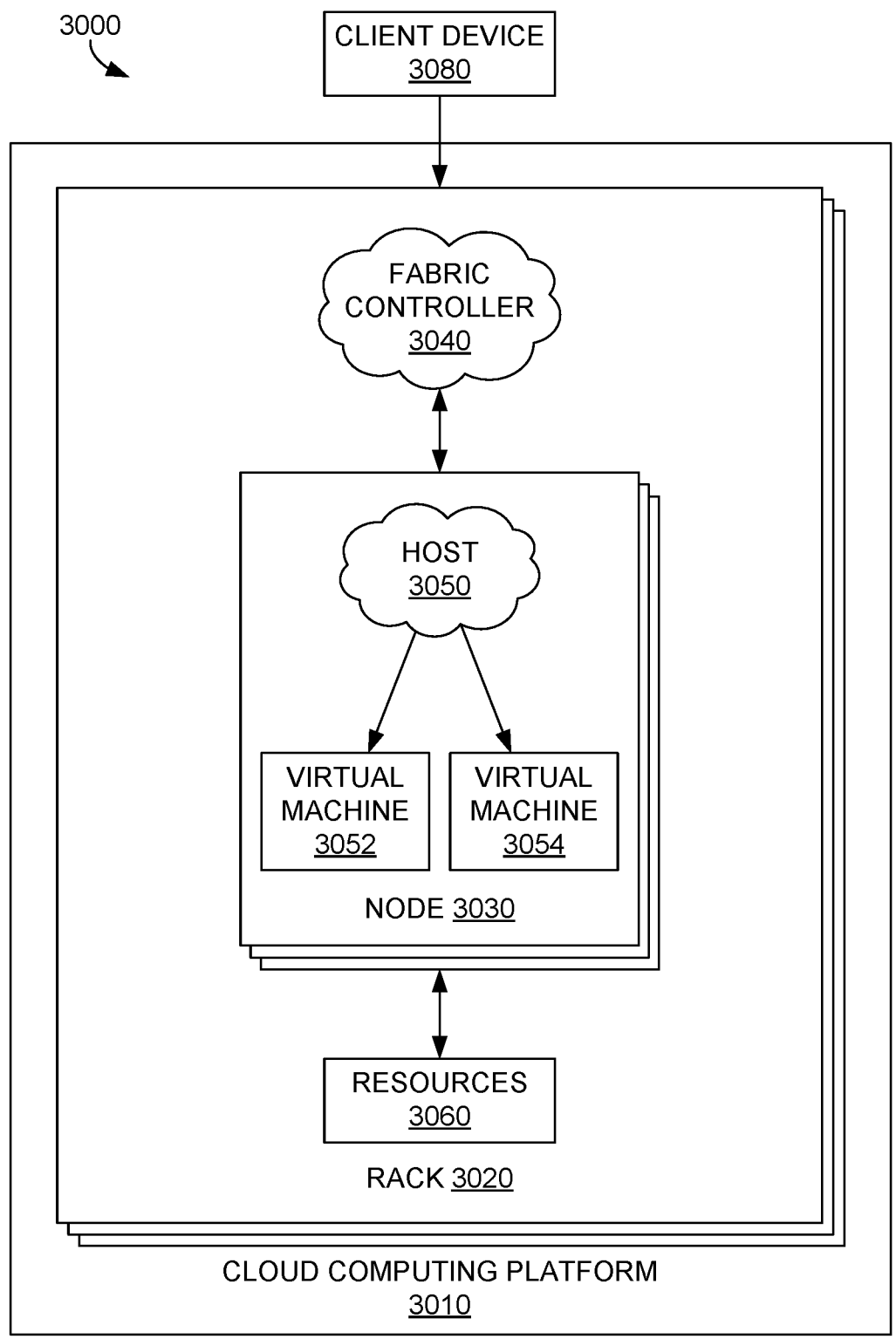
FIG. 30 is a block diagram of an example computing environment suitable for use in implementing embodiments described herein.

Referring now to FIG. 30, FIG. 30 illustrates an example distributed computing environment 3000 in which implementations of the present disclosure may be employed. In particular, FIG. 30 shows a high level architecture of an example cloud computing platform 3010 that can host a collaborative intelligence environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 2400 that includes cloud computing platform 3010, rack 3020, and node 3030 (e.g., computing devices, processing units, or blades) in rack 3020. The collaborative intelligence environment and/or data trustee environment can be implemented with cloud computing platform 3010 that runs cloud services across different data centers and geographic regions. Cloud computing platform 3010 can implement fabric controller 3040 component for provisioning and managing resource allocation, deployment, upgrade, and management of cloud services. Typically, cloud computing platform 3010 acts to store data or run service applications in a distributed manner. Cloud computing infrastructure 3010 in a data center can be configured to host and support operation of endpoints of a particular service application. Cloud computing infrastructure 3010 may be a public cloud, a private cloud, or a dedicated cloud.

Node 3030 can be provisioned with host 3050 (e.g., operating system or runtime environment) running a defined software stack on node 3030. Node 3030 can also be configured to perform specialized functionality (e.g., compute nodes or storage nodes) within cloud computing platform 3010. Node 3030 is allocated to run one or more portions of a service application of a tenant. A tenant can refer to a customer utilizing resources of cloud computing platform 3010. Service application components of cloud computing platform 3010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 3030, nodes 3030 may be partitioned into virtual machines (e.g., virtual machine 3052 and virtual machine 3054). Physical machines can also concurrently run separate service applications. The virtual machines or physical machines can be configured as individualized computing environments that are supported by resources 3060 (e.g., hardware resources and software resources) in cloud computing platform 3010. It is contemplated that resources can be configured for specific service applications. Further, each service application may be divided into functional portions such that each functional portion is able to run on a separate virtual machine. In cloud computing platform 3010, multiple servers may be used to run service applications and perform data storage operations in a cluster. In particular, the servers may perform data operations independently but exposed as a single device referred to as a cluster. Each server in the cluster can be implemented as a node.

Client device 3080 may be linked to a service application in cloud computing platform 3010. Client device 3080 may be any type of computing device, which may correspond to computing device 3000 described with reference to FIG. 30, for example. Client device 3080 can be configured to issue commands to cloud computing platform 3010. In embodiments, client device 3080 may communicate with service applications through a virtual Internet Protocol (IP) and load balancer or other means that direct communication requests to designated endpoints in cloud computing platform 3010. The components of cloud computing platform 3010 may communicate with each other over a network (not shown), which may include, without limitation, one or more local area networks (LANs) and/or wide area networks (WANs).

Example Operating Environment

Figure 31:
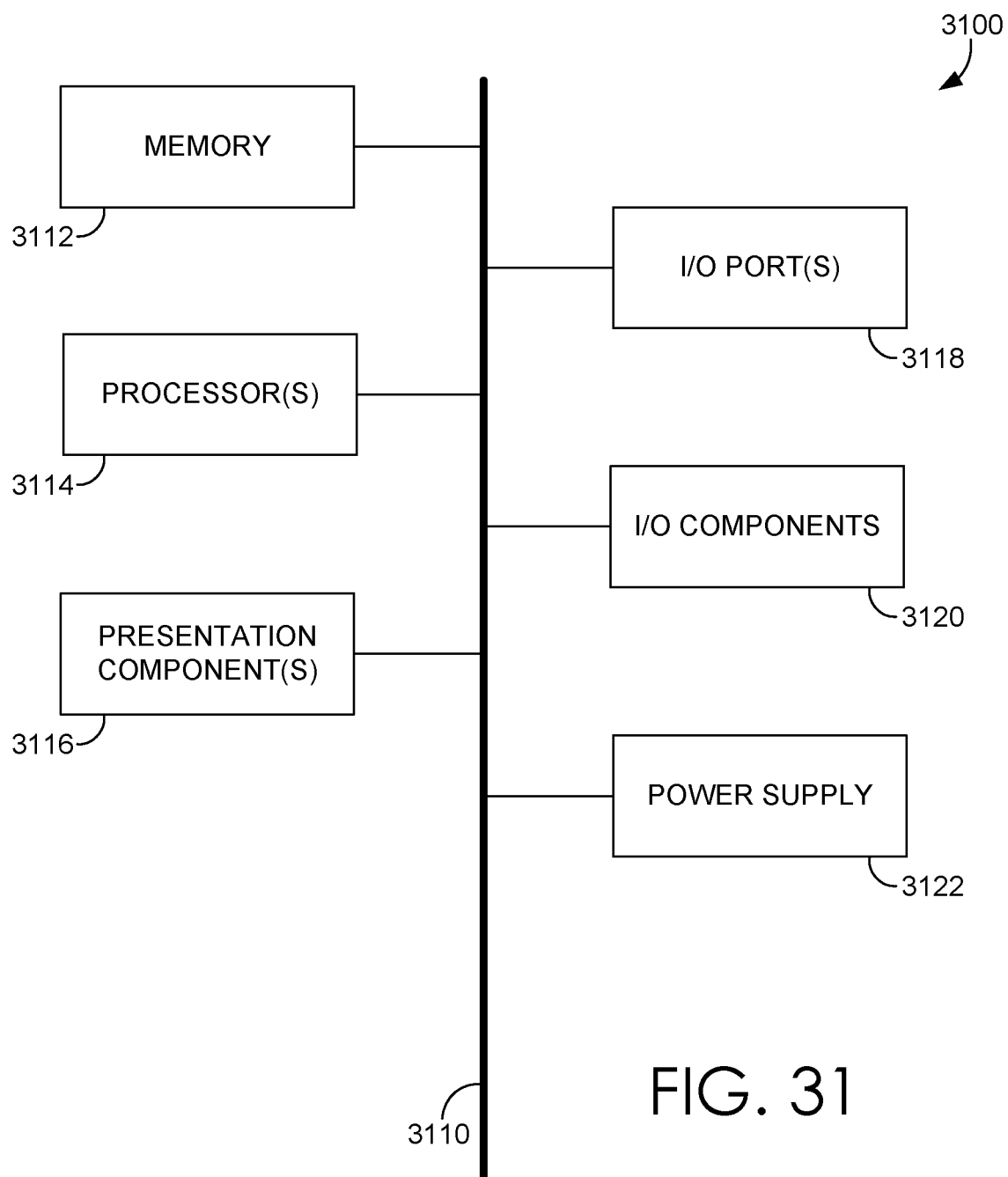
FIG. 31 is a block diagram of an example computing environment suitable for use in implementing embodiments described herein.

Having briefly described an overview of embodiments of the present invention, an example operating environment in which embodiments of the present invention may be implemented is described below in order to provide a general context for various aspects of the present invention. Referring initially to FIG. 31 in particular, an example operating environment for implementing embodiments of the present invention is shown and designated generally as computing device 3100. Computing device 3100 is but one example of a suitable computing environment and is not intended to suggest any limitation as to the scope of use or functionality of the invention. Neither should computing device 3100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 31, computing device 3100 includes bus 3110 that directly or indirectly couples the following devices: memory 3112, one or more processors 3114, one or more presentation components 3116, input/output ports 3118, input/output components 3120, and illustrative power supply 3122. Bus 3110 represents what may be one or more buses (such as an address bus, data bus, or combination thereof). The various blocks of FIG. 31 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 31 is merely illustrative of an example computing device that can be used in connection with one or more embodiments of the present invention. Distinction is not made between such categories as "workstation," "server," "laptop," "hand-held device," etc., as all are contemplated within the scope of FIG. 31 and reference to "computing device."

Computing device 3100 typically includes a variety of computer-readable media. Computer-readable media can be any available media that can be accessed by computing device 3100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 3100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 3112 includes computer storage media in the form of volatile and/or nonvolatile memory. The memory may be removable, non-removable, or a combination thereof. Exemplary hardware devices include solid-state memory, hard drives, optical-disc drives, etc. Computing device 3100 includes one or more processors that read data from various entities such as memory 612 or I/O components 3120. Presentation component(s) 3116 present data indications to a user or other device. Exemplary presentation components include a display device, speaker, printing component, vibrating component, etc.

I/O ports 3118 allow computing device 3100 to be logically coupled to other devices including I/O components 3120, some of which may be built in. Illustrative components include a microphone, joystick, game pad, satellite dish, scanner, printer, wireless device, etc.

With reference to the collaborative intelligence environment described herein, embodiments described herein support constraint computing and/or constraint querying. The components of the collaborative intelligence environment can be integrated components that include a hardware architecture and a software framework that support constraint computing and/or constraint querying functionality within a collaborative intelligence system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the collaborative intelligence system can include an API library that includes specifications for routines, data structures, object classes, and variables may support the interaction between the hardware architecture of the device and the software framework of the collaborative intelligence system. These APIs include configuration specifications for the collaborative intelligence system such that the different components therein can communicate with each other in the collaborative intelligence system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the collaborative intelligence environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A data trustee environment comprising:
one or more hardware processors and memory configured to provide computer program instructions to the one or more hardware processors; and
an interface component configured to use the one or more hardware processors to receive, from a group of participating tenants of the data trustee environment, a configuration of a multi-participant pipeline under development by the group, the configuration comprising a specification of (i) an input into the multi-participant pipeline, (ii) one or more computational steps of the multi-participant pipeline, (iii) a use by the multi-participant pipeline of at least one shielded asset of a non-participating tenant that is not part of the group, the data trustee environment configured to restrict the use of the at least one shielded asset to within the data trustee environment, and (iv) at least one of a collaborative dataset derivable by executing the one or more computational steps on the input or a permissible query on the collaborative dataset,
wherein the data trustee environment is configured to deploy the configuration of the multi-participant pipeline to derive the collaborative dataset in the data trustee environment based on the use of the at least one shielded asset, without exposing the at least one shielded asset to any of the participating tenants, upon being triggered by an authorized one of the of participating tenants.

2. The data trustee environment of claim 1, wherein the at least one shielded asset comprises a template data privacy pipeline, and wherein the configuration of the multi-participant pipeline builds upon the template data privacy pipeline.

3. The data trustee environment of claim 1, wherein the at least one shielded asset comprises at least one of a dataset or computational script owned by the non-participating tenant.

4. The data trustee environment of claim 1, wherein the data trustee environment is configured to restrict the use of the at least one shielded asset by one of the participating tenants to within the data trustee environment based on a collaborative intelligence contract comprising an entitlement granted to the participating tenant by the non-participating tenant to use the at least one shielded asset, subject to an entitlement constraint or policy, and wherein the data trustee environment is configured to enforce the entitlement constraint or policy upon the multi-participant pipeline being triggered by the authorized participating tenant.

5. The data trustee environment of claim 1, wherein the interface component is further configured to accept an input triggering the multi-participant pipeline and, based thereon, cause the data trustee environment to spin up the multi-participant pipeline.

6. The data trustee environment of claim 1, wherein the interface component comprises a web service of the data trustee environment and is configured to prompt the participating tenants to specify the configuration of the multi-participant pipeline.

7. The data trustee environment of claim 1, wherein the data trustee environment is configured to deploy the multi-participant pipeline as a cloud service.

8. One or more computer storage media storing computer-useable instructions that, when used by one or more computing devices, cause the one or more computing devices to perform operations comprising:
providing, by a data trustee environment to a participating tenant of the data trustee environment, authorization to use (i) a first shielded asset associated with a first collaborative intelligence contract between the participating tenant and a first tenant of the data trustee environment, and (ii) a second shielded asset associated with a second collaborative intelligence contract between the participating tenant and a second tenant of the data trustee environment, wherein the data trustee environment is configured to limit use of the first and second shielded assets by the participating tenant to within the data trustee environment based on the first and second collaborative intelligence contracts, respectively; and receiving, from the participating tenant, a configuration of a data privacy pipeline, the configuration comprising a specification of (i) an input into the data privacy pipeline, (ii) one or more computational steps of the data privacy pipeline; (iii) a use by the data privacy pipeline of the first and second shielded assets, and (iv) at least one of a collaborative dataset derivable by executing the one or more computational steps on the input or a permissible query on the collaborative dataset, wherein the data trustee environment is configured to deploy the configuration of the data privacy pipeline to derive the collaborative dataset in the data trustee environment based on the use of the first and second shielded assets, without exposing the first or second shielded assets to the participating tenant, upon being triggered by the participating tenant.

9. The one or more computer storage media of claim 8, wherein the first shielded asset comprises a template data privacy pipeline, and wherein the configuration of the data privacy pipeline builds upon the template data privacy pipeline.

10. The one or more computer storage media of claim 8, wherein the first shielded asset comprises at least one of a dataset or computational script owned by the first tenant.

11. The one or more computer storage media of claim 8, wherein the first collaborative intelligence contract comprises an entitlement granted to the participating tenant by the first tenant to use the first shielded asset, subject to an entitlement constraint or policy, and wherein the data trustee environment is configured to enforce the entitlement constraint or policy upon the data privacy pipeline being triggered by the participating tenant.

12. The one or more computer storage media of claim 8, wherein the data trustee environment is further configured to accept an input triggering the data privacy pipeline and, based thereon, to spin up the data privacy pipeline.

13. The one or more computer storage media of claim 8, wherein the data trustee environment includes a web service configured to prompt the participating tenant to specify the configuration of the data privacy pipeline.

14. The one or more computer storage media of claim 8, wherein the data trustee environment is configured to deploy the data privacy pipeline as a cloud service.

15. A method comprising:

providing, by a data trustee environment to a first tenant of the data trustee environment, authorization to use a shielded asset controlled by a second tenant of the data trustee environment, wherein the data trustee environment is configured to limit use of the shielded asset by the first tenant to within the data trustee environment; and receiving, from the first tenant, a configuration of a data privacy pipeline, the configuration comprising a specification of a use by the data privacy pipeline of the shielded asset, and at least one of (i) an input into the data privacy pipeline derived by pre-processing performed outside the data trustee environment, or (ii) an output derived by the data privacy pipeline and that triggers post-processing outside of the data trustee environment;

wherein the data trustee environment is configured to deploy the configuration of the data privacy pipeline in the data trustee environment based on the use of the shielded asset, without exposing the shielded asset to the first tenant, upon being triggered by the first tenant.

16. The method of claim 15, wherein the shielded asset comprises a template data privacy pipeline, and wherein the configuration of the data privacy pipeline builds upon the template data privacy pipeline.

17. The method of claim 15, wherein the shielded asset is associated with a collaborative intelligence contract between the first tenant and the second tenant of the data trustee environment, and wherein the data trustee environment is configured to limit the shielded asset to within the data trustee environment based on the collaborative intelligence contract.

18. The method of claim 15, wherein the collaborative intelligence contract comprises an entitlement granted to the first tenant by the second tenant to use the shielded asset, subject to an entitlement constraint or policy, and wherein the data trustee environment is configured to enforce the entitlement constraint or policy upon the data privacy pipeline being triggered by the first tenant.

19. The method of claim 15, wherein the data trustee environment is further configured to accept an input triggering the data privacy pipeline and, based thereon, to spin up the data privacy pipeline.

20. The method of claim 15, wherein the data trustee environment comprises a web service configured to prompt the first tenant to specify the configuration of the data privacy pipeline.

* * * * *